United States Patent
Kuroki et al.

(10) Patent No.: US 8,065,991 B2
(45) Date of Patent: Nov. 29, 2011

(54) WORKING GAS CIRCULATION ENGINE

(75) Inventors: Rentaro Kuroki, Susono (JP); Daisaku Sawada, Gotemba (JP); Akira Kato, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 164 days.

(21) Appl. No.: 12/675,622

(22) PCT Filed: Mar. 11, 2009

(86) PCT No.: PCT/JP2009/054659
§ 371 (c)(1),
(2), (4) Date: Feb. 26, 2010

(87) PCT Pub. No.: WO2010/103629
PCT Pub. Date: Sep. 16, 2010

(65) Prior Publication Data
US 2011/0209691 A1    Sep. 1, 2011

(51) Int. Cl.
*F02M 25/07*     (2006.01)
*F02B 47/08*     (2006.01)
*F01N 3/10*      (2006.01)

(52) U.S. Cl. ......... 123/568.12; 123/568.11; 123/568.15; 123/1 A; 60/278; 60/320

(58) Field of Classification Search .......... 123/1 A, 123/568.11–568.15, 568.21; 701/101–103, 701/108; 60/274, 278, 279, 286, 299, 300, 60/320, 321
See application file for complete search history.

(56) References Cited

U.S. PATENT DOCUMENTS

| | | | | |
|---|---|---|---|---|
| 4,674,463 A * | 6/1987 | Duckworth et al. | ............ | 60/278 |
| 5,016,599 A * | 5/1991 | Jubb | ............... | 60/278 |
| 5,233,966 A * | 8/1993 | Berg | ......... | 123/568.11 |
| 5,456,240 A * | 10/1995 | Kanesaka | ............... | 123/568.11 |
| 7,661,416 B2 * | 2/2010 | Sasajima et al. | ......... | 123/568.12 |
| 2011/0056466 A1 * | 3/2011 | Kuroki et al. | ............ | 123/568.11 |
| 2011/0067664 A1 * | 3/2011 | Kuroki et al. | ............ | 123/568.11 |
| 2011/0120429 A1 * | 5/2011 | Murtha | .................... | 123/568.11 |

FOREIGN PATENT DOCUMENTS

| | | |
|---|---|---|
| JP | 4-86329 | 3/1992 |
| JP | 11-93681 | 4/1999 |
| JP | 2006-77639 A | 3/2006 |
| JP | 2007-77834 A | 3/2007 |
| JP | 2008-64018 A | 3/2008 |

* cited by examiner

*Primary Examiner* — Willis Wolfe, Jr.
(74) *Attorney, Agent, or Firm* — Kenyon & Kenyon LLP

(57) ABSTRACT

A working gas circulation engine includes a combustion chamber that can expand a working gas, which has a specific heat ratio higher than that of the air, with the combustion between an oxidizing agent and a fuel; a circulation path that can allow the working gas to circulate from a suction side to an exhaust side of the combustion chamber and can supply the same again to the combustion chamber; a feed means that can feed the gas in a pressure-reduction target section, which is the section whose pressure is to be reduced, to the outside, and a control means that operates the feed means for feeding the gas in the pressure-reduction target section, when the pressure in the pressure-reduction target section is higher than a predetermined pressure that is set in advance.

16 Claims, 21 Drawing Sheets

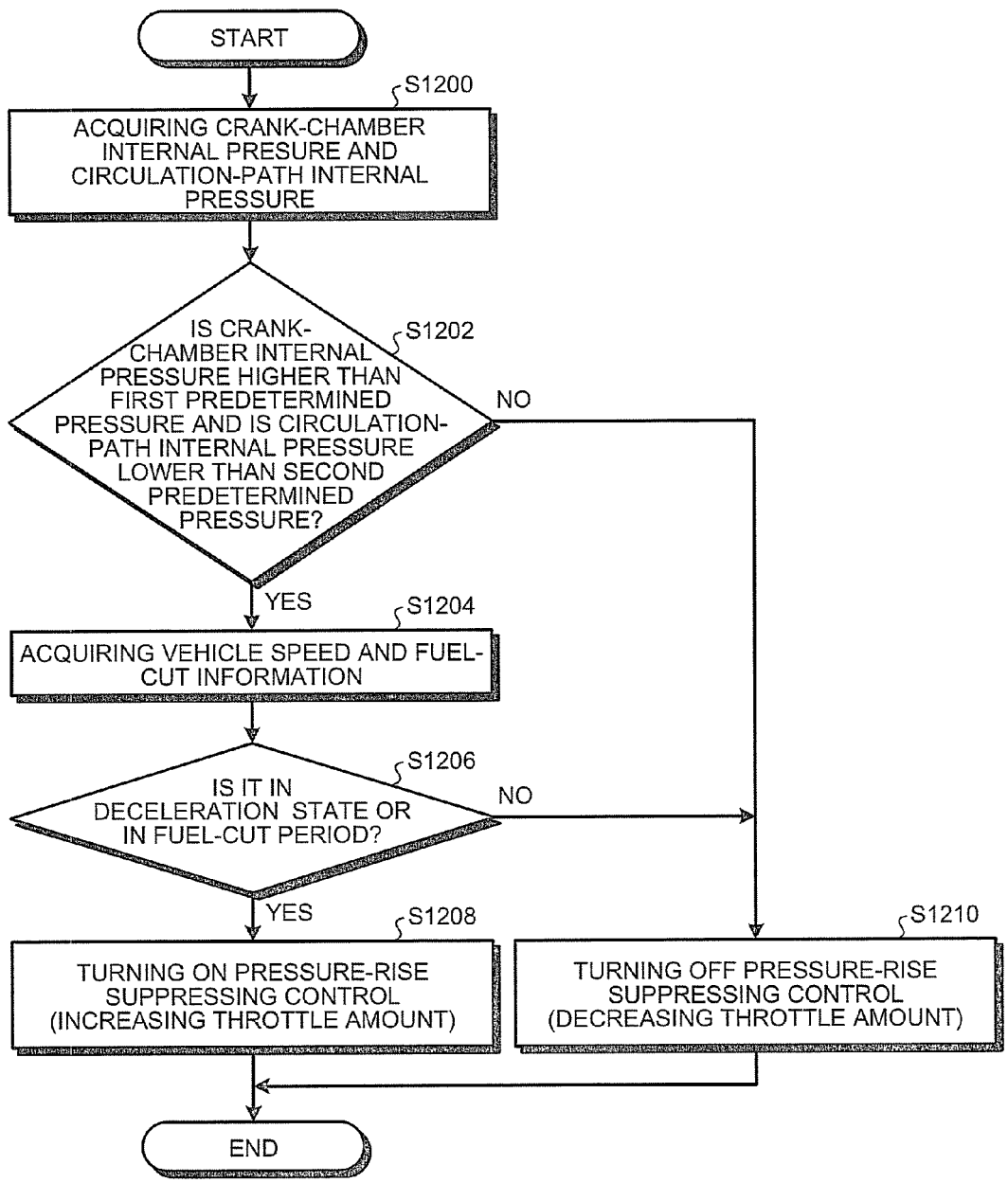

WORKING GAS CIRCULATION ENGINE

This is a 371 national phase application of PCT/JP2009/054659 filed 11 Mar. 2009, the entire content of which is incorporated herein by reference.

TECHNICAL FIELD

The present invention relates to a working gas circulation engine. More particularly, the present invention relates to a working gas circulation engine in which working gas contained in exhaust gas is allowed to circulate from an exhaust side to a suction side of a combustion chamber, and again can be supplied to the combustion chamber.

BACKGROUND ART

There has been known a working gas circulation engine that is so-called a closed-cycle engine as a conventional engine. In the working gas circulation engine, working gas contained in exhaust gas is allowed to circulate from an exhaust side to a suction side of a combustion chamber, and again can be supplied to the combustion chamber. The working gas circulation engine of this type includes a combustion chamber to which oxygen serving as an oxidizing agent and hydrogen serving as a fuel that is burned by the oxygen are supplied as a reacted product, and to which a working gas having a specific heat ratio higher than that of air is supplied, and a circulation path into which the working gas is circulated from an exhaust side to a suction side of the combustion chamber and again can be supplied to the combustion chamber. The working gas is caused to expand due to the combustion of the oxygen and hydrogen in the combustion chamber, whereby power is generated. Further, the working gas is basically circulated back to the combustion chamber through the circulation path without being released into the atmosphere.

As the conventional working gas circulation engine, a hydrogen engine disclosed in Patent Document 1 described below has been known, for example. In the hydrogen engine disclosed in the Patent Document 1, oxygen and hydrogen are supplied to the combustion chamber, and argon composed of a monoatomic molecule having a specific heat ratio higher than that of air is supplied into the combustion chamber as a working gas in order to enhance thermal efficiency. In the working gas circulation engine, argon is thermally expanded due to the combustion of hydrogen in the combustion chamber, which pushes down a piston to generate power.

Patent Document 1: Japanese Patent Laid-open No. 11-93681

DISCLOSURE OF INVENTION

Problem to be Solved by the Invention

In the hydrogen engine disclosed in the Patent Document 1, the circulation path or the engine body is warmed due to, for example, the repeated operation, which produces a high-load operation state. Therefore, the amount of heat generated by the combustion of oxygen and hydrogen relatively increases, so that the temperature of the gas circulated in the circulation path or the temperature of the gas in the inside of the engine body that communicates with the circulation path increases. In the hydrogen engine, the working gas having high temperature, which is discharged from the combustion chamber when the working gas is discharged from the combustion chamber is allowed to circulate from the exhaust side to the suction side of the combustion chamber and again supplied to the combustion chamber, is basically not discharged to the outside of the system from the circulation path. Accordingly, when the temperature of the gas circulated in the circulation path increases, the pressure in the circulation path or the pressure in the inside of the engine body that communicates with the circulation path and into which the working gas flows might excessively increase.

An object of the present invention is to provide a working gas circulation engine that can suppress the excessive pressure rise.

Means for Solving Problem

In order to achieve the object, a working gas circulation engine includes a combustion chamber capable of expanding a working gas having a specific heat ratio higher than that of air due to a combustion between an oxidizing agent and a fuel; a circulation path that allows the working gas to circulate from an exhaust side to a suction side of the combustion chamber and that is capable of supplying the working gas again to the combustion chamber; a feed means capable of feeding a gas in an inside of a pressure-reduction target section whose pressure is to be reduced, to an outside; and a control means that operates the feed means to feed the gas in the inside of the pressure-reduction target section to the outside, when a pressure in the inside of the pressure-reduction target section is higher than a predetermined pressure set in advance.

In the working gas circulation engine, it may be configured that the pressure-reduction target section is the circulation path whose internal pressure possibly varies according to an operation state to become higher than the predetermined pressure.

In the working gas circulation engine, it may be configured that the pressure-reduction target section is an engine-body-side pressure-reduction target section that is a space other than the combustion chamber, a suction port and an exhaust port communicating with the combustion chamber which are included in an engine body, and an internal pressure of the space possibly varies according to an operation state to become higher than the predetermined pressure.

In the working gas circulation engine, it may be configured that the engine-body-side pressure-reduction target section includes a crank chamber that is provided to a side opposite to the combustion chamber across a piston provided so as to be capable of moving reciprocally in a cylinder bore.

In the working gas circulation engine, it may be configured to further includes a storage means capable of storing a gas fed by the feed means with a pressure higher than an internal pressure of the pressure-reduction target section.

In the working gas circulation engine, it may be configured to further includes a cooling means that is provided on the circulation path and cools a gas circulating in the circulation path, wherein the feed means can feed the gas in the inside of the circulation path to the outside at the downstream side from the cooling means with respect to the direction of circulating the gas in the circulation path with the combustion chamber defined as a reference.

In the working gas circulation engine, it may be configured to further includes a removing means that is provided on the circulation path and removes the fuel in the gas generated after the combustion between the oxidizing agent and the fuel, wherein the feed means can feed a gas in the inside of the circulation path to the outside at the downstream side from the removing means with respect to the direction of circulating the gas in the circulation path with the combustion chamber defined as a reference.

In the working gas circulation engine, it may be configured to further includes a concentration detecting means that detects a concentration of the fuel in a gas in the circulation path, wherein the feed means can feed a gas in the inside of the circulation path at the downstream side from a detection position of a concentration by the concentration detecting means with respect to the direction of circulating the gas in the circulation path with the combustion chamber defined as a reference, and the control means inhibits a feed of the gas by the feed means, when the concentration of the fuel detected by the concentration detecting means is not less than a predetermined concentration set in advance.

In the working gas circulation engine, it may be configured that the feed means can feed a gas in the inside of the engine-body-side pressure-reduction target section into the inside of the circulation path.

In the working gas circulation engine, it may be configured to further includes a communication path that is provided separate from a feed passage of the feed means and connects the inside of the engine-body-side pressure-reduction target section and the inside of the circulation path in such a manner that the gas can flow therethrough; and a first preventing means that is provided on the communication path and can prevent a flow of the gas from the inside of the circulation path to the inside of the engine-body-side pressure-reduction target section.

In the working gas circulation engine, it may be configured that the feed means includes a feed passage that connects the inside and the outside of the pressure-reduction target section in such a manner that the gas can flow therethrough, an opening/closing means that is provided on the feed passage and can open and close the feed passage, and a pressure-feed means that is provided on the feed passage and applies pressure to a gas in the feed passage to feed the gas from the inside to the outside of the pressure-reduction target section.

In the working gas circulation engine, it may be configured that the feed means includes a feed passage that connects the inside and the outside of the engine-body-side pressure-reduction target section in such a manner that the gas can flow therethrough, and an adjusting means that is provided at the upstream side from a connection portion to the feed passage of the circulation path with respect to the direction of circulating the gas in the circulation path with the combustion chamber defined as a reference, and that can adjust the pressure in the circulation path, wherein the adjusting means reduces a pressure in the circulation path at the downstream side from the adjusting means so as to be capable of feeding the gas in the inside of the engine-body-side pressure-reduction target section into the inside of the circulation path.

In the working gas circulation engine, it may be configured that the adjusting means adjusts an open degree of the circulation path so as to adjust a pressure in the circulation path, and the control means controls the adjusting means so as to adjust an open degree of the circulation path on the basis of the temperature in the combustion chamber.

In the working gas circulation engine, it may be configured that the feed means is provided on the feed passage and inhibits the flow of a gas from the inside of the circulation path to the inside of the engine-body-side pressure-reduction target section.

In the working gas circulation engine, it may be configured to further includes oxidizing agent supply means that supplies the oxidizing agent to the downstream side from the adjusting means in the circulation path with respect to the direction of circulating the gas in the circulation path with the combustion chamber defined as a reference.

In the working gas circulation engine, it may be configured that the control means operates the adjusting means of the feed means, during the deceleration of a vehicle having the engine body provided with the combustion chamber mounted thereto or during a fuel-cut period in which the supply of the fuel from the fuel supply means to the combustion chamber is stopped, so as to reduce the pressure at the downstream side from the adjusting means, thereby feeding the gas in the inside of the engine-body-side pressure-reduction target section in the inside of the circulation path.

Effect of the Invention

The working gas circulation engine according to the present invention can suppress an excessive pressure rise.

BRIEF DESCRIPTION OF DRAWINGS

FIG. 21 is a flowchart explaining a control of the working gas circulation engine according to the twelfth embodiment of the present invention.

Figure 1:
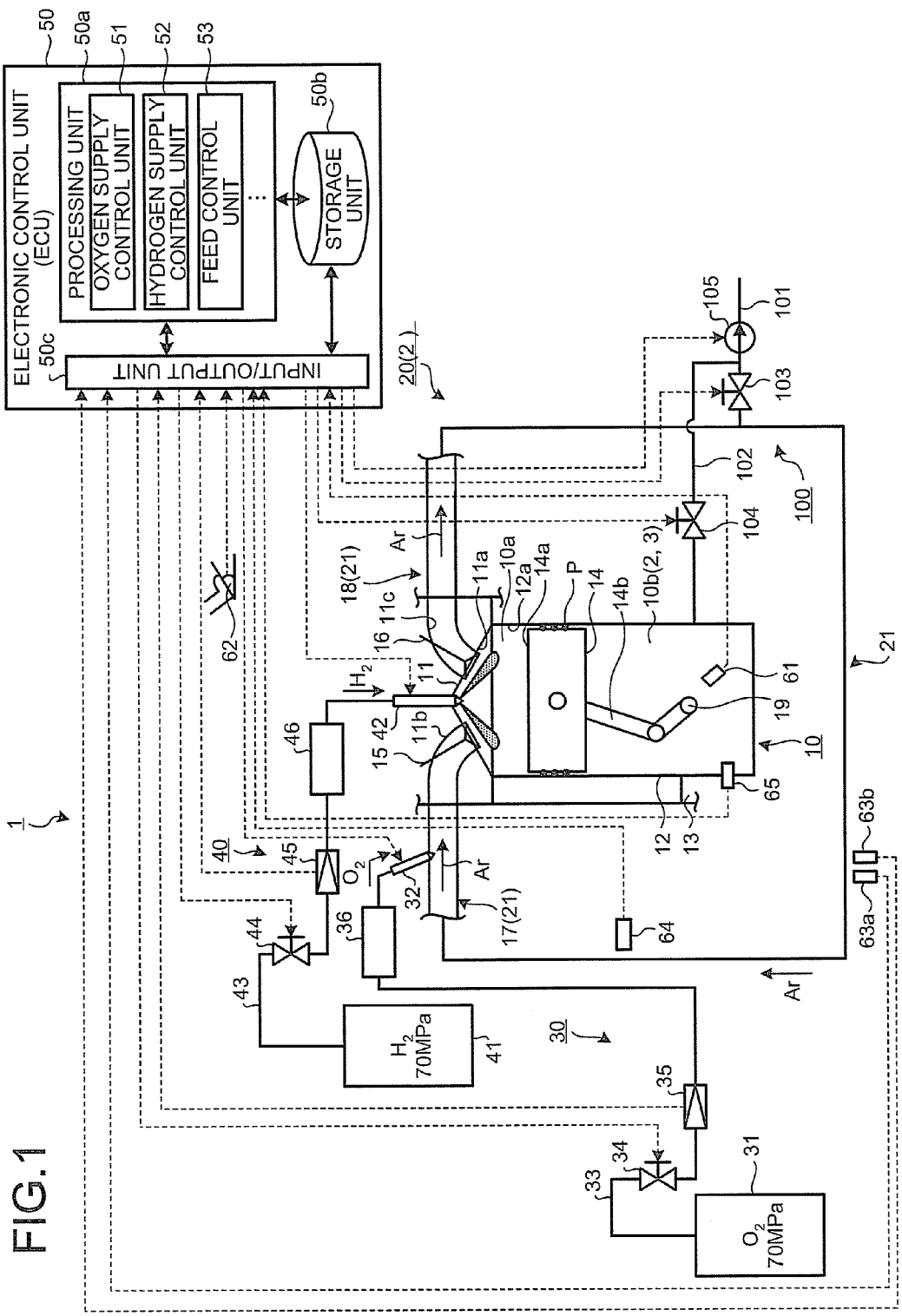
FIG. 1 is a schematic diagram of a working gas circulation engine according to a first embodiment of the present invention.

EXPLANATIONS OF LETTERS OR NUMERALS 1, 201, 301, 401, 501, 601, 701, 801, 901, 1001, 1101, 1201 working gas circulation engine
2 pressure-reduction target section
3 engine-body-side pressure-reduction target section
10 engine body
10a combustion chamber
10b crank chamber
11b suction port
11c exhaust port
12a cylinder bore
14 piston
17 suction pipe
18 exhaust pipe
20 circulation path
21 circulation passage
30 oxidizing agent supplying apparatus (oxidizing agent supply means)
31, 1132 oxidizing agent injection valve
40 fuel supplying apparatus (fuel supplying means)
50 electronic control unit
53 feed control unit (control means)
64 circulation-path internal pressure sensor
65 crank-chamber internal pressure sensor
66 storage-tank internal pressure sensor
67 hydrogen concentration sensor (concentration detecting means)
100, 300, 400, 500, 600, 800, 1000 feed apparatus (feed means)
101, 102, 611, 811 feed passage
103, 104, 602 feed on-off valve (on-off means)
105, 603 feed pump (pressure-feed means)
206 storage tank (storing means)
370 condenser (cooling means)
475 oxidizing catalyst (removing means)
776 communication path
777 communication-path on-off valve (first preventing means)
808 variable throttle valve (adjusting means)
1009 check valve (second preventing means)

BEST MODES FOR CARRYING OUT THE INVENTION

Embodiments of the working gas circulation engine according to the present invention will be described below in detail based on drawings. However, the present invention should not be limited by these embodiments. Components in embodiments below contain those components easily replaceable by those skilled in the art or substantially identical thereto.

First Embodiment

Figure 2:
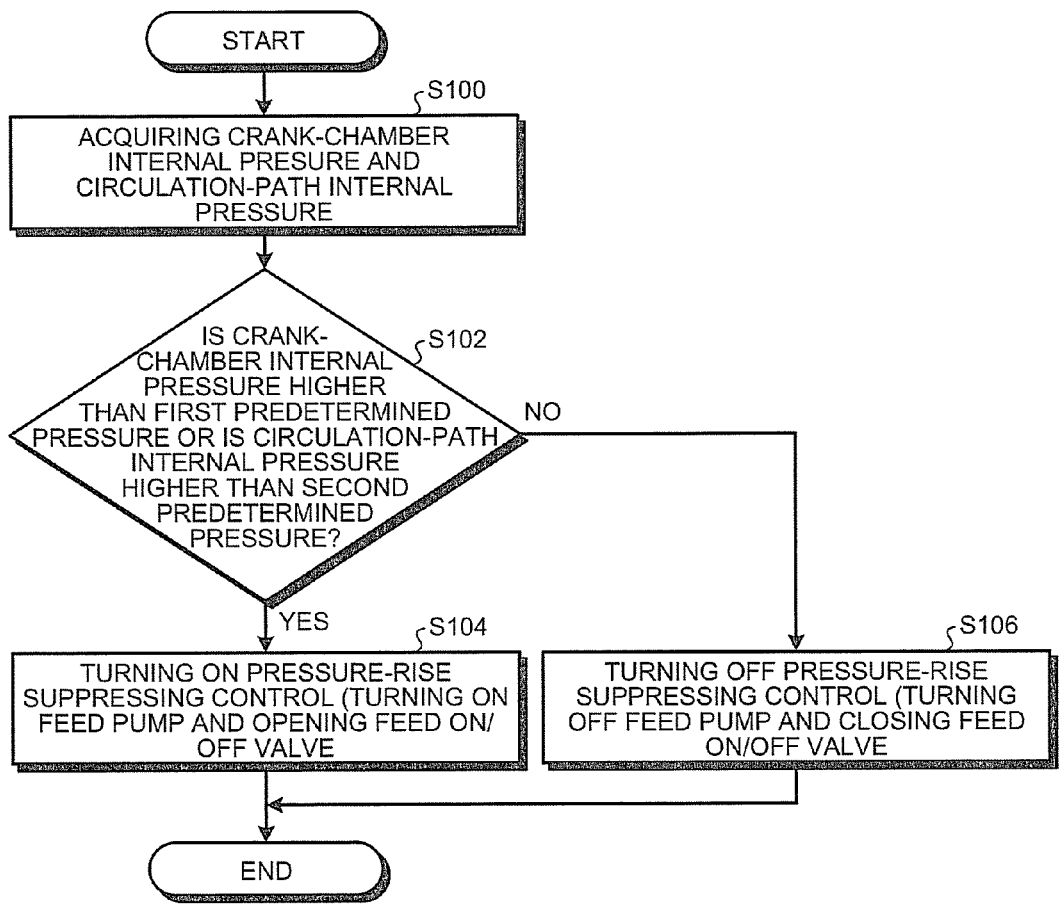
FIG. 2 is a flowchart explaining a control of the working gas circulation engine according to the first embodiment of the present invention.

FIG. 1 is a schematic diagram of a working gas circulation engine according to the first embodiment of the present invention, and FIG. 2 is a flowchart explaining a control of the working gas circulation engine according to the first embodiment of the present invention.

A working gas circulation engine 1 according to the present embodiment includes a combustion chamber 10a and a circulation path 20 as illustrated in FIG. 1. Oxygen ($O_2$) serving as an oxidizing agent, hydrogen ($H_2$) serving as a fuel, and a working gas, i.e., argon (Ar) here, which has a specific heat ratio higher than that of air and that generates power with the combustion of hydrogen, are supplied to the combustion chamber 10a. The circulation path 20 connects a suction side and an exhaust side of the combustion chamber 10a. The working gas circulation engine 1 is basically a closed-cycle engine in which the working gas is supplied again to the combustion chamber 10a through the circulation path 20 without being released to the atmosphere. The working gas circulation engine 1 burns the fuel in the combustion chamber 10a, and thermally expands the working gas due to the combustion of the fuel so as to generate power. Specifically, the working gas expands by a reaction heat that is generated with the reaction between the oxidizing agent supplied from an oxidizing agent supplying apparatus 30 and the fuel supplied from a fuel supplying apparatus 40 in the combustion chamber 10a, i.e., a combustion heat generated by the combustion (exothermal reaction) of hydrogen.

Specifically, the working gas circulation engine 1 has the combustion chamber 10a to which the oxidizing agent, the fuel burned by the oxidizing agent, and the working gas that generates power with the combustion of the fuel are supplied, and the circulation path 20 that connects the suction side and the exhaust side of the combustion chamber 10a. The working gas circulation engine 1 is basically configured such that the working gas is supplied again to the combustion chamber 10a through the circulation path 20 without being released to the atmosphere. The working gas circulation engine 1 burns the fuel in the combustion chamber 10a in order to thermally expand the working gas with the combustion of the fuel, whereby power is generated to enhance thermal efficiency.

The working gas circulation engine 1 includes an engine body 10 having the combustion chamber 10a formed therein, the circulation path 20 that connects the suction side and the exhaust side of the combustion chamber 10a, the oxidizing agent supplying apparatus 30 that supplies the oxidizing agent to the combustion chamber 10a, the fuel supplying apparatus 40 that supplies the fuel to the combustion chamber 10a, and an electronic control unit (ECU) 50 that controls the respective sections of the working gas circulation engine 1. The combustion chamber 10a in the engine body 10 and the circulation path 20 are both filled with the working gas. The working gas circulates between the combustion chamber 10a and the circulation path 20. The engine body 1 illustrated in FIG. 1 shows only one cylinder. However, the working gas circulation engine 1 according to the present invention is applicable to a multicylinder engine body 10.

The combustion chamber 10a in the present embodiment is formed in the engine body 10. The oxidizing agent, the fuel burned by the oxidizing agent, and the working gas are supplied to the combustion chamber 10a in the engine body 10. The working gas can thermally expand with the combustion of the fuel.

Specifically, the engine body 10 includes a cylinder head 11 in which the combustion chamber 10a is formed, a cylinder block 12, a crankcase 13, and a piston 14. The piston 14 is connected to a crankshaft 19 via a connecting rod 14b, and is arranged in such a manner that the piston 14 may reciprocate within a space that is defined by a wall face of a recess 11a formed in a bottom face of the cylinder head 11 and a wall face of a cylinder bore 12a of the cylinder block 12. The combustion chamber 10a is a space defined by the wall face of the recess 11a of the cylinder head 11, the wall face of the cylinder bore 12a, and a top face 14a of the piston 14.

The cylinder head 11 of the engine body 10 are fastened on the cylinder block 12, and the crankcase 13 of the engine body 10 is fastened below the cylinder block 12.

The cylinder head 11 forms the wall face of the recess 11a of the combustion chamber 10a as described above, and has formed therein a suction port 11b and an exhaust port 11c described later. The cylinder block 12 has the cylindrical cylinder bore 12a formed therein at the side of the cylinder head 11, and has a part of a crank chamber 10b formed therein at the side of the crankcase 13. The piston 14 is fitted to the cylinder bore 12a so as to be capable of moving up and down. The crankcase 13 forms a part of the crank chamber 10b.

The crank chamber 10b accommodates the above mentioned crankshaft 19 therein. The crank chamber 10b is formed by the inner wall face of the cylinder head 11, the inner wall face and the like of the crankcase 13. Specifically, the crank chamber 10b is formed by the space defined by the inner wall face of the cylinder head 11, the inner wall face of the crankcase 13, and the face opposite to the top face 14a of the piston 14. In other words, the crank chamber 10b is provided at the side opposite to the combustion chamber 10a with respect to the axial direction of the cylinder bore 12a across the piston 14 that is arranged in the cylinder bore 12a so as to be capable of reciprocating. The combustion chamber 10a and the crank chamber 10b are divided by a piston ring P provided around the piston 14.

The engine body 10 has the suction port 11b and the exhaust port 11c formed in the cylinder head 11. The suction port 11b and the exhaust port 11c form a part of the circulation path 20. One end of each of the suction port 11b and the exhaust port 11c is open to the combustion chamber 10a. The engine body 10 has a suction valve 15 formed at the opening portion of the suction port 11b at the combustion chamber 10a. The suction valve 15 opens the opening of the suction port 11b at the combustion chamber 10a side when it is opened, while closes the opening of the suction port 11b at the combustion chamber 10a side when it is closed. The engine body 10 has an exhaust valve 16 formed at the opening portion of the exhaust port 11c at the combustion chamber 10a side. The exhaust valve 16 opens the opening of the exhaust port 11c at the combustion chamber 10a side when it is opened, while closes the opening of the exhaust port 11c at the combustion chamber 10a side when it is closed.

For example, valves that are opened and closed in accordance with rotation of a camshaft (not shown) and elastic forces of elastic members (coil springs) may be used as the suction valve 15 and the exhaust valve 16. When this type of valves are used as the suction valve 15 and the exhaust valve 16, a power transmission mechanism that is formed of, for example, a chain, a sprocket or the like is provided between the camshaft and the crankshaft 19. With the power transmission mechanism, rotation of the camshaft is linked to rotation of the crankshaft. In this way, the suction valve 15 and the exhaust valve 16 are opened at prescribed opening timing and closed at prescribed closing timing. The engine body 10 may be provided with a variable valve mechanism, for example, a so-called variable valve timing and lift mechanism, which is able to change the opening timing/closing timing and the lift amounts of the suction valve 15 and the exhaust valve 16. With this structure, the opening timing/closing timing and the lift amounts of the suction valve 15 and the exhaust valve 16 may be changed appropriately based on an engine operating state. Alternatively, a so-called electromagnetically-driven valve that opens and closes the suction valve 15 and the exhaust valve 16 using an electromagnetic force may be used in the engine body 10. In this case, it is possible to obtain the same effects as those obtained by the variable valve operation mechanism.

A suction pipe 17 is connected to the opening of the suction port 11b of the engine body 10, which is at the side opposite to the combustion chamber 10a, while an exhaust pipe 18 is connected to the opening of the exhaust port 11c of the engine body 10, which is at the side opposite to the combustion chamber 10a. The suction pipe 17 and the exhaust pipe 18 form a part of the circulation path 20. The suction pipe 17 is formed into a cylinder. A fluid can pass through the suction pipe 17. As described later, the suction pipe 17 is a suction passage through which the argon (Ar) serving as the working gas and the oxygen ($O_2$) serving as the oxidizing agent are supplied to the combustion chamber 10a. Specifically, when the suction valve 15 is opened, the oxidizing agent and the working gas are supplied (sucked) to the combustion chamber 10a from the suction pipe 17 through the suction port 11b. On the other hand, the exhaust pipe 18 is formed into a cylinder. A fluid can pass through the exhaust pipe 18. As described later, the exhaust pipe 18 is an exhaust passage through which the argon (Ar) serving as the working gas and water vapor ($H_2O$) are discharged from the combustion chamber 10a as an exhaust gas after the combustion of the hydrogen ($H_2$) serving as the fuel as described later. Specifically, when the exhaust valve 16 is opened, the water vapor and the working gas are exhausted from the combustion chamber 10a through the exhaust port 11c as the exhaust gas after the combustion of the fuel.

The circulation path 20 allows the working gas contained in the exhaust gas exhausted to the exhaust pipe 18 to circulate from the exhaust side to the suction side of the combustion chamber 10a, and can supply the working gas again to the combustion chamber 10a. The circulation path 20 is formed of the suction port 11b, the exhaust port 11c, and a circulation passage 21 that connects the other end of the suction port 11b and the other end of the exhaust port 11c to each other. With this structure, a closed space is formed within the circulation path 20 and the combustion chamber 10a. The circulation passage 21 is formed into a cylinder through which a fluid can pass. The suction pipe 17 and the exhaust pipe 18 form a part of the circulation passage 21. Specifically, the circulation passage 21 is made by various passages and pipes including the suction pipe 17, the exhaust pipe 18, and the like.

In the working gas circulation engine 1, the working gas is supplied into the closed space formed by the circulation path 20 and the combustion chamber 10a, and the working gas is circulated in such a manner that the working gas is supplied from the suction pipe 17 of the circulation path 20 into the combustion chamber 10a through the suction port 11b, from the combustion chamber 10a to the circulation path 20 through the exhaust port 11c and the exhaust pipe 18, from the exhaust port 11c and the exhaust pipe 18 to the suction pipe 17 and the suction port 11b again through the circulation passage 21. In the working gas circulation engine 1, the working gas is circulated in the circulation path 20 in such a manner that the working gas passes through the suction pipe 17, the suction port 11b, the combustion chamber 10a, the exhaust port 11c, and the exhaust pipe 18 in this order, and then circulates again through the circulation passage 21 into the suction pipe 17, the suction port 11b, and the combustion chamber 10a. In other words, the circulation path 20 connects the suction side (suction port 11b side) and the exhaust side (exhaust port 11c side) of the combustion chamber 10a at the outside of the combustion chamber 10a. With the circulation path 20, the working gas is supplied again to the combustion chamber 10a without being released to the atmosphere. More specifically, both ends of the circulation path 20 communicate with the combustion chamber 10a. The exhaust gas containing water vapor and the working gas can be flown into the combustion chamber 10a from one end, while the oxidizing agent and the working gas sucked by the combustion chamber 10a can be flown out of the combustion chamber 10a from the other end. When the suction valve 15 is opened, the oxidizing agent and the working gas in the circulation passage 21 is supplied into the combustion chamber 10a through the suction pipe 17 and the suction port 11b. When the exhaust valve 16 is opened, the exhaust gas in the combustion chamber 10a is discharged to the circulation passage 21 through the exhaust port 11c and the exhaust pipe 18.

As the working gas filled in the closed space formed by the circulation path 20 and the combustion chamber 10a, gas having a specific heat ratio hither than that of air is used. For example, monatomic gas is used. The working gas used in the present embodiment has a specific heat ratio hither that that of air. For example, rare gas, such as argon (Ar), helium (He), or the like is used. In the present embodiment, argon (Ar) is used as the working gas.

The oxidizing agent supplying apparatus 30 serving as an oxidizing agent supply means supplies oxygen serving as an oxidizing agent. The oxidizing agent supplying apparatus 30 in the present embodiment supplies oxygen serving as the oxidizing agent to the combustion chamber 10a through the circulation path 20, i.e., the suction pipe 17 and the suction port 11b. The oxidizing agent supplying apparatus 30 includes an oxidizing agent storage tank 31, an oxidizing agent injection valve 32, an oxidizing agent supply passage 33, a regulator 34, an oxidizing agent flowmeter 35, and a surge tank 36.

The oxidizing agent storage tank 31 stores the oxidizing agent at high pressure. The oxidizing agent injection valve 32 injects the oxidizing agent stored in the oxidizing agent storage tank 31 to the suction pipe 17 so as to supply the oxidizing agent to the combustion chamber 10a through the suction pipe 17 and the suction port 11b. The oxidizing agent supply passage 33 connects the oxidizing agent storage tank 31 to the oxidizing agent injection valve 32. The regulator 34, the oxidizing agent flowmeter 35, and the surge tank 36 are provided on the oxidizing agent supply passage 33. The regulator 34, the oxidizing agent flowmeter 35, and the surge tank 36 are provided in the order of the regulator 34, the oxidizing agent flowmeter 35, and the surge tank 36 from the upstream side (from the oxidizing agent storage tank 31) toward the downstream side (toward the oxidizing agent injection valve 32) in the direction of supplying the oxidizing agent in the oxidizing agent supply passage 33.

The oxidizing agent injection valve 32 in the present embodiment is provided so as to be capable of injecting the oxidizing agent into the suction pipe 17. The oxidizing agent injection valve 32 is controlled by the electronic control unit 50. The oxidizing agent supplying apparatus 30 in the present embodiment can mix the oxidizing agent with the working gas passing through the suction pipe 17 through the injection of the oxidizing agent into the suction pipe 17 by the oxidizing agent injection valve 32, and can feed the resultant into the combustion chamber 10a. As a result, the oxidizing agent can be supplied to the combustion chamber 10a together with the working gas through the suction port 11b when the suction valve 15 is opened.

The regulator 34 regulates the pressure in the oxidizing agent supply passage 33 at a portion downstream of the regulator 34 (at a side of the oxidizing agent flowmeter 35) to a target pressure according to a command from the electronic control unit 50. In other words, the regulator 34 is used to control the flow rate of the oxidizing agent in the oxidizing agent supply passage 33. The oxidizing agent flowmeter 35 is a device that measures the flow rate of the oxidizing agent in the oxidizing agent supply passage 33, which is regulated by the regulator 34. A measurement signal of the oxidizing agent flowmeter 35 is transmitted to the electronic control unit 50. The surge tank 36 is provided to reduce the pulsation generated in the oxidizing agent supply passage 33 when the oxidizing agent injection valve 32 injects the oxidizing agent.

As the oxidizing agent supplied by the oxidizing agent supplying apparatus 30, oxygen ($O_2$) is used as mentioned above. Therefore, oxygen ($O_2$) is stored in the oxidizing agent storage tank 31 at high pressure such as about 70 MPa, and the oxidizing agent injection valve 32 supplies the high-pressure oxygen ($O_2$) into the circulation passage 21.

The fuel supplying apparatus 40 as a fuel supplying means supplies hydrogen serving as a fuel. The fuel supplying apparatus 40 in the present embodiment directly supplies hydrogen serving as the fuel to the combustion chamber 10a. The fuel supplying apparatus 40 includes a fuel storage tank 41, a fuel injection valve 42, a fuel supply passage 43, a regulator 44, a fuel flowmeter 45, and a surge tank 46.

The fuel storage tank 41 stores the fuel at high pressure. The fuel injection valve 42 injects the fuel stored in the fuel storage tank 41 into the combustion chamber 10a. The fuel supply passage 43 connects the fuel storage tank 41 and the fuel injection valve 42. The regulator 44, the fuel flowmeter 45, and the surge tank 46 are provided on the fuel supply passage 43. The regulator 44, the fuel flowmeter 45, and the surge tank 46 are provided in the order of the regulator 44, the fuel flowmeter 45, and the surge tank 46 from the upstream side (from the fuel storage tank 41 side) toward the downstream side (toward the fuel injection valve 42 side) in the direction of supplying the fuel in the fuel supply passage 43.

The fuel injection valve 42 in the present embodiment is provided to the cylinder head 11 so as to be capable of directly injecting the fuel into the combustion chamber 10a. The fuel injection valve 42 is controlled by the electronic control unit 50.

The regulator 44 regulates the pressure in the fuel supply passage 43 at a downstream side of the regulator 44 (at a side of the fuel flowmeter 45 and the surge tank 46) to a preset pressure. In other words, the regulator 44 is used to control the flow rate of the fuel in the fuel supply passage 43. The fuel flowmeter 45 is a device that measures the flow rate of the fuel in the fuel supply passage 43, which is regulated by the regulator 44. A measurement signal of the fuel flowmeter 45 is transmitted to the electronic control unit 50. The surge tank 46 is used to reduce pulsations generated in the fuel supply passage 43 when the fuel injection valve 42 injects the fuel.

As a fuel supplied by the fuel supplying apparatus 40, the material that is burned with the oxidizing agent is used. In the present embodiment, hydrogen ($H_2$) is used as described above. Therefore, hydrogen ($H_2$) is stored in the fuel storage tank 41 at high pressure, such as about 70 MPa, and the fuel injection valve 42 directly injects the high-pressure hydrogen into the combustion chamber 10a.

In the working gas circulation engine 1 according to the first embodiment of the present invention, hydrogen used as the fuel, and oxygen used as the oxidizing agent are supplied into the combustion chamber 10a, and diffusion combustion of the hydrogen is performed. Therefore, in this working gas circulation engine 1, high-pressure hydrogen ($H_2$) is injected into high-temperature compressed gas (oxygen ($O_2$) and argon (Ar)) formed in the combustion chamber 10a, whereby part of the hydrogen ($H_2$) self-ignites. Then, the hydrogen and the compressed gas (oxygen) are burned while being diffusively mixed together. Due to the combustion of the hydrogen, the hydrogen and the oxygen ($O_2$) bind together to form water vapor ($H_2O$) and thermal expansion of argon (Ar) that has high specific heat ratio takes place in the combustion chamber 10a. Therefore, in the working gas circulation engine 1, the piston 14 is pushed down due to the diffusion combustion of hydrogen and the thermal expansion of argon, whereby power is generated.

When the combustion of hydrogen and the thermal expansion of argon are completed (e.g. when the piston 14 is near the bottom dead center), the exhaust gas containing argon (Ar) is discharged from the combustion chamber 10a into the exhaust pipe 18 through the exhaust port 11c, when the exhaust valve 16 is opened. The discharged argon (Ar) needs to be circulated back to the combustion chamber 10a through the circulation path 20 so that the thermal efficiency of the engine body 10 is enhanced. However, the water vapor that is discharged together with the argon has molecules composed of three atoms (three atom molecules) and has lower specific heat ratio than that of argon composed of single atoms. Therefore, if the water vapor is circulated back to the combustion chamber 10a together with the argon, the thermal efficiency of the engine body 10 may be degraded. Therefore, the working gas circulation engine 1 has means for removing water vapor (not illustrated) contained in an exhaust gas provided on the circulation path 20. The water vapor ($H_2O$) in the exhaust gas is separated from the exhaust gas by various components, and discharged to the outside of the circulation path 20.

In the working gas circulation engine 1 thus configured, argon having a greater specific heat ratio is thermally expanded due to the combustion of the hydrogen in the combustion chamber 10a, so that the piston 14 is pushed down. Since the piston 14 repeats the reciprocating movement in the cylinder bore 12a, one cycle including a suction stroke, compression stroke, combustion stroke, and exhaust stroke, is performed. This cycle is repeated. The reciprocating movement of the piston 14 is transmitted to the crankshaft 19 by the connecting rod 14b. The reciprocating movement is converted into a rotating movement by the action of the connecting rod 14b and the crankshaft 19, whereby the crankshaft 19 rotates.

Since the suction valve 15 or the exhaust valve 16 makes a reciprocating movement with the rotation of the crankshaft 19, which makes a communication between the circulation path 20 and the combustion chamber 10a or cuts the communication therebetween, the working gas circulation engine 1 makes a suction operation and exhaust operation, and repeats the above-mentioned four strokes.

Specifically, in the suction stroke, the suction valve 15 is opened, and the exhaust valve 16 is closed. Further, the piston 14 moves from the top dead center toward the bottom dead center. Accordingly, the oxygen and argon are sucked into the combustion chamber 10a through the suction port 11b of the circulation path 20.

Then, in the compression stroke, the suction valve 15 is closed, so that the suction valve 15 and the exhaust valve 16 are both closed. Further, the piston 14 moves from the bottom dead center toward the top dead center. Accordingly, the oxygen and argon in the combustion chamber 10a are compressed, whereby temperature rises.

Next, in the combustion stroke, high-pressure hydrogen is injected into the high-temperature compressed gas (oxygen and argon) formed in the combustion chamber 10a, whereby part of the hydrogen self-ignites. Then, the hydrogen and the compressed gas (oxygen) are burned while being diffusively mixed together. Due to the combustion of the hydrogen, thermal expansion of argon that has high specific heat ratio takes place in the combustion chamber 10a. Therefore, in the working gas circulation engine 1, the piston 14 is pushed down due to the diffusion combustion of hydrogen and the thermal expansion of argon, whereby power is generated.

Then, in the exhaust stroke, the suction valve 15 keeps closed, and the exhaust valve 16 is opened. The piston 14 moves from the bottom dead center toward the top dead center. Accordingly, the exhaust gas containing water vapor and argon is discharged to the exhaust pipe 18 from the combustion chamber 10a through the exhaust port 11c of the circulation path 20.

When the exhaust gas containing water vapor and argon is discharged from the combustion chamber 10a to the circulation path 20, and the exhaust gas is circulated in the circulation path 20 toward the combustion chamber 10a, the water vapor in the exhaust gas is liquefied and compressed, and separated. Thus, in the working gas circulation engine 1, the water vapor having a small specific heat ratio is not supplied to the combustion chamber 10a, but the argon having a great specific heat ratio and serving as the working gas is again supplied to the combustion chamber 10a. Therefore, the engine operation having high thermal efficiency can be performed with the use of the working gas.

During this process, the electronic control unit 50 controls the supply amount of the oxygen, serving as the oxidizing agent, from the oxidizing agent supplying apparatus 30 and the supply amount of hydrogen, serving as the fuel, from the fuel supplying apparatus 40, according to the operation condition such as the rotating position of the crankshaft 19, an accelerator opening, which is an operation amount of an accelerator pedal (not shown) provided to a driver seat of a vehicle, and remaining amount of hydrogen or oxygen in the circulation path.

Specifically, the electronic control unit 50 is provided with an oxygen supply control unit 51 and a hydrogen supply control unit 52, in a functional conception. The electronic control unit 50 is further electrically connected to various sensors including a crank angle sensor 61, an accelerator opening sensor 62, a hydrogen concentration sensor 63a, and an oxygen concentration sensor 63b.

The electronic control unit 50 is composed primarily of a known microcomputer including a processing unit 50a, a storage unit 50b, and an input/output unit 50c. These units are connected to one another, so that signals are received and transmitted. Unillustrated driving circuits for driving the respective parts of the vehicle including the working gas circulation engine 1 and the above-mentioned various sensors are connected to the input/output unit 50c. The input/output unit 50c inputs signals to these sensors or outputs signals to these sensors. The storage unit 50b has stored therein a computer program that controls the respective parts of the working gas circulation engine 1. The storage unit 50b can be composed of a hard disk device, magnetic optical disk device, non-volatile memory such as a flash memory (a read-only storage medium such as CD-ROM), volatile memory such as RAM (Random Access Memory), or a combination thereof. The processing unit 50*a* is composed of an unillustrated memory and CPU (Central Processing Unit) and includes at least the oxygen supply control unit 51 and the hydrogen supply control unit 52. The processing unit 50*a* reads the computer program into the memory incorporated into the processing unit 50*a*, makes a calculation, and sends a control signal according to the calculation, whereby the electronic control unit 50 executes various controls. In this case, the processing unit 50*a* stores the numerical value, which is obtained during the calculation, to the storage unit 50*b*, and takes out the stored numerical value to execute the calculation. When the respective parts of the working gas circulation engine 1 are controlled, a dedicated hardware, which is different from the electronic control unit 50, may be used for control instead of the computer program.

The crank angle sensor 61 detects the crank angle, which is the rotation angle of the crankshaft 19 of the working gas circulation engine 1. The crank angle sensor 61 transmits the detection signal to the electronic control unit 50. The electronic control unit 50 determines the suction stroke, compression stroke, expansion stroke, and exhaust stroke in each cylinder on the basis of the detected crank angle, and calculates the engine speed (rpm) as a rotational speed of the working gas circulation engine 1. The engine speed corresponds to the rotational speed of the crankshaft 19. When the rotational speed of the crankshaft 19 increases, the engine speed, which is the rotational speed of the crankshaft 19, also increases.

The accelerator opening sensor 62 is provided to an accelerator pedal (not shown) of the vehicle, and detects an accelerator opening degree corresponding to an operation amount of the accelerator pedal (not shown). The accelerator opening sensor 62 transmits a detection signal to the electronic control unit 50. The accelerator opening detected by the accelerator opening sensor 62 is a value in accordance with a required engine load (required load ratio) required by a driver to the working gas circulation engine 1.

The hydrogen concentration sensor 63*a* detects a concentration of hydrogen in the circulation gas circulating in the circulation path 20. The oxygen concentration sensor 63*b* detects the concentration of oxygen in the circulation gas circulating in the circulation path 20. The hydrogen concentration sensor 63*a* and the oxygen concentration sensor 63*b* transmit the respective detection signals to the electronic control unit 50.

The electronic control unit 50 controls the supply amount (injection amount) of oxygen or hydrogen and the supply timing (injection timing) from the oxidizing agent supplying apparatus 30 or the fuel supplying apparatus 40 in accordance with the operation state including the required engine load (required load ratio) required by a driver to the working gas circulation engine 1 or the engine speed, on the basis of the detection signals from the crank angle sensor 61 and the accelerator opening sensor 62. The required engine load required by the driver to the working gas circulation engine 1 is set based upon the accelerator opening of the vehicle having mounted thereto the working gas circulation engine 1. The electronic control unit 50 determines the supply amount of hydrogen and oxygen by which the required engine load can be obtained in the current engine speed, on the basis of the required engine load (required load ratio) and the current engine speed of the working gas circulation engine 1.

The exhaust gas exhausted from the combustion chamber 10*a* may contain not only water vapor and argon but also hydrogen or oxygen. For example, when the supply amount of hydrogen to the combustion chamber 10*a* is greater than a predetermined amount with respect to oxygen, unburned hydrogen remains, and discharged into the circulation path 20. On the other hand, when the supply amount of oxygen to the combustion chamber 10*a* is greater than a predetermined amount with respect to hydrogen, oxygen remains, and discharged into the circulation path 20. Therefore, the hydrogen and oxygen in the exhaust gas flow in the circulation path 20 with the argon. Accordingly, the hydrogen and oxygen in the exhaust gas circulate in the circulation path 20, and are supplied again into the combustion chamber 10*a*, like the argon.

In view of this, in the working gas circulation engine 1, the amount of hydrogen and oxygen in the gas (circulation gas) circulating in the circulation path 20 from the exhaust side to the suction side is detected, and the supply amount of the hydrogen from the fuel supplying apparatus 40 or the supply amount of the oxygen from the oxidizing agent supplying apparatus 30 is adjusted when the timing of the arrival of the hydrogen or the oxygen to the combustion chamber 10*a* has come. By virtue of this, the working gas circulation engine 1 can prevent the excessive hydrogen or oxygen in the combustion chamber 10*a*.

For example, the electronic control unit 50 grasps the remaining amount of the hydrogen or oxygen in the circulation gas on the basis of the detection signals from the hydrogen concentration sensor 63*a* and the oxygen concentration sensor 63*b*. The electronic control unit 50 controls the supply amount of the oxygen or hydrogen from the oxidizing agent supplying apparatus 30 or the fuel supplying apparatus 40, when the timing of the arrival of the hydrogen and oxygen to the combustion chamber 10*a* has come.

The oxygen supply control unit 51 controls the drive of the oxidizing agent supplying apparatus 30. The hydrogen supply control unit 52 controls the drive of the fuel supplying apparatus 40. As described above, the oxygen supply control unit 51 and the hydrogen supply control unit 52 control the supply amount (injection amount) of oxygen or hydrogen and the supply timing (injection timing) from the oxidizing agent supplying apparatus 30 or the fuel supplying apparatus 40 in accordance with the operation state including the required engine load (required load ratio), the engine speed, and the remaining amount of the hydrogen and oxygen in the circulation gas, on the basis of the detection signals from various sensors.

In the working gas circulation engine 1, the circulation path 20 or the engine body 10 is warmed due to the repeated operation, which produces a high-load operation state. Therefore, the amount of heat generated by the combustion of oxygen and hydrogen relatively increases, so that the temperature of the gas circulated in the circulation path or the temperature of the gas in the engine body that communicates with the circulation path increases. In the working gas circulation engine 1, the working gas having high temperature, which is discharged from the combustion chamber 10*a* when the working gas discharged from the combustion chamber 10*a* is allowed to circulate from the exhaust side to the suction side of the combustion chamber 10*a* and again supplied to the combustion chamber 10*a*, is basically not discharged to the outside of the system from the circulation path 20. Accordingly, when the temperature of the gas circulated in the circulation path 20 increases, the pressure in the circulation path 20 or the pressure in the engine body 10 that communicates with the circulation path 20 and into which the working gas flows might excessively increase.

The excessive rise in the pressure in the circulation path 20 or in the engine body 10 might cause a sharp rise of the pressure in the combustion chamber 10*a*, or the unintentional leakage of the working gas from the joint portion of the various pipes such as the suction pipe 17 and the exhaust pipe 18 constituting the circulation passage 21 of the circulation path 20 or from the joint portion of the cylinder head 11, the cylinder block 12 and the crankcase 13 constituting the engine body 10. The excessive rise in the pressure in the circulation path 20 or in the engine body 10 might also deteriorate durability of the various pipes such as the suction pipe 17 and the exhaust pipe 18 constituting the circulation passage 21 of the circulation path 20 or components constituting the engine body 10, such as the cylinder head 11, the cylinder block 12 and the crankcase 13. With respect to the excessive pressure rise in the circulation path 20 or in the engine body 10, the pressure resistance strength of the various pipes such as the suction pipe 17 and the exhaust pipe 18, and pressure resistance strength of the components constituting the engine body 10, such as the cylinder head 11, the cylinder block 12, and the crankcase 13, can be increased to secure the pressure resistance property. However, this measure brings the increase in size and weight of the working gas circulation engine 1, which deteriorates the mounting property to the vehicle.

In view of this, in the working gas circulation engine 1 according to the present embodiment, a feed control unit 53 serving as a control means operates a feed apparatus 100 serving as a feed means for feeding the gas in a pressure-reduction target section 2, when the pressure in the inside of the pressure-reduction target section 2 is higher than a predetermined pressure set in advance, as illustrated in FIG. 1. Thus, the excessive pressure rise can be prevented.

The pressure-reduction target section 2 is the target section where the pressure is to be reduced in the working gas circulation engine 1. The pressure-reduction target section 2 is a space where the internal pressure varies in accordance with the operation state of the working gas circulation engine 1 to become higher than the predetermined pressure. The pressure-reduction target section 2 in the present embodiment includes the circulation path 20 and an engine-body-side pressure-reduction target section 3.

The circulation path 20 allows the working gas, which is exhausted from the combustion chamber 10a, to circulate from the exhaust side to the suction side of the combustion chamber 10a, and then, can supply the working gas again to the combustion chamber 10a. In the present embodiment, the circulation path 20 is the section whose pressure is to be reduced in the working gas circulation engine 1. Specifically, the circulation path 20 is the space where the internal pressure may vary in accordance with the operation state of the working gas circulation engine 1 to become higher than the predetermined pressure. When the temperature of the working gas increases, for example, the internal pressure of the circulation path 20 might vary in accordance with the operation state.

The engine-body-side pressure-reduction target section 3 is the section whose pressure is to be reduced in the engine body 10 in the working gas circulation engine 1. Specifically, the engine-body-side pressure-reduction target section 3 is the space into which the working gas in the inside of the engine body 10 may flow. More specifically, the engine-body-side pressure-reduction target section 3 is the internal space other than the combustion chamber 10a, the suction port 11b, and the exhaust port 11c in the engine body 10, and it is the space where the internal pressure might vary in accordance with the operation state to become higher than the predetermined pressure. The engine-body-side pressure-reduction target section 3 in the present embodiment is configured to include the crank chamber 10b in the crankcase 13. The working gas might flow in the crank chamber 10b with a blow-by gas (unburned gas) from the combustion chamber 10a through the gap between the cylinder bore 12a and the piston ring P. Due to the working gas flowing into the crank chamber 10b, the internal pressure might vary according to the operation state. Further, when the temperature of the working gas increases, the internal pressure might vary according to the operation state.

The engine-body-side pressure-reduction target section 3 in the present embodiment is an internal space of the cylinder head 11 other than the suction port 11b and the exhaust port 11c, for example, it may include the space in which the cam shaft or elastic member, which are mechanisms for operating the suction valve 15 and the exhaust valve 16, are arranged, and an internal space of an unillustrated chain cover in which a chain or sprocket looped around the cam shaft and the crankshaft 19 is arranged. In the description below, the engine-body-side pressure-reduction target section 3 is the crank chamber 10b in the crankcase 13.

The working gas circulation engine 1 according to the present embodiment is provided with the feed apparatus 100 as described above. The working gas circulation engine 1 is provided with the feed control unit 53 in the processing unit 50a of the electronic control unit 50 in a functional concept.

The feed apparatus 100 can feed the gas (mainly, the working gas) in the pressure-reduction target section 2 to the outside. The feed apparatus 100 feeds the gas from the pressure-reduction target section 2 to the outside in accordance with the operation state, so that the gas is forcibly exhausted to the outside from the pressure-reduction target section 2. Accordingly, the feed apparatus 100 can reduce the pressure in the pressure-reduction target section 2. The feed apparatus 100 in the present embodiment feeds the gas in the pressure-reduction target section 2, i.e., in the circulation path 20 and in the crank chamber 10b, which forms the engine-body-side pressure-reduction target section 3, whereby the pressure in the circulation path 20 and the pressure in the crank chamber 10b, which forms the engine-body-side pressure-reduction target section 3, can be reduced.

Specifically, the feed apparatus 100 in the present embodiment includes feed passages 101 and 102, feed on-off valves 103 and 104 serving as an opening/closing means, and a feed pump 105 serving as a pressure-feed means.

The feed passage 101 connects the inside of the circulation path 20, which is the pressure-reduction target section 2, and the outside thereof in such a manner that the gas can flow therein. The feed passage 101 is composed of, for example, a passage pipe. One end of the feed passage 101 is open to the inside of the circulation path 20, i.e., open to the inside of the passage pipe constituting the circulation passage 21, while the other end is open to the outside (for example, atmosphere) of the passage pipe constituting the circulation passage 21.

The feed passage 102 connects the inside of the crank chamber 10b that forms the engine-body-side pressure-reduction target section 3, which is the pressure-reduction target section 2, and the outside thereof in such a manner that the gas can flow therein. The feed passage 102 is composed of, for example, a passage pipe. One end of the feed passage 102 is open to the inside of the crank chamber 10b, while the other end is connected to the feed passage 101. Specifically, the feed passage 102 connects the inside and the outside (for example, atmosphere) of the crank chamber 10b through the feed passage 101.

The feed on-off valve 103 is provided on the feed passage 101, and can open and close the feed passage 101. Here, the feed on-off valve 103 is provided on the feed passage 101 at the portion between the joint portion of the feed passage 102 and the end portion at the side of the circulation passage 21. When the feed on-off valve 103 is closed, it closes the feed passage 101 so as to cut the circulation of the gas in the feed passage 101. When the feed on-off valve 103 is opened, it opens the feed passage 101 so as to allow the circulation of the gas in the feed passage 101. The feed on-off valve 103 is controlled by the electronic control unit 50.

The feed on-off valve 104 is provided on the feed passage 102, and can open and close the feed passage 102. Here, the feed on-off valve 104 is provided on the feed passage 102 at the portion between the joint portion of the feed passage 101 and the end portion at the side of the crank chamber 10b. When the feed on-off valve 104 is closed, it closes the feed passage 102 so as to cut the circulation of the gas in the feed passage 102. When the feed on-off valve 104 is opened, it opens the feed passage 102 so as to allow the circulation of the gas in the feed passage 102. The feed on-off valve 104 is controlled by the electronic control unit 50.

The feed pump 105 is provided on the feed passage 101. The feed pump 105 pressurizes the gas in the feed passages 101 and 102 so as to pressure-feed the gas from the inside to the outside of the pressure-reduction target section 2. The feed pump 105 is provided at the portion between the joint portion of the feed passage 102 and the end portion at the outer side (for example, atmosphere) of the circulation path 20.

When the feed pump 105 is driven with the feed on-off valve 103 and the feed on-off valve 104 opened, the feed pump 105 sucks the gas in the inside of the circulation path 20 and the gas in the inside of the crank chamber 10b toward the feed passages 101 and 102, and can pressure-feed the gas to the outside of the circulation path 20 and the crank chamber 10b, here the atmosphere, through the feed passages 101 and 102. The feed pump 105 is controlled by the electronic control unit 50.

The feed control unit 53 controls the drive of the feed apparatus 100. Specifically, the feed control unit 53 controls the drive of the feed on-off valve 103, the feed on-off valve 104, and the feed pump 105 of the feed apparatus 100. When the internal pressure in the inside of the pressure-reduction target section 2 is higher than the predetermined pressure, the feed control unit 53 operates the feed apparatus 100 for feeding the gas in the inside of the pressure-reduction target section 2 to the outside. Specifically, when the internal pressure in the inside of the pressure-reduction target section 2 is higher than the predetermined pressure, the feed control unit 53 opens the feed on-off valves 103 and 104, and drives the feed pump 105. Thus, the feed control unit 53 feeds the gas in the inside of the pressure-reduction target section 2 to the outside through the feed passages 101 and 102.

The working gas circulation engine 1 according to the present embodiment is configured to include the circulation path 20 and the crank chamber 10b that forms the engine-body-side pressure-reduction target section 3, as a plurality of pressure-reduction target sections 2. When there is a plurality of pressure-reduction target sections 2 as in the present embodiment, it is preferable that the predetermined pressure by the feed control unit 53 is set to each of the respective pressure-reduction target sections 2. As the predetermined pressure set in advance, the feed control unit 53 employs a first predetermined pressure for the crank chamber 10b that forms the engine-body-side pressure-reduction target section 3, which is the pressure-reduction target section 2, and a second predetermined pressure for the circulation path 20 that is the pressure-reduction target section 2. The first predetermined pressure is set in advance on the basis of the pressure resistance strength of the components constituting the crank chamber 10b, such as the crankcase 13. For example, the first predetermined pressure is set such that a predetermined margin is given to the allowable internal pressure for the component adapted to the crankcase 13. The second predetermined pressure is set in advance on the basis of the pressure resistance strength of the passage pipes constituting the circulation passage 21 of the circulation path 20, such as the suction pipe 17 and the exhaust pipe 18. For example, the second predetermined pressure is set such that a predetermined margin is given to the allowable internal pressure for the passage pipe adapted to the circulation passage 21.

The working gas circulation engine 1 according to the present embodiment is further provided with a circulation-path internal pressure sensor 64 serving as a detecting means for detecting the pressure in the circulation path 20, and a crank-chamber internal pressure sensor 65 serving as a detecting means for detecting the pressure in the crank chamber 10b that forms the engine-body-side pressure-reduction target section 3. The circulation-path internal pressure sensor 64 detects the pressure in the circulation path 20 that is the pressure-reduction target section 2. The crank-chamber internal pressure sensor 65 detects the pressure in the crank chamber 10b that forms the engine-body-side pressure-reduction target section 3, which is the pressure-reduction target section 2. The circulation-path internal pressure sensor 64 and the crank-chamber internal pressure sensor 65 transmit the respective detection signals to the electronic control unit 50.

The feed control unit 53 determines whether the pressure in the pressure-reduction target section 2 is higher than the predetermined pressure or not on the basis of the detection signals from the circulation-path internal pressure sensor 64 and the crank-chamber internal pressure sensor 65. The feed control unit 53 controls the drive of the feed apparatus 100 for feeding the gas in the pressure-reduction target section 2 to the outside on the basis of the result of the determination.

As a result, when the pressure in the inside of the pressure-reduction target section 2 is higher than the predetermined pressure, the feed control unit 53 operates the feed apparatus 100 for feeding the gas in the inside of the pressure-reduction target section 2 to the outside, whereby the pressure in the pressure-reduction target section 2, i.e., the pressure in the circulation path 20 and the pressure in the inside of the crank chamber 10b that forms the engine-body-side pressure-reduction target section 3, can be reduced. Accordingly, the working gas circulation engine 1 can positively suppress the excessive pressure rise in the circulation path 20 and in the crank chamber 10b that forms the engine-body-side pressure-reduction target section 3. Specifically, even if the temperature of the working gas exhausted from the combustion chamber 10a and circulating in the circulation path 20 or the temperature of the working gas in the crank chamber 10b is increased to increase the pressure in the circulation path 20 or in the crank chamber 10b, since the circulation path 20 or the engine body 10 is warmed, or the amount of heat generated by the combustion of oxygen and hydrogen relatively increases due to the high-load operation state, the feed control unit 53 operates the feed apparatus 100 for feeding the gas in the pressure-reduction target section 2 to the outside, when the pressure in the inside of the circulation path 20 or in the inside of the crank chamber 10b becomes higher than the predetermined pressure. Accordingly, the working gas circulation engine 1 can suppress the excessive pressure rise in the inside of the circulation path 20 and the crank chamber 10b that forms the engine-body-side pressure-reduction target section 3, those of which are the pressure-reduction target section 2.

Since the working gas circulation engine 1 according to the present embodiment can suppress the excessive pressure rise in the circulation path 20 and the crank chamber 10b that forms the engine-body-side pressure-reduction target section 3, it can suppress the sharp pressure rise in the combustion chamber 10a, for example. Therefore, the working gas circulation engine 1 can suppress the unintentional leakage of the working gas from the various passage pipes constituting the circulation passage 21 of the circulation path 20, such as the suction pipe 17 and the exhaust pipe 18, or from the joint portion of the cylinder head 11, the cylinder block 12, and the crankcase 13 that constitute the engine body 10.

Since the working gas circulation engine 1 according to the present embodiment can suppress the excessive pressure rise in the circulation path 20 and the crank chamber 10b that forms the engine-body-side pressure-reduction target section 3, those of which are the pressure-reduction target section 2, it can suppress the deterioration in the durability of the various passage pipes constituting the circulation passage 21 of the circulation path 20, such as the suction pipe 17 and the exhaust pipe 18, or the components constituting the engine body 10, such as the cylinder head 11, the cylinder block 12, and the crankcase 13.

Since the working gas circulation engine 1 according to the present embodiment can suppress the excessive pressure rise in the circulation path 20 and the crank chamber 10b that forms the engine-body-side pressure-reduction target section 3, those of which are the pressure-reduction target section 2, it has no need to secure the pressure resistance property by increasing the pressure resistance strength of the various passage pipes constituting the circulation passage 21 of the circulation path 20, such as the suction pipe 17 and the exhaust pipe 18, or the components constituting the engine body 10, such as the cylinder head 11, the cylinder block 12, and the crankcase 13. Therefore, the increase in size and weight of the working gas circulation engine 1 can be prevented, whereby the deterioration in the mounting property to the vehicle can be prevented.

The control of the working gas circulation engine 1 according to the present embodiment will be described with reference to the flowchart in FIG. 2. The control routine is repeatedly executed in a control period of several milliseconds to several tens milliseconds.

First, the feed control unit 53 in the electronic control unit 50 acquires the crank-chamber internal pressure, which is the current pressure in the crank chamber 10b, and the circulation-path internal pressure, which is the current pressure in the circulation path 20, on the basis of the detection signals from the circulation-path internal pressure sensor 64 and the crank-chamber internal pressure sensor 65 (S100).

Then, the feed control unit 53 compares the crank-chamber internal pressure and the circulation-path internal pressure acquired at step S100 and the first predetermined pressure and the second predetermined pressure, and determines whether the crank-chamber internal pressure is higher than the first predetermined pressure or not or whether the circulation-path internal pressure is higher than the second predetermined pressure or not (S102).

When the feed control unit 53 determines that the crank-chamber internal pressure is higher than the first predetermined pressure or that the circulation-path internal pressure is higher than the second predetermined pressure (S102: Yes), it turns ON a pressure-rise suppressing control (S104). Then, the feed control unit 53 ends the current control cycle, and moves to the next control cycle. In this case, the feed control unit 53 opens the feed on-off valve 103 and the feed on-off valve 104, and turns ON the feed pump 105 in order to turn ON the pressure-rise suppressing control. Accordingly, the feed control unit 53 feeds the gas in the circulation path 20 and the crank chamber 10b that forms the engine-body-side pressure-reduction target section 3, those of which are the pressure-reduction target section 2, to the outside through the feed passages 101 and 102.

When the feed control unit 53 determines that the crank-chamber internal pressure is not more than the first predetermined pressure, and the circulation-path internal pressure is not more than the second predetermined pressure (S102: No), it turns OFF the pressure-rise suppressing control (S106). Then, the feed control unit 53 ends the current control cycle, and moves to the next control cycle. In this case, the feed control unit 53 closes the feed on-off valve 103 and the feed on-off valve 104, and stops (turns OFF) the feed pump 105 in order to turn OFF the pressure-rise suppressing control. Accordingly, the feed control unit 53 stops the feed of the gas in the circulation path 20 and the crank chamber 10b that forms the engine-body-side pressure-reduction target section 3, those of which are the pressure-reduction target section 2. Since the feed on-off valve 103 and the feed on-off valve 104 are closed, the flowback of the gas from the outside to the inside of the circulation path 20 or the crank chamber 10b that forms the engine-body-side pressure-reduction target section 3 can be prevented.

When the feed control unit 53 determines that the crank-chamber internal pressure is higher than the first predetermined pressure, and the circulation-path internal pressure is not more than the second predetermined pressure, it may close the feed on-off valve 103, open the feed on-off valve 104, and drive (ON) the feed pump 105, whereby the pressure-rise suppressing control may be turned ON. Accordingly, the gas in the crank chamber 10b that forms the engine-body-side pressure-reduction target section 3, which is the pressure-reduction target section 2, may be fed to the outside through the feed passage 102 and the feed passage 101 successively. Similarly, when the feed control unit 53 determines that the crank-chamber internal pressure is not more than the first predetermined pressure, and the circulation-path internal pressure is higher than the second predetermined pressure, it may open the feed on-off valve 103, close the feed on-off valve 104, and drive (ON) the feed pump 105, whereby the pressure-rise suppressing control may be turned ON. Accordingly, the gas in the circulation path 20, which is the pressure-reduction target section 2, may be fed to the outside through the feed passage 101.

The working gas circulation engine 1 according to the embodiment of the present invention includes the combustion chamber 10a in which a working gas, which has a specific heat ratio higher than that of the air, can be expanded with the combustion of oxygen, serving as an oxidizing agent, and hydrogen, serving as a fuel; the circulation path 20 that allows the working gas to circulate from the exhaust side to the suction side of the combustion chamber 10a and can supply the working gas again to the combustion chamber 10a; the feed apparatus 100 that can feed the gas in the pressure-reduction target section 2, which is the section whose pressure is to be reduced, to the outside; and the feed control unit 53 that operates the feed apparatus 100 for feeding the gas in the pressure-reduction target section 2 to the outside, when the gas in the pressure-reduction target section 2 is higher than the predetermined pressure that is set in advance.

Accordingly, when the pressure in the inside of the pressure-reduction target section 2 is higher than the predetermined pressure, the feed control unit 53 in the working gas circulation engine 1 operates the feed apparatus 100 so as to forcibly feed the gas in the inside of the pressure-reduction target section 2 to the outside. Consequently, the pressure in the inside of the pressure-reduction target section 2 can be reduced. As a result, the excessive pressure rise in the inside of the pressure-reduction target section 2 can be suppressed.

According to the working gas circulation engine 1 according to the embodiment of the present invention, the pressure-reduction target section 2 is the space except for the combustion chamber 10*a*, the suction port 11*b*, and the exhaust port 11*c* of the engine body 10 that includes the combustion chamber 10*a* and the suction port 11*b* and the exhaust port 11*c* communicating with the combustion chamber 10*a*, i.e., the engine-body-side pressure-reduction target section 3 that is the space where the internal pressure might vary according to the operation state to become higher than the predetermined pressure. Therefore, when the internal pressure in the engine-body-side pressure-reduction target section 3, which is the pressure-reduction target section 2, is higher than the first predetermined pressure that is set in advance, the feed control unit 53 in the working gas circulation engine 1 operates the feed apparatus 100 so as to forcibly feed the gas in the inside of the engine-body-side pressure-reduction target section 3 to the outside. Accordingly, the excessive pressure rise in the inside of the engine-body-side pressure-reduction target section 3 can be suppressed.

In the working gas circulation engine 1 according to the embodiment of the present invention, the engine-body-side pressure-reduction target section 3 includes the crank chamber 10*b*, which is provided at the side opposite to the combustion chamber 10*a* across the piston 14 that is arranged in the cylinder bore 12*a* so as to be capable of making a reciprocating movement. Therefore, the working gas circulation engine 1 can suppress the excessive pressure rise in the crank chamber 10*b* that forms the engine-body-side pressure-reduction target section 3.

In the working gas circulation engine 1 according to the embodiment of the present invention, the pressure-reduction target section 2 is the circulation path 20 whose internal pressure might vary according to the operation state to become higher than the predetermined pressure. Therefore, when the internal pressure in the circulation path, which is the pressure-reduction target section 2, is higher than the second predetermined pressure, which is set in advance, the feed control unit 53 in the working gas circulation engine 1 operates the feed apparatus 100 so as to forcibly feed the gas in the circulation path 20 to the outside. Accordingly, the excessive pressure rise in the circulation path 20 can be suppressed.

In the working gas circulation engine 1 according to the embodiment of the present invention, the feed apparatus 100 includes the feed passages 101 and 102 that connect the inside and the outside of the pressure-reduction target section 2 in such a manner that a gas can pass therethrough; the feed on-off valves 103 and 104 that are provided at the feed passages 101 and 102 and can open and close the feed passages 101 and 102; and the feed pump 105 that is provided at the feed passage 101 and pressurizes the gas in the feed passages 101 and 102 so as to pressure-feed the same from the inside to the outside of the pressure-reduction target section 2. Therefore, when the feed on-off valves 103 and 104 of the feed apparatus 100 are opened and the feed pump 105 of the feed apparatus 100 is driven, the working gas circulation engine 1 can suck the gas in the inside of the pressure-reduction target section 2 to the feed passages 101 and 102 so as to forcibly feed the same to the outside of the pressure-reduction target section 2 through the feed passages 101 and 102.

It is described that the working gas circulation engine 1 described above has the feed apparatus 100 that is the common feed means for the circulation path 20 and the engine-body-side pressure-reduction target section 3, those of which are the pressure-reduction target sections 2. However, the feed means for the circulation path 20, which is the pressure-reduction target section 2, and the feed means for the engine-body-side pressure-reduction target section 3, which is the pressure-reduction target section 2, may be independently provided.

Second Embodiment

Figure 3:
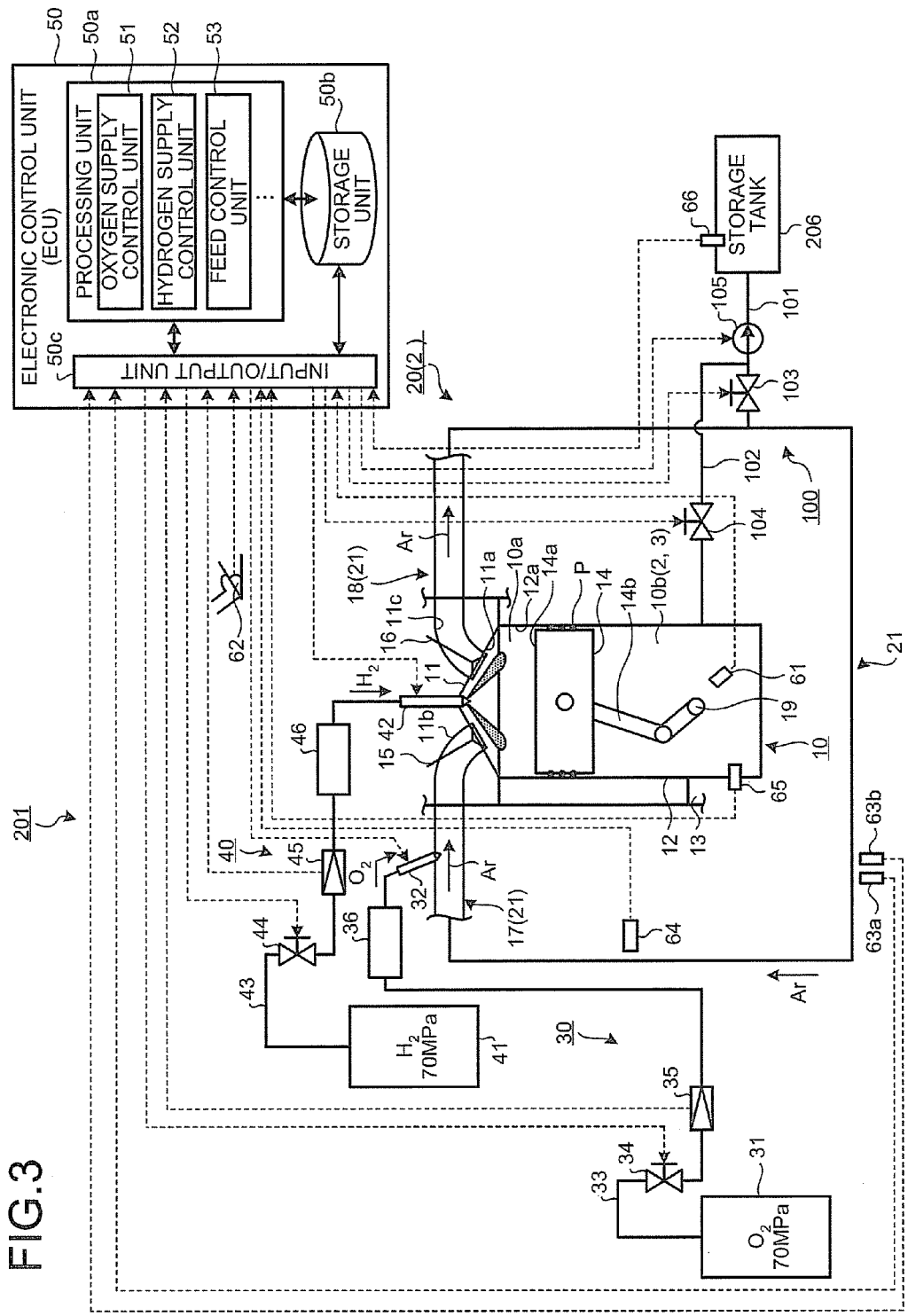
FIG. 3 is a schematic diagram of a working gas circulation engine according to a second embodiment of the present invention.
Figure 4:
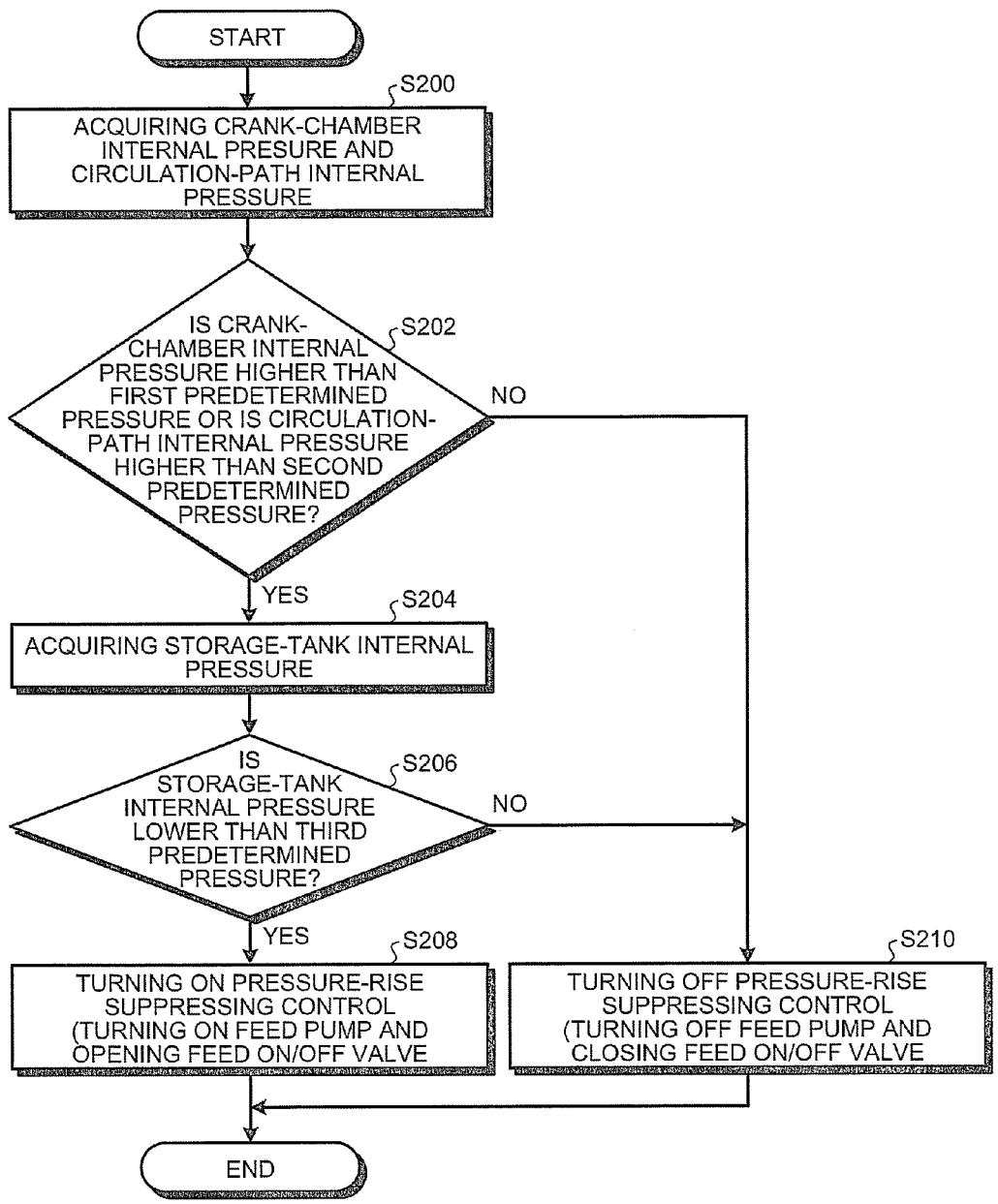
FIG. 4 is a flowchart explaining a control of the working gas circulation engine according to the second embodiment of the present invention.

FIG. 3 is a schematic diagram illustrating a configuration of a working gas circulation engine according to a second embodiment of the present invention, and FIG. 4 is a flow-chart explaining a control of the working gas circulation engine according to the second embodiment of the present invention. A working gas circulation engine according to the second embodiment is substantially the same as the working gas circulation engine 1 according to the first embodiment, except that the working gas circulation engine in the second embodiment includes a storage means. The description of configurations, operations, and effects same as those in the above-mentioned embodiment will not be repeated, and the same numerals are given to the same components.

A working gas circulation engine 201 in the present embodiment has the feed apparatus 100 serving as the feed means as illustrated in FIG. 3. The pressure-reduction target section 2 in the present embodiment is the circulation path 20 and the crank chamber 10*b* that forms the engine-body-side pressure-reduction target section 3, like the first embodiment.

The working gas circulation engine 201 in the present embodiment has a storage tank 206 serving as the storage means.

The storage tank 206 can store the gas that is fed from the inside of the pressure-reduction target section 2 by the feed apparatus 100. The storage tank 206 is connected to one end of the feed passage 101 of the feed apparatus 100. Specifically, the storage tank 206 is connected to the end of the feed passage 101, which is opposite to the inside of the circulation path 20. The storage tank 206 in the present embodiment is configured by a high-pressure container that can store the gas with the pressure higher than the internal pressure in the pressure-reduction target section 2.

The feed apparatus 100 feeds the gas in the circulation path 20 and the crank chamber 10*b* that forms the engine-body-side pressure-reduction target section 3, those of which are the pressure-reduction target sections 2, into the storage tank 206 that is the outside of the circulation path 20 and the crank chamber 10*b*. Specifically, when the feed apparatus 100 drives the feed pump 105 with the feed on-off valves 103 and 104 opened, the gas in the circulation path 20 and the crank chamber 10*b* that forms the engine-body-side pressure-reduction target section 3, those of which are the pressure-reduction target sections 2, can be sucked to the feed passages 101 and 102. Accordingly, the gas in the circulation path 20 and the crank chamber 10*b* can forcibly be fed toward the storage tank 206 through the feed passages 101 and 102.

The working gas circulation engine 201 in the present embodiment has a storage-tank internal pressure sensor 66 serving as a detecting means for detecting the pressure in the storage tank 206. The storage-tank internal pressure sensor 66 detects the pressure in the storage tank 206. The storage-tank internal pressure sensor 66 transmits the detection signal to the electronic control unit 50.

The feed control unit 53 determines whether the pressure in the storage-tank internal pressure sensor 66 is lower than a predetermined pressure that is set in advance on the basis of the detection signal from the storage-tank internal pressure sensor 66. The feed control unit 53 controls the drive of the feed apparatus 100, on the basis of the result of the determination, for feeding the gas in the pressure-reduction target section 2 into the storage tank 206.

As a result, when the feed control unit 53 operates the feed apparatus 100 so as to feed the gas in the pressure-reduction target section 2 to the outside, the working gas circulation engine 201 in the present embodiment can store the gas, which is fed from the pressure-reduction target section 2, into the storage tank 206 with the pressure higher than the pressure in the pressure-reduction target section 2. Accordingly, since the working gas circulation engine 201 in the present embodiment can store the gas, which is forcibly fed from the pressure-reduction target section 2 by the feed apparatus 100, into the storage tank 206 with the pressure higher than the pressure in the pressure-reduction target section 2, a relatively large-capacity gas can be stored in the small-sized storage tank 206, compared to the case in which the gas happens to be stored in a tank without using the feed apparatus 100.

The working gas circulation engine 201 in the present embodiment can return the working gas, which is temporarily stored in the storage tank 206, into the circulation path 20, which is the pressure-reduction target section 2, from the storage tank 206, after a predetermined time has elapsed after the working gas circulation engine 201 stops. By virtue of this, the reduction in the thermal efficiency due to the lack of the working gas in the circulation path 20 can be prevented, for example. The temperature of the working gas is lowered, and hence, the pressure in the circulation path 20 is lowered, after the working gas circulation engine 201 is stopped. However, since the gas stored in the storage tank 206 is returned to the circulation path 20, which is the pressure-reduction target section 2, the pressure drop in the circulation path 20, which is caused by the temperature drop of the working gas after the engine 201 is stopped, can be prevented. Therefore, the starting property upon the next starting can be enhanced. Moreover, the condensation of the water vapor in the circulation path 20 can be prevented when the engine 201 is stopped. Accordingly, the amount of condensed water generated in the circulation path 20 when the engine 201 is stopped can be reduced.

The control of the working gas circulation engine 201 in the present embodiment will now be described with reference to the flowchart in FIG. 4. The control routine is repeatedly executed in a control period of several milliseconds to several tens milliseconds.

First, the feed control unit 53 in the electronic control unit 50 acquires the current crank-chamber internal pressure and the current circulation-path internal pressure (S200), and determines whether the crank-chamber internal pressure is higher than the first predetermined pressure or not, or whether the circulation-path internal pressure is higher than the second predetermined pressure or not (S202).

When the feed control unit 53 determines that the crank-chamber internal pressure is higher than the first predetermined pressure, or that the circulation-path internal pressure is higher than the second predetermined pressure (S202:Yes), the feed control unit 53 acquires the storage-tank internal pressure, which is the current pressure in the storage tank 206, on the basis of the detection signal from the storage-tank internal pressure sensor 66 (S204).

Next, the feed control unit 53 compares the storage-tank internal pressure acquired at S204 and the third predetermined pressure that is set in advance so as to determine whether the storage-tank internal pressure is lower than the third predetermined pressure or not (S206). The third predetermined pressure is set in advance on the basis of the pressure resistance strength of the component of the storage tank 206. The third predetermined pressure is set such that a predetermined margin is given to the allowable internal pressure for the component adapted to the storage tank 206. The third predetermined pressure is set to be relatively higher than the first and the second predetermined pressures.

When the feed control unit 53 determines that the storage-tank internal pressure is lower than the third predetermined pressure (S206: Yes), the feed control unit 53 turns ON the pressure-rise suppressing control (S208). Thereafter, the feed control unit 53 ends the current control cycle, and then, moves to the next control cycle.

When the feed control unit 53 determines at S202 that the crank-chamber internal pressure is not more than the first predetermined pressure, determines that the circulation-path internal pressure is not more than the second predetermined pressure (S202: No), and determines at S206 that the storage-tank internal pressure is not less than the third predetermined pressure (S206: No), the feed control unit 53 turns OFF the pressure-rise suppressing control (S210). Thereafter, the feed control unit 53 ends the current control cycle, and then, moves to the next control cycle.

According to the working gas circulation engine 201 according to the present embodiment, when the pressure in the pressure-reduction target section 2 is higher than the predetermined pressure, the feed control unit 53 in the working gas circulation engine 201 operates the feed apparatus 100 so as to forcibly feed the gas in the pressure-reduction target section 2 to the outside. Consequently, the pressure in the pressure-reduction target section 2 can be reduced. As a result, the excessive pressure rise in the pressure-reduction target section 2 can be suppressed.

The working gas circulation engine 201 according to the present embodiment includes the storage tank 206 that can store the gas, which is fed by the feed apparatus 100, with the pressure higher than the pressure in the pressure-reduction target section 2. Since the working gas circulation engine 201 according to the present embodiment can store the gas, which is forcibly fed from the pressure-reduction target section 2 by the feed apparatus 100, with the pressure higher than the pressure in the pressure-reduction target section 2, a relatively large-capacity gas can be stored in the small-sized storage tank 206, compared to the case in which the gas happens to be stored in a tank without using the feed apparatus 100. As a result, the deterioration in the mounting property to the vehicle can be prevented.

Third Embodiment

Figure 5:
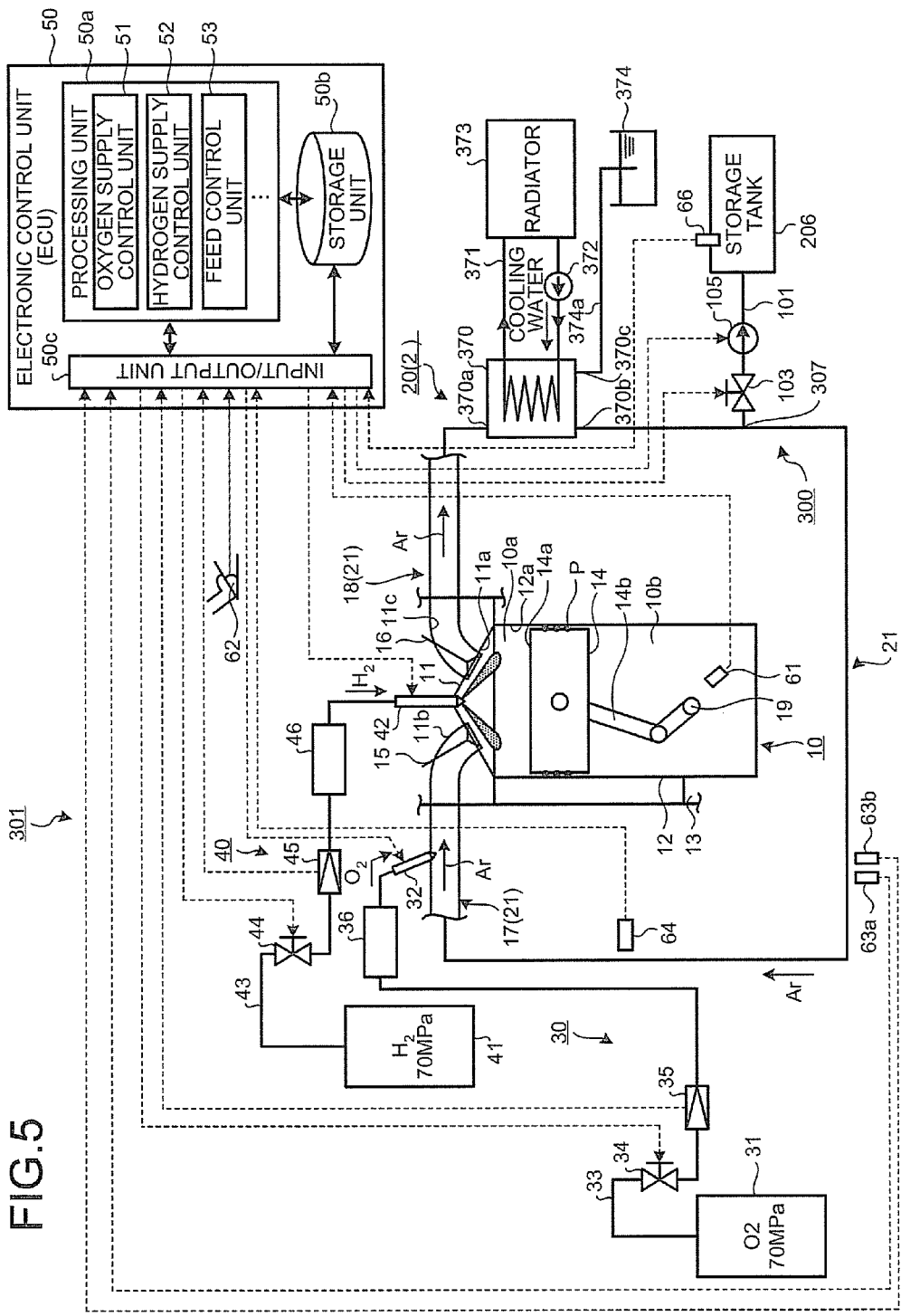
FIG. 5 is a schematic diagram of a working gas circulation engine according to a third embodiment of the present invention.

FIG. 5 is a schematic diagram illustrating a configuration of a working gas circulation engine according to a third embodiment of the present invention. The working gas circulation engine according to the third embodiment is substantially the same as the working gas circulation engine according to the second embodiment, except that the working gas circulation engine in the third embodiment includes a cooling means. The description of configurations, operations, and effects same as those in the above-mentioned embodiment will not be repeated, and the same numerals are given to the same components.

A working gas circulation engine 301 according to the present embodiment includes a feed apparatus 300 serving as a feed means as illustrated in FIG. 5. The pressure-reduction target section 2 in the present embodiment is the circulation path 20. Therefore, the feed apparatus 300 includes the feed passage 101, the feed on-off valve 103 serving as an opening/closing means, and the feed pump 105 serving as a pressure-feed means. The feed apparatus 300 does not have the above-mentioned feed passage 102 (see FIG. 3) and the feed on-off valve 104 serving as the opening/closing means (see FIG. 3). The working gas circulation engine 301 does not have the crank-chamber internal pressure sensor 65. The pressure-reduction target section 2 in the present embodiment may be the circulation path 20 and the crank chamber 10b that forms the engine-body-side pressure-reduction target section 3, like the second embodiment. Specifically, the feed apparatus 300 may include the feed passage 102 (see FIG. 3) and the feed on-off valve 104 (see FIG. 3) serving as the opening/closing means.

The working gas circulation engine 301 according to the present embodiment includes a condenser 370 serving as the cooling means. The condenser 370 is provided on the circulation path 20 for cooling the gas circulating in the circulation path 20. Here, the condenser 370 is the means for removing the water vapor contained in the exhaust gas circulating in the circulation path 20. The working gas circulation engine 301 further includes a cooling water circulation path 371, a cooling water pump 372, a radiator 373, and a condensed water tank 374.

The condenser 370 is provided on the circulation path 20 for condensing the water vapor contained in the exhaust gas to produce condensed water ($H_2O$). The condenser 370 is provided on the circulation passage 21 of the circulation path 20. The condenser 370 is provided on the circulation passage 21 of the circulation path 20 at the position closer to the exhaust side from the oxidizing agent injection valve 32. The condenser 370 is connected in such a manner that the cooling water circulation path 371 passes through the condenser 370.

The cooling water circulation path 371 allows the cooling water, which is a heat exchange medium, to circulate in the condenser 370. The cooling water can pass through the cooling water circulation path 371. The cooling water circulation path 371 is a closed loop path. The cooling water is filled in the cooling water circulation path 371.

The cooling water pump 372 is provided on the cooling water circulation path 371. When the cooling water pump 372 is driven, the cooling water in the cooling water circulation path 371 can be circulated in the cooling water circulation path 371.

The radiator 373 is provided on the cooling water circulation path 371. The radiator 373 can cool the cooling water circulating in the cooling water circulation path 371. The radiator 373 can cool the cooling water circulating in the cooling water circulation path 371 by travel wind of a vehicle having the working gas circulation engine 301 mounted thereto.

When the cooling water, which circulates in the cooling water circulation path 371 and is cooled by the radiator 373, is circulated and supplied in the condenser 370, the condenser 370 performs a heat exchange between the cooling water and the exhaust gas (working gas, water vapor, etc.) flowing through the circulation path 20 and introduced into the condenser 370 from an exhaust gas inlet port 370a so as to cool the exhaust gas. Accordingly, the condenser 370 liquefies and condenses the water vapor ($H_2O$) contained in the exhaust gas, and separates the same from the exhaust gas as the condensed water. Specifically, the condenser 370 can separate the exhaust gas into argon and condensed water. In this case, the cooling water, the temperature of which increases since it absorbs heat due to the heat exchange with the exhaust gas in the circulation path 20, circulates the cooling water circulation path 371, and passes again the radiator 373. When the cooling water passes through the radiator 373, it dissipates heat, so that the temperature thereof is lowered, i.e., it is cooled. Specifically, the cooling water circulating in the cooling water circulation path 371 dissipates heat, which is absorbed at the condenser 370, at the radiator 373.

The working gas separated by the condenser 370 is discharged from a working gas exhaust port 370b of the condenser 370, and flows through the circulation path 20. On the other hand, the condensed water separated by the condenser 370 is discharged to a condensed water exhaust passage 374a through a condensed water exhaust port 370c of the condenser 370, and discharged and stored in the outside of the circulation path 20, here the condensed water tank 374.

The condenser 370 and the radiator 373 are set to have a capacity (in other words, the cooling performance of exhaust gas) that can lower the temperature of the exhaust gas to the temperature by which the water vapor in the exhaust gas is liquefied and condensed, when the supposable highest-temperature exhaust gas is exhausted from the combustion chamber 10a during the engine operation.

The feed apparatus 300 in the present embodiment can feed the gas in the circulation path 20 at the downstream side (suction side) from the condenser 370 with respect to the direction of circulating the gas in the circulation path 20 to the outside. Specifically, a connection end 307 of the feed passage 101 of the feed apparatus 300 with the circulation passage 21 of the circulation path 20 is formed at the downstream side (suction side) from the condenser 370 with respect to the direction of circulating the gas in the circulation path 20. In other words, the feed passage 101 in the present embodiment is formed so as to be branched from the circulation passage 21 at the downstream side (suction side) from the condenser 370 with respect to the direction of circulating the gas in the circulation path 20. Accordingly, the feed apparatus 300 can feed the gas in the circulation path 20 at the downstream side (suction side) from the condenser 370 with respect to the direction of circulating the gas in the circulation path 20 to the outside through the feed passage 101. Here, the feed apparatus 300 can feed the gas in the circulation passage 21 at the downstream side (suction side) from the condenser 370 with respect to the direction of circulating the gas in the circulation path 20 and at the upstream side (exhaust side) from the oxygen injection position by the oxidizing agent injection valve 32.

As a result, when the gas (mainly the working gas) flowing through the circulation path 20 passes through the condenser 370, and the water vapor contained therein is liquefied and condensed, the heat is absorbed due to the heat exchange between the gas and the cooling water flowing through the cooling water circulation path 371. Therefore, the gas is cooled, and the temperature thereof is lowered. When the feed control unit 53 operates the feed apparatus 300 for feeding the gas in the circulation path 20, which is the pressure-reduction target section 2, to the outside, the working gas circulation engine 301 feeds the gas in the circulation path 20 into the storage tank 206 from the connection end 307 at the downstream side (suction side) from the condenser 370 with respect to the direction of circulating the gas in the circulation path 20 through the feed passage 101. Accordingly, the working gas circulation engine 301 can suck the gas, which has the temperature relatively low because it passes through the condenser 370, by the feed pump 105, and pressure-feed the same into the storage tank 206. Therefore, the working gas circulation engine 301 can forcibly feed the gas into the storage tank 206. Consequently, since the working gas circulation engine 301 can suck the gas, which has the temperature relatively low because it passes through the condenser 370, by the feed pump 105, and pressure-feed the same into the storage tank 206 from the circulation path 20 by the feed apparatus 300, the pump labor (pump load) of the feed pump 105 can be reduced. Further, the density of the gas stored in the storage tank 206 can relatively be increased. Therefore, the storage tank 206 can be downsized, and a relatively large-capacity gas can be stored in the storage tank 206. Since the working gas circulation engine 301 feeds the gas, which has the temperature relatively low because it passes through the condenser 370, into the storage tank 206 from the circulation path 20 by the feed apparatus 300, the condensation of the water vapor in the storage tank 206 can be prevented.

According to the working gas circulation engine 301 according to the present embodiment, when the pressure in the pressure-reduction target section 2 is higher than the predetermined pressure, the feed control unit 53 in the working gas circulation engine 301 operates the feed apparatus 300 so as to forcibly feed the gas in the pressure-reduction target section 2 to the outside. Consequently, the pressure in the pressure-reduction target section 2 can be reduced. As a result, the excessive pressure rise in the pressure-reduction target section 2 can be suppressed.

The working gas circulation engine 301 according to the present embodiment includes the condenser 370 that is provided on the circulation path 20 for cooling the gas circulating in the circulation path 20. The feed apparatus 300 can feed the gas in the circulation path 20 at the downstream side from the condenser 370 with respect to the direction of circulating the gas in the circulation path 20 with the combustion chamber 10a defined as a reference. Accordingly, when the feed control unit 53 operates the feed apparatus 300 for feeding the gas in the circulation path 20, which is the pressure-reduction target section 2, to the outside, the working gas circulation engine 301 feeds the gas in the circulation path 20 at the downstream side (suction side) from the condenser 370 with respect to the direction of circulating the gas in the circulation path 20. Therefore, the working gas circulation engine 301 can feed the gas, which has the temperature relatively low because it passes through the condenser 370, to the outside of the pressure-reduction target section 2 by the feed apparatus 300. As a result, the working gas circulation engine 301 can reduce the pump labor (pump load) of the feed pump 105. Further, the storage tank 206 can be downsized, and a relatively large-capacity gas can be stored in the storage tank 206. Accordingly, the deterioration in the mounting property to the vehicle can be prevented. Moreover, the condensation of the water vapor in the storage tank 206 can be prevented, so that the amount of the condensed water generated in the storage tank 206 can be reduced.

In the above description, the cooling means is the condenser that is provided on the circulation path 20 and that condenses the water vapor, which is produced by the combustion of oxygen, serving as the oxidizing agent, and hydrogen, serving as a fuel, to produce condensed water. However, the present invention is not limited thereto. The cooling means may be a simple heat exchanger, so long as it is provided on the circulation path 20 for cooling the gas circulating in the circulation path 20. The working gas circulation engine 301 may include a heat exchanger, serving as the cooling means, on the feed passage 101 (e.g., at the portion between the connection end 307 and the feed pump 105 or between the feed pump 105 and the storage tank 206) of the feed apparatus 300.

Fourth Embodiment

Figure 6:
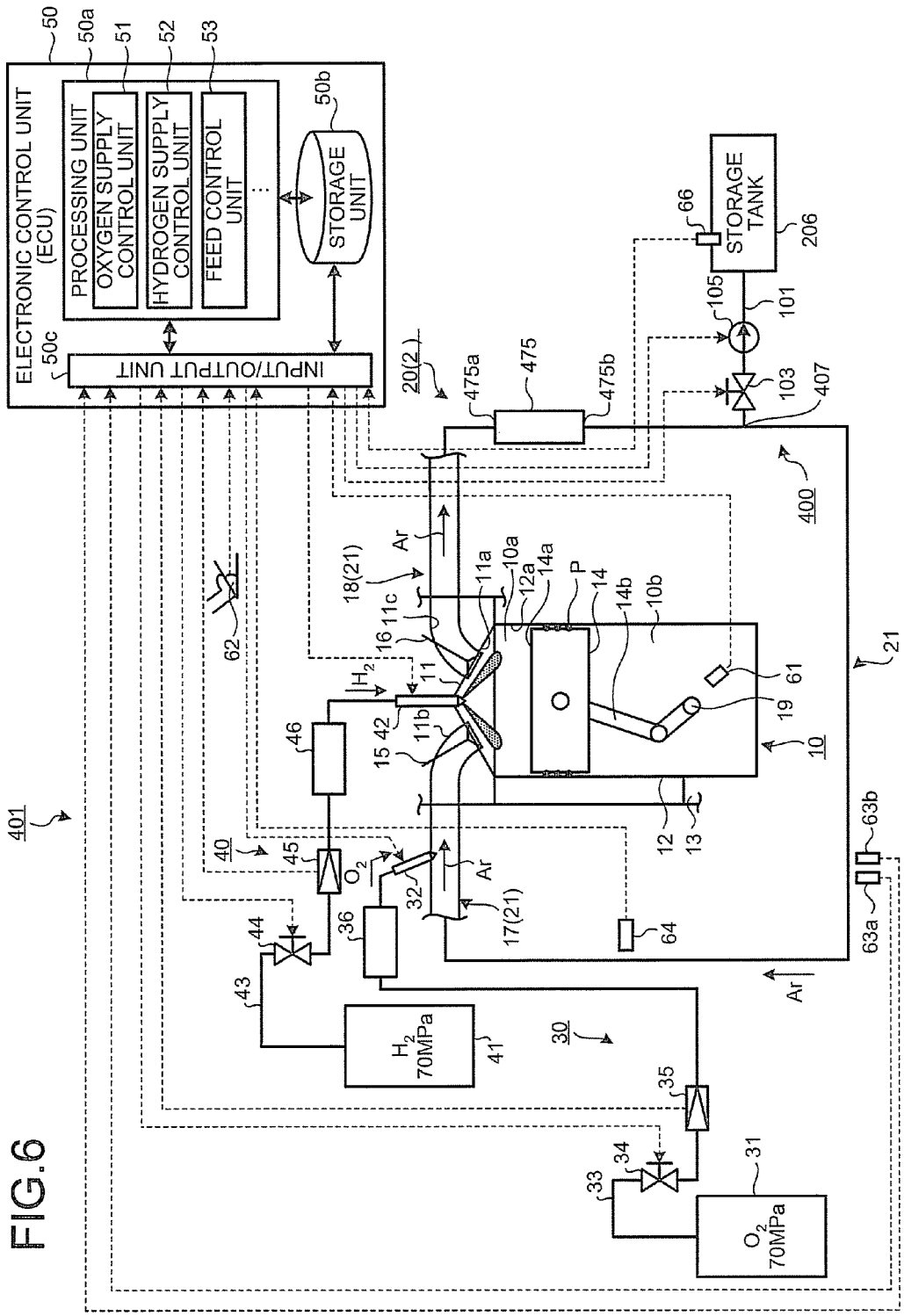
FIG. 6 is a schematic diagram of a working gas circulation engine according to a fourth embodiment of the present invention.

FIG. 6 is a schematic diagram illustrating a configuration of a working gas circulation engine according to a fourth embodiment of the present invention. The working gas circulation engine according to the fourth embodiment is substantially the same as the working gas circulation engine according to the second embodiment, except that the working gas circulation engine in the fourth embodiment includes a removing means. The description of configurations, operations, and effects same as those in the above-mentioned embodiment will not be repeated, and the same numerals are given to the same components.

A working gas circulation engine 401 according to the present embodiment includes a feed apparatus 400 serving as a feed means as illustrated in FIG. 6. The pressure-reduction target section 2 in the present embodiment is the circulation path 20. Therefore, the feed apparatus 400 includes the feed passage 101, the feed on-off valve 103 serving as an opening/closing means, and the feed pump 105 serving as a pressure-feed means. The feed apparatus 400 does not have the above-mentioned feed passage 102 (see FIG. 3) and the feed on-off valve 104 serving as the opening/closing means (see FIG. 3). The working gas circulation engine 401 does not have the crank-chamber internal pressure sensor 65. The pressure-reduction target section 2 in the present embodiment may be the circulation path 20 and the crank chamber 10b that forms the engine-body-side pressure-reduction target section 3, like the second embodiment. Specifically, the feed apparatus 300 may include the feed passage 102 (see FIG. 3) and the feed on-off valve 104 (see FIG. 3) serving as the opening/closing means.

The working gas circulation engine 401 according to the present embodiment includes an oxidation catalyst 475 serving as the removing means. The oxidation catalyst 475 is provided on the circulation path 20 for removing hydrogen in the gas circulating in the circulation path 20. More specifically, the oxidation catalyst 475 oxidizes and removes the unburned hydrogen in the gas circulating in the circulation path 20, i.e., in the gas after the combustion of the oxygen serving as the oxidizing agent and the hydrogen serving as the fuel. The oxidation catalyst 475 is provided on the circulation passage 21 of the circulation path 20. The oxidation catalyst 475 is provided on the circulation path 20 close to the exhaust side from the oxidizing agent injection valve 32.

Therefore, the oxidation catalyst 475 oxidizes the exhaust gas flowing through the circulation path 20 and introduced into the oxidation catalyst 475 from an exhaust gas inlet port 475a, and removes the unburned hydrogen in the gas after the combustion. Thereafter, the oxidation catalyst 475 exhausts the exhaust gas to the circulation path 20 from a working gas exhaust port 475b.

The feed apparatus 400 in the present embodiment can feed the gas in the circulation path 20 at the downstream side (suction side) from the oxidation catalyst 475 with respect to the direction of circulating the gas in the circulation path 20 to the outside. Specifically, a connection end 407 of the feed passage 101 of the feed apparatus 400 with the circulation passage 21 of the circulation path 20 is formed at the downstream side (suction side) from the oxidation catalyst 475 with respect to the direction of circulating the gas in the circulation path 20. In other words, the feed passage 101 in the present embodiment is formed so as to be branched from the circulation passage 21 at the downstream side (suction side) from the oxidation catalyst 475 with respect to the direction of circulating the gas in the circulation path 20. Accordingly, the feed apparatus 400 can feed the gas in the circulation path 20 at the downstream side (suction side) from the oxidation catalyst 475 with respect to the direction of circulating the gas in the circulation path 20 to the outside through the feed passage 101. Here, the feed apparatus 400 can feed the gas in the circulation passage 21 at the downstream side (suction side) from the oxidation catalyst 475 with respect to the direction of circulating the gas in the circulation path 20 and at the upstream side (exhaust side) from the oxygen injection position by the oxidizing agent injection valve 32.

As a result, the working gas circulation engine 401 according to the present embodiment removes the unburned hydrogen contained when the gas (mainly, the working gas) that flows the circulation path 20 passes through the oxidation catalyst 475. When the feed control unit 53 operates the feed apparatus 400 for feeding the gas in the circulation path 20, which is the pressure-reduction target section 2 to the outside, the working gas circulation engine 401 feeds the gas in the circulation path 20 into the storage tank 206 from the connection end 407 at the downstream side (suction side) from the oxidation catalyst 475 with respect to the direction of circulating the gas in the circulation path 20 through the feed passage 101. Accordingly, the working gas circulation engine 401 can suck and feed the gas, which passes through the oxidation catalyst 475 and from which the unburned hydrogen is removed, by the feed pump 105. Therefore, the working gas circulation engine 401 can forcibly feed the gas into the storage tank 206. Since the working gas circulation engine 401 feeds the gas, which passes through the oxidation catalyst 475 and from which the unburned hydrogen is removed, into the storage tank 206 from the circulation path 20 by the feed apparatus 400, the working gas circulation engine 401 can prevent the unburned hydrogen from being stored in the storage tank 206, for example.

According to the working gas circulation engine 401 according to the present embodiment, when the pressure in the pressure-reduction target section 2 is higher than the predetermined pressure, the feed control unit 53 in the working gas circulation engine 401 operates the feed apparatus 400 so as to forcibly feed the gas in the pressure-reduction target section 2 to the outside. Consequently, the pressure in the pressure-reduction target section 2 can be reduced. As a result, the excessive pressure rise in the pressure-reduction target section 2 can be suppressed.

The working gas circulation engine 401 according to the present embodiment includes the oxidation catalyst 475 that is provided on the circulation path 20 for removing the hydrogen in the gas after the combustion of oxygen and hydrogen. The feed apparatus 400 can feed the gas in the circulation path 20 at the downstream side from the oxidation catalyst 475 with respect to the direction of circulating the gas in the circulation path 20 with the combustion chamber 10a defined as a reference. Accordingly, when the feed control unit 53 operates the feed apparatus 400 for feeding the gas in the circulation path 20, which is the pressure-reduction target section 2, to the outside, the working gas circulation engine 401 feeds the gas in the circulation path 20 at the downstream side (suction side) from the oxidation catalyst 475 with respect to the direction of circulating the gas in the circulation path 20. Therefore, the working gas circulation engine 401 can feed the gas, which passes through the oxidation catalyst 475 and from which the unburned hydrogen is removed, to the outside of the pressure-reduction target section 2 by the feed apparatus 400. As a result, the working gas circulation engine 401 can prevent the unburned hydrogen from being stored in the storage tank 206, for example.

Fifth Embodiment

Figure 7:
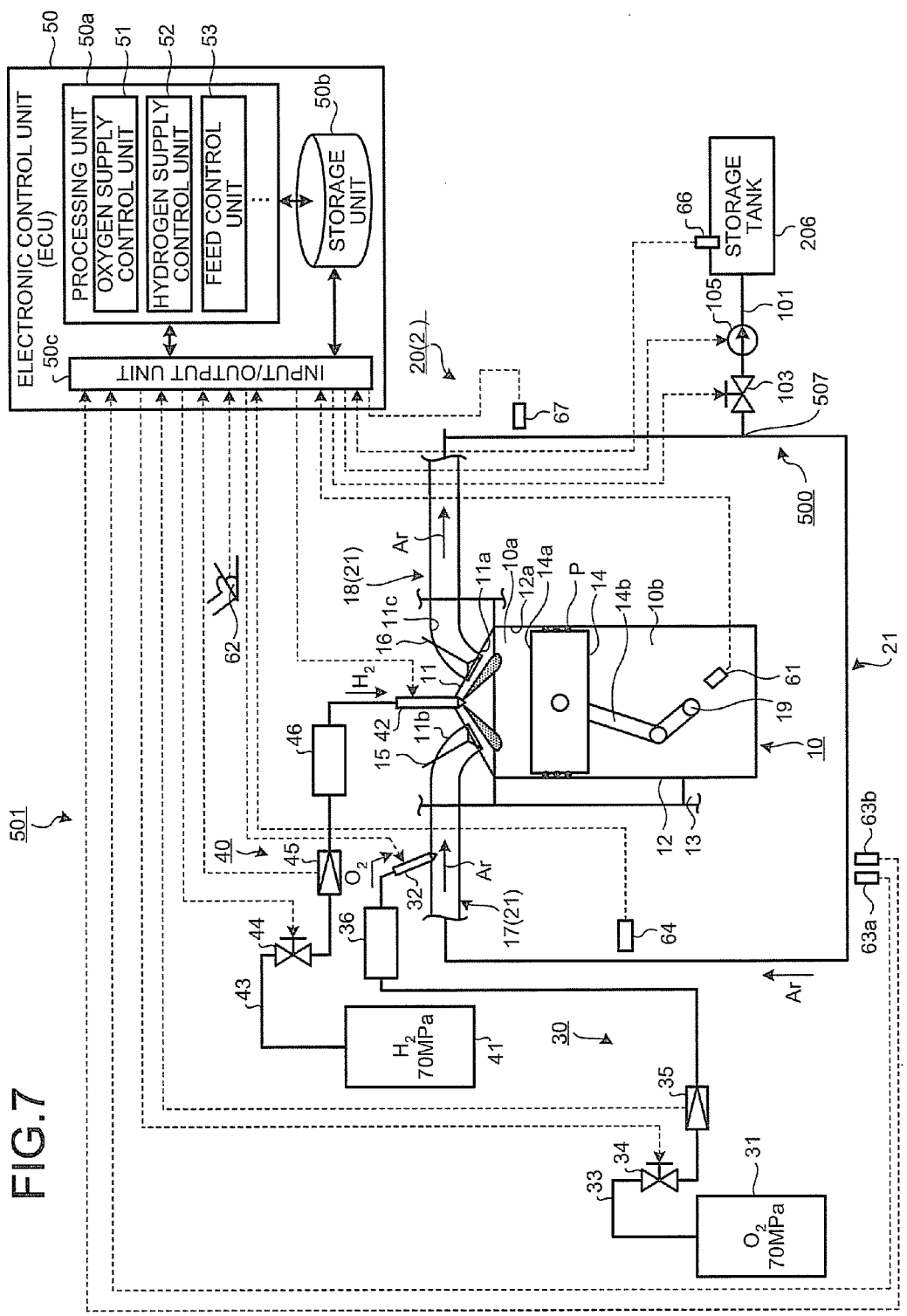
FIG. 7 is a schematic diagram of a working gas circulation engine according to a fifth embodiment of the present invention.
Figure 8:
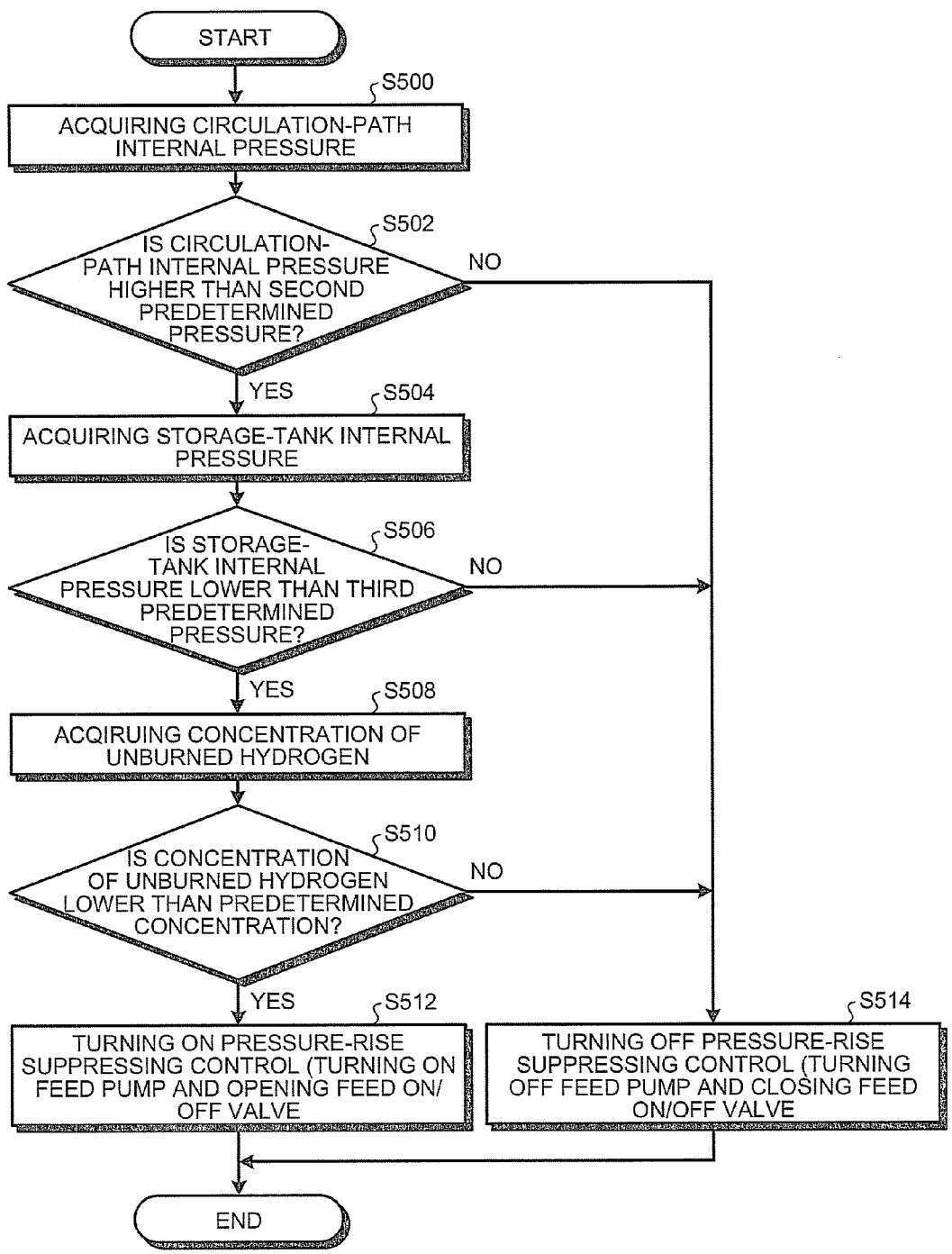
FIG. 8 is a flowchart explaining a control of the working gas circulation engine according to the fifth embodiment of the present invention.

FIG. 7 is a schematic diagram illustrating a configuration of a working gas circulation engine according to a fifth embodiment of the present invention, and FIG. 8 is a flowchart for explaining the control of the working gas circulation engine according to the fifth embodiment of the present invention. The working gas circulation engine according to the fifth embodiment is substantially the same as the working gas circulation engine according to the second embodiment, except that the working gas circulation engine in the fifth embodiment inhibits the feed of the gas by the feed means under a predetermined condition. The description of configurations, operations, and effects same as those in the above-mentioned embodiment will not be repeated, and the same numerals are given to the same components.

A working gas circulation engine 501 according to the present embodiment includes a feed apparatus 500 serving as a feed means as illustrated in FIG. 7. The pressure-reduction target section 2 in the present embodiment is the circulation path 20. Therefore, the feed apparatus 500 includes the feed passage 101, the feed on-off valve 103 serving as an opening/closing means, and the feed pump 105 serving as a pressure-feed means. The feed apparatus 500 does not have the above-mentioned feed passage 102 (see FIG. 3) and the feed on-off valve 104 serving as the opening/closing means (see FIG. 3). The working gas circulation engine 501 does not have the crank-chamber internal pressure sensor 65. The pressure-reduction target section 2 in the present embodiment may be the circulation path 20 and the crank chamber 10b that forms the engine-body-side pressure-reduction target section 3, like the second embodiment. Specifically, the feed apparatus 500 may include the feed passage 102 (see FIG. 3) and the feed on-off valve 104 (see FIG. 3) serving as the opening/closing means.

The working gas circulation engine 501 according to the present embodiment includes a hydrogen concentration sensor 67 serving as concentration detecting means. The hydrogen concentration sensor 67 detects the concentration of the hydrogen in the gas circulating in the circulation path 20. The hydrogen concentration sensor 67 transmits the detection signal to the electronic control unit 50. The hydrogen concentration sensor 67 is provided on the circulation passage 21 of the circulation path 20, separate from the above-mentioned hydrogen concentration sensor 63a. The hydrogen concentration sensor 67 is provided on the circulation path 20 at the position close to the exhaust side from the hydrogen concentration sensor 63a.

The feed apparatus 500 in the present embodiment can feed the gas in the circulation path 20 at the downstream side (suction side) from the detection position of the concentration by the hydrogen concentration sensor 67 with respect to the direction of circulating the gas in the circulation path 20, here the gas in the circulation path 20 at the upstream side (exhaust side) from the detection position by the hydrogen concentration sensor 63a, to the outside. Specifically, a connection end 507 of the feed passage 101 of the feed apparatus 500 with the circulation passage 21 of the circulation path 20 is formed at the downstream side (suction side) from the detection position by the hydrogen concentration sensor 67 and at the upstream side (exhaust side) from the detection position by the hydrogen concentration sensor 63a with respect to the direction of circulating the gas in the circulation path 20. In other words, the feed passage 101 in the present embodiment is formed so as to be branched from the circulation passage 21 at the downstream side (suction side) from the detection position by the hydrogen concentration sensor 67 and at the upstream side (exhaust side) from the detection position by the hydrogen concentration sensor 63a with respect to the direction of circulating the gas in the circulation path 20. Accordingly, the feed apparatus 500 can feed the gas in the circulation path 20 at the downstream side (suction side) from the detection position by the hydrogen concentration sensor 67 and at the upstream side (exhaust side) from the detection position by the hydrogen concentration sensor 63a with respect to the direction of circulating the gas in the circulation path 20.

When the concentration of the hydrogen detected by the hydrogen concentration sensor 67 is not less than a predetermined concentration that is set in advance, the feed control unit 53 in the present embodiment inhibits the feed of the gas in the circulation path 20, which is the pressure-reduction target section 2, by the feed apparatus 500.

As a result, when the concentration of the hydrogen detected by the hydrogen concentration sensor 67 is not less than the predetermined concentration that is set in advance, the feed control unit 53 in the working gas circulation engine 501 according to the present embodiment inhibits the feed of the gas in the circulation path 20, which is the pressure-reduction target section 2, by the feed apparatus 500. Therefore, the working gas circulation engine 501 can prevent the unburned hydrogen from being fed from the inside to the outside of the circulation path 20, which is the pressure-reduction target section 2, by the feed apparatus 500. Accordingly, the working gas circulation engine 501 can prevent the unburned hydrogen from being stored in the storage tank 206, for example.

The working gas circulation engine 501 according to the present embodiment can feed the gas in the circulation path 20 at the downstream side (suction side) from the detection position by the hydrogen concentration sensor 67 with respect to the direction of circulating the gas in the circulation path 20. Therefore, the working gas circulation engine 501 can detect the concentration of the hydrogen in the gas by the hydrogen concentration sensor 67 before the gas circulating in the circulation path 20 reaches the connection end 507 of the feed passage 101. Accordingly, the feed control unit 53 inhibits the feed of the gas by the feed apparatus 500 on the basis of the detection signal from the hydrogen concentration sensor 67, whereby the working gas circulation engine 501 can surely prevent the unburned hydrogen from being fed from the inside to the outside of the circulation path, which is the pressure-reduction target section 2, by the feed apparatus 500. Since the feed apparatus 500 in the working gas circulation engine 501 can feed the gas in the circulation path 20 at the upstream side (exhaust side) from the detection position by the hydrogen concentration sensor 67 with respect to the direction of circulating the gas in the circulation path 20, the working gas circulation engine 501 can prevent that the remaining amount of the hydrogen fed to the combustion chamber 10a cannot be grasped. Therefore, the working gas circulation engine 501 can prevent the inhibition of the appropriate feed control of hydrogen.

In the above description, the hydrogen concentration sensor 63a and the hydrogen concentration sensor 67 are provided separately. However, the present invention is not limited thereto. The working gas circulation engine 501 according to the present embodiment may share the hydrogen concentration sensor 63a and the hydrogen concentration sensor 67. In this case, the working gas circulation engine 501 may be configured such that the feed apparatus 500 can feed the gas in the circulation path 20 at the downstream side (suction side) from the detection position by the hydrogen concentration sensor 63a or the hydrogen concentration sensor 67 that are shared.

The control of the working gas circulation engine 501 in the present embodiment will now be described with reference to the flowchart in FIG. 8. The control routine is repeatedly executed in a control period of several milliseconds to several tens milliseconds.

First, the feed control unit 53 in the electronic control unit 50 acquires the current circulation-path internal pressure (S500), and determines whether the circulation-path internal pressure is higher than the second predetermined pressure or not (S502). When the feed control unit 53 determines that the circulation-path internal pressure is higher than the second predetermined pressure (S502: Yes), the feed control unit 53 acquires the storage-tank internal pressure, which is the current pressure in the storage tank 206 (S504). The feed control unit 53 determines whether the storage-tank internal pressure is lower than the third predetermined pressure or not (S506).

When the feed control unit 53 determines that the storage-tank internal pressure is lower than the third predetermined pressure (S506: Yes), the feed control unit 53 acquires the concentration of the unburned hydrogen in the gas circulating in the circulation path 20 on the basis of the detection signal from the hydrogen concentration sensor 67 (S508).

Then, the feed control unit 53 compares the concentration of the unburned hydrogen acquired at step S508 and the predetermined concentration that is set in advance so as to determine whether the concentration of the unburned hydrogen is lower than the predetermined concentration (S510).

When the feed control unit 53 determines that the concentration of the unburned hydrogen is lower than the predetermined concentration (S510: Yes), the feed control unit 53 turns ON the pressure-rise suppressing control (S512). Then, the feed control unit 53 ends the current control cycle, and moves to the next control cycle.

When the feed control unit 53 determines at S502 that the circulation-path internal pressure is not more than the second predetermined pressure (S502: No), determines at S506 that the storage-tank internal pressure is not less than the third predetermined pressure (S506: No), and determines that the concentration of the unburned hydrogen is not less than the predetermined concentration (S510: No), the feed control unit 53 turns OFF (inhibits) the pressure-rise suppressing control (S514). Thereafter, the feed control unit 53 ends the current control cycle, and then, moves to the next control cycle.

According to the working gas circulation engine 501 according to the present embodiment, when the pressure in the pressure-reduction target section 2 is higher than the predetermined pressure, the feed control unit 53 in the working gas circulation engine 501 operates the feed apparatus 500 so as to forcibly feed the gas in the pressure-reduction target section 2 to the outside. Consequently, the pressure in the pressure-reduction target section 2 can be reduced. As a result, the excessive pressure rise in the pressure-reduction target section 2 can be suppressed.

The working gas circulation engine 501 according to the present embodiment includes the hydrogen concentration sensor 67 that detects the concentration of the hydrogen in the gas in the circulation path 20. The feed apparatus 500 can feed the gas in the circulation path 20 at the downstream side from the detection position by the hydrogen concentration sensor 67 with respect to the direction of circulating the gas in the circulation path 20 with the combustion chamber 10a defined as a reference. Accordingly, when the concentration of the hydrogen detected by the hydrogen concentration sensor 67 is not less than the predetermined concentration, the feed control unit 53 inhibits the feed of the gas by the feed apparatus 500. Since the feed control unit 53 inhibits the feed of the gas in the circulation path 20, which is the pressure-reduction target section 2, by the feed apparatus 500, when the concentration of the hydrogen detected by the hydrogen concentration sensor 67 is not less than the predetermined concentration, the working gas circulation engine 501 can prevent the unburned hydrogen from being fed from the inside to the outside of the circulation path 20, which is the pressure-reduction target section 2. Therefore, the working gas circulation engine 501 can prevent the unburned hydrogen from being stored in the storage tank 206, for example.

Sixth Embodiment

Figure 9:
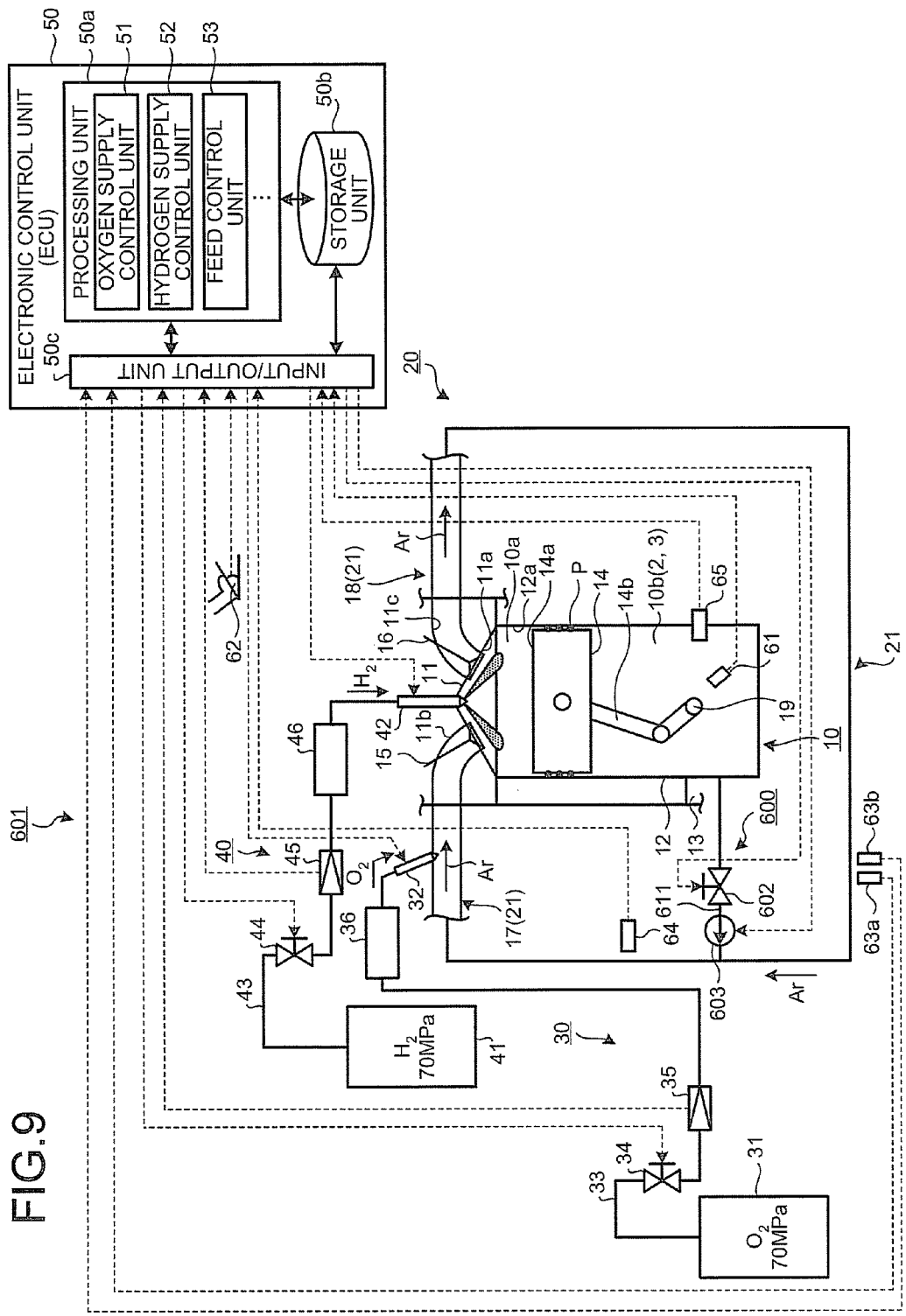
FIG. 9 is a schematic diagram of a working gas circulation engine according to a sixth embodiment of the present invention.
Figure 10:
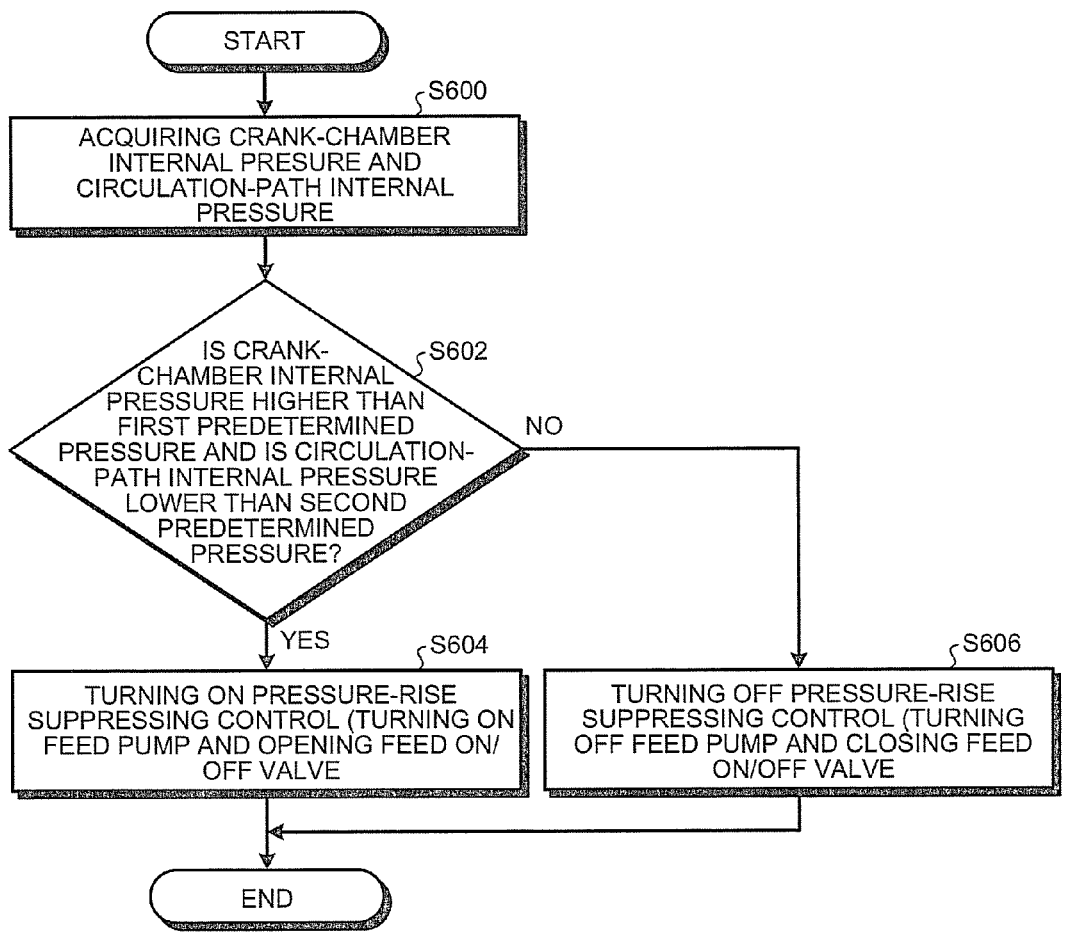
FIG. 10 is a flowchart explaining a control of the working gas circulation engine according to the sixth embodiment of the present invention.

FIG. 9 is a schematic diagram illustrating a configuration of a working gas circulation engine according to a sixth embodiment of the present invention, and FIG. 10 is a flowchart for explaining the control of the working gas circulation engine according to the sixth embodiment of the present invention. The working gas circulation engine according to the sixth embodiment is substantially the same as the working gas circulation engine according to the first embodiment, except that the feed means can feed the gas in the engine-body-side pressure-reduction target section into the circulation path in the working gas circulation engine in the sixth embodiment. The description of configurations, operations, and effects same as those in the above-mentioned embodiment will not be repeated, and the same numerals are given to the same components.

A working gas circulation engine 601 according to the present embodiment includes a feed apparatus 600 serving as a feed means as illustrated in FIG. 9. The pressure-reduction target section 2 in the present embodiment is the engine-body-side pressure-reduction target section 3, more specifically, the crank chamber 10b that forms the engine-body-side pressure-reduction target section 3.

The components, such as the crankcase 13, constituting the crank chamber 10b that forms the engine-body-side pressure-reduction target section 3, are tend to have relatively low pressure resistance strength, compared to the passage pipes, such as the suction pipe 17 and the exhaust pipe 18, constituting the circulation passage 21 of the circulation path 20. In other words, the relationship between the first predetermined pressure that is set according to the pressure resistance strength of the components such as the crankcase 13 and the second predetermined pressure that is set according to the pressure resistance strength of the passage pipes such as the suction pipe 17 and the exhaust pipe 18 generally tends to be set such that the first predetermined pressure is smaller than the second predetermined pressure.

In view of this, in the working gas circulation engine 601 according to the present embodiment, the pressure-reduction target section 2 is the engine-body-side pressure-reduction target section 3, here the crank chamber 10b. The feed apparatus 600 in the present embodiment can feed the gas in the crank chamber 10b, which forms the engine-body-side pressure-reduction target section 3 and which is difficult to give a sufficient pressure resistance strength, into the inside of the circulation passage 21 of the circulation path 20 that is easy to have the sufficient pressure resistance strength.

Specifically, the feed apparatus 600 includes a feed passage 611, a feed on-off valve 602 serving as an opening/closing means, and a feed pump 603 serving as a pressure-feed means.

The feed passage 611 connects the inside and the outside of the crank chamber 10b that forms the engine-body-side pressure-reduction target section 3, which is the pressure-reduction target section 2, in such a manner that the gas can flow therein. The feed passage 611 is composed of, for example, a passage pipe. One end of the feed passage 611 is open to the inside of the crank chamber 10b, while the other end is open to the outside of the crank chamber 10b, i.e., open to the inside of the passage pipe constituting the circulation passage 21 of the circulation path 20.

The feed on-off valve 602 is provided on the feed passage 611, and can open and close the feed passage 611. When the feed on-off valve 602 is closed, it closes the feed passage 611 so as to cut the circulation of the gas in the feed passage 611. When the feed on-off valve 602 is opened, it opens the feed passage 611 so as to allow the circulation of the gas in the feed passage 611. The feed on-off valve 602 is controlled by the electronic control unit 50.

The feed pump 603 is provided on the feed passage 611. The feed pump 603 pressurizes the gas in the feed passage 611 so as to pressure-feed the gas from the inside to the outside of the pressure-reduction target section 2. The feed pump 603 is provided at the portion between the joint portion of the circulation passage 21 and the feed on-off valve 602 of the feed passage 611.

When the feed pump 603 is driven with the feed on-off valve 602 opened, the feed pump 603 sucks the gas in the crank chamber 10b, which forms the engine-body-side pressure-reduction target section 3, toward the outside of the crank chamber 10b, here, toward the inside of the circulation passage 21 of the circulation path 20, through the feed passage 611. The feed pump 603 is controlled by the electronic control unit 50.

When the internal pressure in the pressure-reduction target section 2, which is the crank chamber 10b that forms the engine-body-side pressure-reduction target section 3, is higher than the first predetermined pressure that is set in advance, the feed control unit 53 in the working gas circulation engine 601 according to the present embodiment operates the feed apparatus 600 for forcibly feeding the gas in the crank chamber 10b to the inside of the circulation passage 21 of the circulation path 20, which is the outside of the crank chamber 10b. Therefore, the working gas circulation engine 601 according to the present embodiment can suppress the excessive pressure rise in the crank chamber 10b that forms the engine-body-side pressure-reduction target section 3. As described above, the working gas circulation engine 601 can feed the gas in the crank chamber 10b, which forms the engine-body-side pressure-reduction target section 3 and which is difficult to give a sufficient pressure resistance strength, into the circulation path 20 that is easy to have the sufficient pressure resistance strength. Therefore, even if the working gas circulation engine 601 does not have the storage tank 206 described above (see FIG. 3), it can suppress the excessive pressure rise in the crank chamber 10b that forms the engine-body-side pressure-reduction target section 3 after the working gas in the crank chamber 10b is returned to the circulation path 20, without allowing the working gas to be fed out of the system of the working gas circulation engine 601. Since the working gas circulation engine 601 can surely suppress the pressure rise in the crank chamber 10b, the flow loss of the working gas in each cylinder in the crankcase 13 can be reduced.

Next, the control of the working gas circulation engine 601 in the present embodiment will be described with reference to the flowchart in FIG. 10. The control routine is repeatedly executed in a control period of several milliseconds to several tens milliseconds.

The feed control unit 53 in the electronic control unit 50 acquires the current crank-chamber internal pressure and the current circulation-path internal pressure (S600).

Next, the feed control unit 53 compares the crank-chamber internal pressure and the circulation-path internal pressure acquired at step S600 and the first predetermined pressure and the second predetermined pressure, and determines whether the crank-chamber internal pressure is higher than the first predetermined pressure or not and whether the circulation-path internal pressure is lower than the second predetermined pressure or not (S602).

When the feed control unit 53 determines that the crank-chamber internal pressure is higher than the first predetermined pressure and that the circulation-path internal pressure is lower than the second predetermined pressure (S602: Yes), it turns ON a pressure-rise suppressing control (S604). Then, the feed control unit 53 ends the current control cycle, and moves to the next control cycle. In this case, the feed control unit 53 opens the feed on-off valve 602, and turns ON the feed pump 603 in order to turn ON the pressure-rise suppressing control. Accordingly, the feed control unit 53 feeds the gas in the crank chamber 10b that forms the engine-body-side pressure-reduction target section 3, which is the pressure-reduction target section 2, to the circulation passage 21 of the circulation path 20, which is the outside of the crank chamber 10b, through the feed passage 611.

When the feed control unit 53 determines that the crank-chamber internal pressure is not more than the first predetermined pressure, or the circulation-path internal pressure is not less than the second predetermined pressure (S602: No), it turns OFF the pressure-rise suppressing control (S606). Then, the feed control unit 53 ends the current control cycle, and moves to the next control cycle. In this case, the feed control unit 53 closes the feed on-off valve 602, and stops (turns OFF) the feed pump 603 in order to turn OFF the pressure-rise suppressing control. Accordingly, the feed control unit 53 stops the feed of the gas in the crank chamber 10b that forms the engine-body-side pressure-reduction target section 3, which is the pressure-reduction target section 2, to the circulation passage 21. Since the feed on-off valve 602 is closed, the flowback of the gas from the outside, which is the inside of the circulation passage 21, to the inside of the crank chamber 10b that forms the engine-body-side pressure-reduction target section 3, can be prevented.

According to the working gas circulation engine 601 according to the present embodiment, when the pressure in the pressure-reduction target section 2 is higher than the predetermined pressure, the feed control unit 53 in the working gas circulation engine 601 operates the feed apparatus 600 so as to forcibly feed the gas in the pressure-reduction target section 2 to the outside. Consequently, the pressure in the pressure-reduction target section 2 can be reduced. As a result, the excessive pressure rise in the pressure-reduction target section 2 can be suppressed.

According to the working gas circulation engine 601 according to the present embodiment, the feed apparatus 600 can feed the gas in the crank chamber 10b that forms the engine-body-side pressure-reduction target section 3, which is the pressure-reduction target section 2, into the inside of the circulation path 20. The working gas circulation engine 601 can feed the gas in the crank chamber 10b, which forms the engine-body-side pressure-reduction target section 3 and which is difficult to give a sufficient pressure resistance strength, into the inside of the circulation path 20 that is easy to have the sufficient pressure resistance strength. Therefore, it can suppress the excessive pressure rise in the crank chamber 10b that forms the engine-body-side pressure-reduction target section 3 after the working gas in the crank chamber 10b is returned to the circulation path 20, without allowing the working gas to be fed out of the system of the working gas circulation engine 601.

In the above description, the pressure-reduction target section 2 is the crank chamber 10b that forms the engine-body-side pressure-reduction target section 3, and the circulation path 20 is not the pressure-reduction target section 2. However, the circulation path 20 may be defined as the pressure-reduction target section 2. In this case, the working gas circulation engine 601 may have a feed means for the circulation path 20, which is the pressure-reduction target section 2, separate from the feed apparatus 600 that is the feed means for the engine-body-side pressure-reduction target section 3. Specifically, the working gas circulation engine 601 according to the present embodiment may be configured by combining the working gas circulation engine 301 (see FIG. 5), the working gas circulation engine 401 (see FIG. 6), and the working gas circulation engine 501 (see FIG. 7).

Seventh Embodiment

Figure 11:
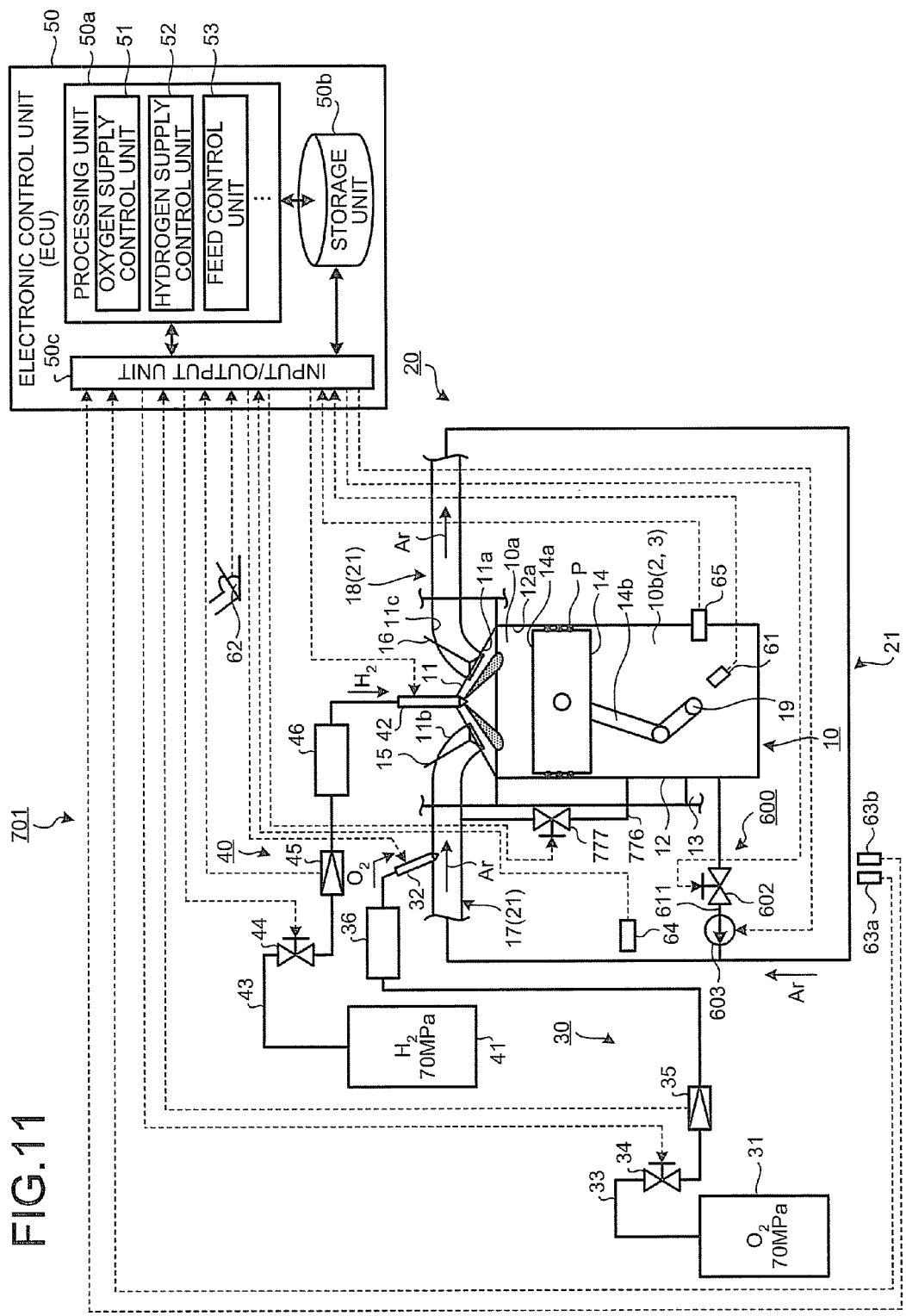
FIG. 11 is a schematic diagram of a working gas circulation engine according to a seventh embodiment of the present invention.
Figure 12:
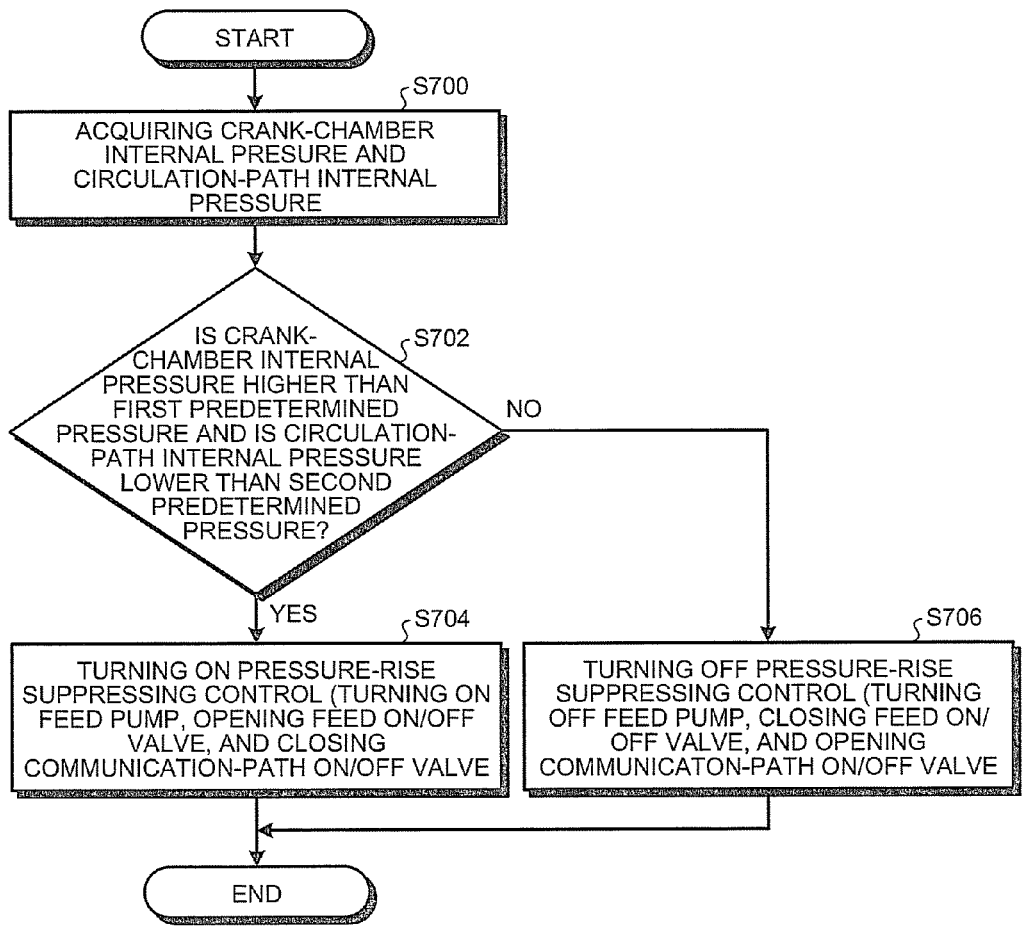
FIG. 12 is a flowchart explaining a control of the working gas circulation engine according to the seventh embodiment of the present invention.

FIG. 11 is a schematic diagram illustrating a configuration of a working gas circulation engine according to a seventh embodiment of the present invention, and FIG. 12 is a flowchart for explaining the control of the working gas circulation engine according to the seventh embodiment of the present invention. The working gas circulation engine according to the seventh embodiment is substantially the same as the working gas circulation engine according to the sixth embodiment, except that the working gas circulation engine in the seventh embodiment includes a first preventing means in a communication path. The description of configurations, operations, and effects same as those in the above-mentioned embodiment will not be repeated, and the same numerals are given to the same components.

A working gas circulation engine 701 according to the present embodiment includes a feed apparatus 700 serving as a feed means as illustrated in FIG. 11. The pressure-reduction target section 2 in the present embodiment is the engine-body-side pressure-reduction target section 3, more specifically, the crank chamber 10b that forms the engine-body-side pressure-reduction target section 3.

The working gas circulation engine 701 according to the present embodiment includes a communication path 776, and a communication path on-off valve 777 serving as the first preventing means.

The communication path 776 connects the inside of the crank chamber 10b that forms the engine-body-side pressure-reduction target section 3 and the inside of the circulation path 20 in such a manner that the gas can flow therethrough. The communication path 776 is provided separate from the feed passage 611 of the feed apparatus 600. The communication path 776 is a so-called PCV (Positive Crankcase Ventilation) path. Basically, the communication path 776 is a ventilation path that allows the working gas or blow-by gas such as the unburned hydrogen in the crank chamber 10b to return to the suction path and reflux to the combustion chamber 10a.

The communication path 776 connects the inside of the crank chamber 10b and the inside of the suction pipe 17 of the circulation passage 21 in such a manner that the gas can flow therethrough. The communication path 776 is composed of, for example, a passage pipe, and one end thereof is open to the inside of the crank chamber 10b, while the other end is open to the inside of the suction pipe 17 of the circulation passage 21. The communication path 776 is connected to the suction pipe 17 at the downstream side (suction side) from the connection portion of the circulation passage 21 and the feed passage 611, more specifically, at the downstream side (suction side) from the oxygen injection position by the oxidizing agent injection valve 32, with respect to the direction of circulating the gas in the circulation path 20.

The communication path on-off valve 777 can prevent the flow of the gas from the inside of the circulation path 20 to the inside of the crank chamber 10b that forms the engine-body-side pressure-reduction target section 3. The communication path on-off valve 777 is provided on the communication path 776 for opening and closing the communication path 776. When the communication path on-off valve 777 is closed, it closes the communication path 776 so as to cut the circulation of the gas in the communication path 776. When the communication path on-off valve 777 is opened, it opens the communication path 776 so as to allow the circulation of the gas in the communication path 776. The communication path on-off valve 777 is controlled by the electronic control unit 50.

When the feed control unit 53 operates the feed apparatus 600 for feeding the gas in the inside of the crank chamber 10b that forms the engine-body-side pressure-reduction target section 3, which is the pressure-reduction target section 2, into the inside of the circulation path 20, the feed control unit 53 controls the drive of the communication path on-off valve 777 so as to close the communication path on-off valve 777.

As a result, when the feed control unit 53 operates the feed apparatus 600 for feeding the gas in the inside of the crank chamber 10b that forms the engine-body-side pressure-reduction target section 3, which is the pressure-reduction target section 2, into the inside of the circulation path 20, the feed control unit 53 in the working gas circulation engine 701 according to the present embodiment closes the communication path on-off valve 777, whereby the communication path 776 is closed. Accordingly, the circulation of the gas is cut, with the result that the flowback of the gas from the inside of the circulation path 20 to the inside of the crank chamber 10b through the communication path 776 can be prevented. Therefore, the working gas circulation engine 701 according to the present embodiment can suppress the excessive pressure rise in the inside of the crank chamber 10b that forms the engine-body-side pressure-reduction target section 3. For example, the working gas circulation engine 701 according to the present embodiment can reduce the pressure in the inside of the crank chamber 10b to the pressure equal to or not more than the pressure in the inside of the circulation path 20. Accordingly, the reduced amount of the pressure in the inside of the crank chamber 10b can relatively be increased. Further, the pumping loss can also be reduced.

The control of the working gas circulation engine 701 in the present embodiment will now be described with reference to the flowchart in FIG. 12. The control routine is repeatedly executed in a control period of several milliseconds to several tens milliseconds.

The feed control unit 53 in the electronic control unit 50 acquires the current crank-chamber internal pressure and the current circulation-path internal pressure (S700) so as to determine whether the crank-chamber internal pressure is higher than the first predetermined pressure or not and whether the circulation-path internal pressure is lower than the second predetermined pressure or not (S702).

When the feed control unit 53 determines that the crank-chamber internal pressure is higher than the first predetermined pressure and that the circulation-path internal pressure is lower than the second predetermined pressure (S702: Yes), it turns ON a pressure-rise suppressing control (S704). Then, the feed control unit 53 ends the current control cycle, and moves to the next control cycle. In this case, the feed control unit 53 opens the feed on-off valve 602, drives (turns ON) the feed pump 603, and closes the communication path on-off valve 777, in order to turn ON the pressure-rise suppressing control.

When the feed control unit 53 determines that the crank-chamber internal pressure is not more than the first predetermined pressure, or the circulation-path internal pressure is not less than the second predetermined pressure (S702: No), it turns OFF the pressure-rise suppressing control (S706). Then, the feed control unit 53 ends the current control cycle, and moves to the next control cycle. In this case, the feed control unit 53 closes the feed on-off valve 602, stops (turns OFF) the feed pump 603, and opens the communication path on-off valve 777, in order to turn OFF the pressure-rise suppressing control.

According to the working gas circulation engine 701 according to the present embodiment, when the pressure in the pressure-reduction target section 2 is higher than the predetermined pressure, the feed control unit 53 in the working gas circulation engine 701 operates the feed apparatus 600 so as to forcibly feed the gas in the pressure-reduction target section 2 to the outside. Consequently, the pressure in the pressure-reduction target section 2 can be reduced. As a result, the excessive pressure rise in the pressure-reduction target section 2 can be suppressed.

The working gas circulation engine 701 according to the embodiment of the present invention includes the communication path 776 that is provided separate from the feed passage 611 of the feed apparatus 600 and connects the inside of the crank chamber 10b that forms the engine-body-side pressure-reduction target section 3 and the inside of the circulation path 20 in such a manner that the gas can flow therethrough, and the communication path on-off valve 777 that is provided on the communication path 776 and can prevent the flow of the gas from the inside of the circulation path 20 to the inside of the crank chamber 10b that forms the engine-body-side pressure-reduction target section 3. Accordingly, when the feed control unit 53 operates the feed apparatus 600 for feeding the gas in the inside of the crank chamber 10b that forms the engine-body-side pressure-reduction target section 3, which is the pressure-reduction target section 2, into the inside of the circulation path 20, the communication path on-off valve 777 can prevent the flowback of the gas from the circulation path 20 to the crank chamber 10b through the communication path 776. Therefore, the working gas circulation engine 701 according to the present embodiment can suppress the excessive pressure rise in the inside of the crank chamber 10b that forms the engine-body-side pressure-reduction target section 3.

In the above description, the first preventing means is the communication path on-off valve 777. However, the present invention is not limited thereto. For example, the first preventing means may be a check valve that can prevent the flow of the gas from the inside of the circulation path 20 to the inside of the crank chamber 10b that forms the engine-body-side pressure-reduction target section 3.

Eighth Embodiment

Figure 13:
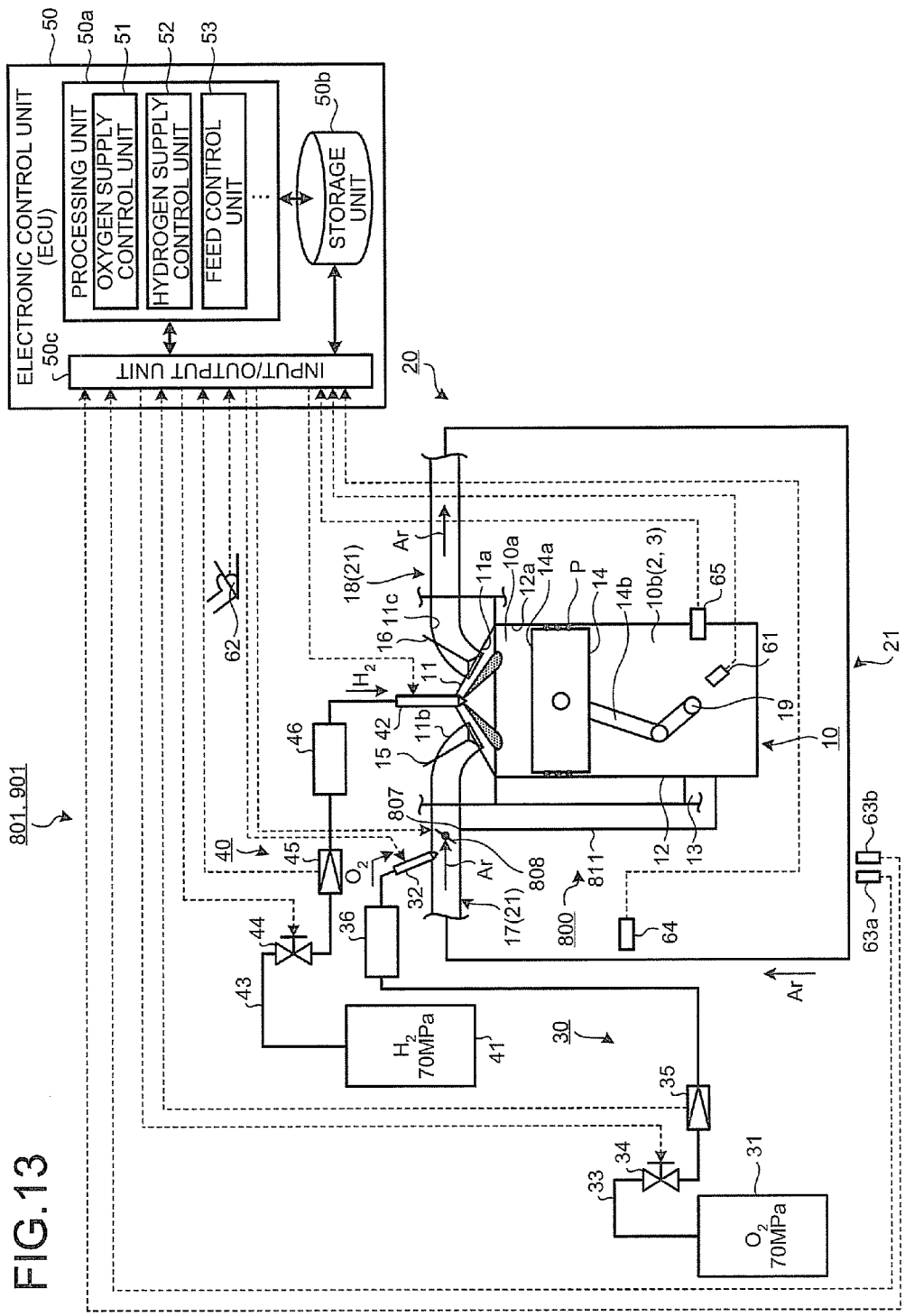
FIG. 13 is a schematic diagram of a working gas circulation engine according to an eighth embodiment of the present invention.
Figure 14:
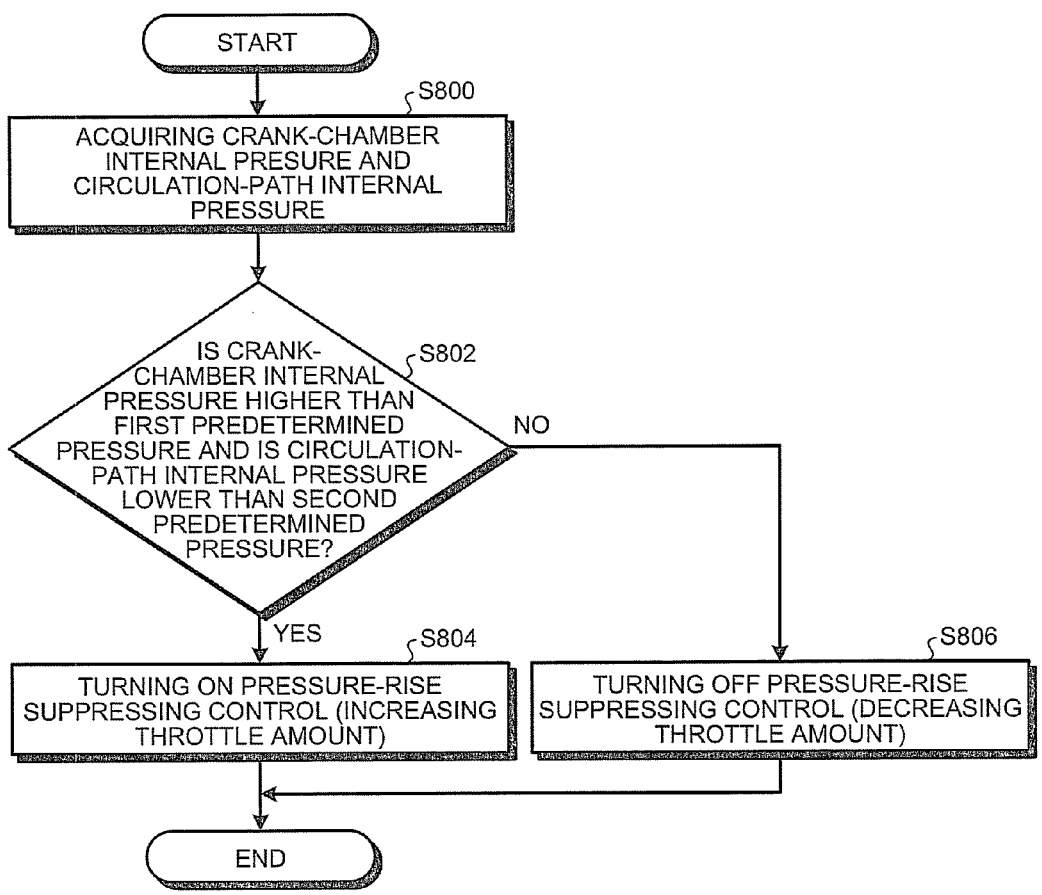
FIG. 14 is a flowchart explaining a control of the working gas circulation engine according to the eighth embodiment of the present invention.

FIG. 13 is a schematic diagram illustrating a configuration of a working gas circulation engine according to an eighth embodiment of the present invention, and FIG. 14 is a flowchart for explaining the control of the working gas circulation engine according to the eighth embodiment of the present invention. The working gas circulation engine according to the eighth embodiment is substantially the same as the working gas circulation engine according to the sixth embodiment, except for the structure of the feed means. The description of configurations, operations, and effects same as those in the above-mentioned embodiment will not be repeated, and the same numerals are given to the same components.

A working gas circulation engine 801 according to the present embodiment includes a feed apparatus 800 serving as a feed means as illustrated in FIG. 13. The pressure-reduction target section 2 in the present embodiment is the engine-body-side pressure-reduction target section 3, more specifically, the crank chamber 10b that forms the engine-body-side pressure-reduction target section 3.

The feed apparatus 800 in the present embodiment includes a feed passage 811 and a variable throttle valve 808 serving as an adjusting means.

The feed passage 811 connects the inside of the crank chamber 10b that forms the engine-body-side pressure-reduction target section 3 and the inside of the circulation path 20 in such a manner that the gas can flow therethrough. Specifically, the feed passage 811 is composed of, for example, a passage pipe. One end of the feed passage 811 is open to the inside of the crank chamber 10b, while the other end is open to the inside of the suction pipe 17 of the circulation passage 21. Here, the feed passage 811 is connected to the suction pipe 17 at the downstream side (suction side) from the oxygen injection position by the oxidizing agent injection valve 32 in the direction of circulating the as in the circulation path 20. Specifically, a connection portion 807 of the feed passage 811 with the suction pipe 17 of the circulation passage 21 is positioned between the oxygen injection position by the oxidizing agent injection valve 32 and the connection portion 807.

The variable throttle valve 808 is provided at the upstream side (exhaust side) from the connection portion 807 of the feed passage 811 with the circulation path 20 with respect to the direction of circulating the gas in the circulation path 20, and can adjust the pressure in the circulation path 20. More specifically, the variable throttle valve 808 can adjust the pressure in the circulation path 20 at the downstream side (suction side) from the variable throttle valve 808 with respect to the direction of circulating the gas in the circulation path 20.

The variable throttle valve 808 is provided in the suction pipe 17 of the circulation path 20, and adjusts the throttle amount thereof so as to adjust the open degree (the passage area through which the fluid such as the working gas can pass) of the suction pipe 17 of the circulation path 20, whereby the pressure at the downstream side (suction side) from the variable throttle valve 808 in the circulation path 20 can be adjusted. Specifically, when the throttle amount of the variable throttle valve 808 relatively increases so as to relatively decrease the open degree of the suction pipe 17 of the circulation path 20, the variable throttle valve 808 can relatively lower the pressure at the downstream side (suction side) from the variable throttle valve 808 in the circulation path 20. On the other hand, when the throttle amount of the variable throttle valve 808 relatively decreases so as to relatively increase the open degree of the suction pipe 17 of the circulation path 20, the variable throttle valve 808 can relatively increase the pressure at the downstream side (suction side) from the variable throttle valve 808 in the circulation path 20. The variable throttle valve 808 is controlled by the electronic control unit 50.

When the feed apparatus 800 feeds the gas in the inside of the crank chamber 10b that forms the engine-body-side pressure-reduction target section 3 into the inside of the circulation path 20, the variable throttle valve 808 increases its throttle amount so as to relatively decrease the open degree of the suction pipe 17 of the circulation path 20, whereby a reduced-pressure area is formed in which the pressure at the downstream side (suction side) from the variable throttle valve 808 is relatively decreased. Specifically, when the feed control unit 53 operates the feed apparatus 800 for feeding the gas in the inside of the crank chamber 10b that forms the engine-body-side pressure-reduction target section 3, which is the pressure-reduction target section 2, into the inside of the circulation path 20, it increases the throttle amount of the variable throttle valve 808 so as to decrease the pressure at the downstream side from the variable throttle valve 808. Therefore, the pressure in the reduced-pressure area at the downstream side (suction side) from the variable throttle valve 808 can be made lower than the pressure in the inside of the crank chamber 10b.

Since the pressure in the reduced-pressure area at the downstream side (suction side) from the variable throttle valve 808 can be made lower than the pressure in the inside of the crank chamber 10b by the variable throttle valve 808 in the working gas circulation engine 801 according to the embodiment of the present invention, the gas in the inside of the crank chamber 10b can forcibly be fed to the inside of the circulation passage 21 in the circulation path 20 through the feed passage 811. Accordingly, the working gas circulation engine 801 can suppress the excessive pressure rise in the inside of the crank chamber 10b that forms the engine-body-side pressure-reduction target section 3.

The control of the working gas circulation engine 801 in the present embodiment will now be described with reference to the flowchart in FIG. 14. The control routine is repeatedly executed in a control period of several milliseconds to several tens milliseconds.

The feed control unit 53 in the electronic control unit 50 acquires the current crank-chamber internal pressure and the current circulation-path internal pressure (S800) so as to determine whether the crank-chamber internal pressure is higher than the first predetermined pressure or not and whether the circulation-path internal pressure is lower than the second predetermined pressure or not (S802).

When the feed control unit 53 determines that the crank-chamber internal pressure is higher than the first predetermined pressure and that the circulation-path internal pressure is lower than the second predetermined pressure (S802: Yes), it turns ON a pressure-rise suppressing control (S804). Then, the feed control unit 53 ends the current control cycle, and moves to the next control cycle. In this case, the feed control unit 53 relatively increases the throttle amount of the variable throttle valve 808 so as to relatively decrease the open degree of the suction pipe in the circulation path 20, thereby relatively lowering the pressure in the circulation path 20 at the downstream side (suction side) from the variable throttle valve 808 in order to turn ON the pressure-rise suppressing control.

When the feed control unit 53 determines that the crank-chamber internal pressure is not more than the first predetermined pressure, or the circulation-path internal pressure is not less than the second predetermined pressure (S802: No), it turns OFF the pressure-rise suppressing control (S806). Then, the feed control unit 53 ends the current control cycle, and moves to the next control cycle. In this case, the feed control unit 53 relatively decreases the throttle amount of the variable throttle valve 808 so as to relatively increase the open degree of the suction pipe in the circulation path 20, thereby relatively increasing the pressure in the circulation path 20 at the downstream side (suction side) from the variable throttle valve 808 in order to turn OFF the pressure-rise suppressing control.

According to the working gas circulation engine 801 according to the present embodiment, when the pressure in the inside of the pressure-reduction target section 2 is higher than the predetermined pressure, the feed control unit 53 in the working gas circulation engine 801 operates the feed apparatus 800 so as to forcibly feed the gas in the inside of the pressure-reduction target section 2 to the outside. Consequently, the pressure in the inside of the pressure-reduction target section 2 can be reduced. As a result, the excessive pressure rise in the inside of the pressure-reduction target section 2 can be suppressed.

The working gas circulation engine 801 according to the embodiment of the present invention includes the feed passage 811 that connects the inside of the crank chamber 10b that forms the engine-body-side pressure-reduction target section 3 and the inside of the circulation path 20 in such a manner that the gas can flow therethrough, and the variable throttle valve 808 that is provided at the upstream side from the connection portion 807 with the feed passage 811 in the circulation path with respect to the direction of circulating the gas in the circulation path 20 with the combustion chamber 10a defined as a reference. The variable throttle valve 808 reduces the pressure in the circulation path 20 at the downstream side from the variable throttle valve 808 so as to be capable of feeding the gas in the inside of the crank chamber 10b, which forms the engine-body-side pressure-reduction target section 3, into the inside of the circulation path 20. Accordingly, the pressure in the reduced-pressure area at the downstream side (suction side) from the variable throttle valve 808 can be made lower than the pressure in the inside of the crank chamber 10b. Therefore, the working gas circulation engine 801 can positively feed the gas in the inside of the crank chamber 10b into the inside of the circulation path 20 through the feed passage 811 due to the pressure difference between the pressure in the inside of the circulation path 20 at the downstream side from the variable throttle valve 808 and the pressure in the inside of the crank chamber 10b. Consequently, the working gas circulation engine 801 can suppress the excessive pressure rise in the inside of the crank chamber 10b that forms the engine-body-side pressure-reduction target section 3.

Ninth Embodiment

Figure 15:
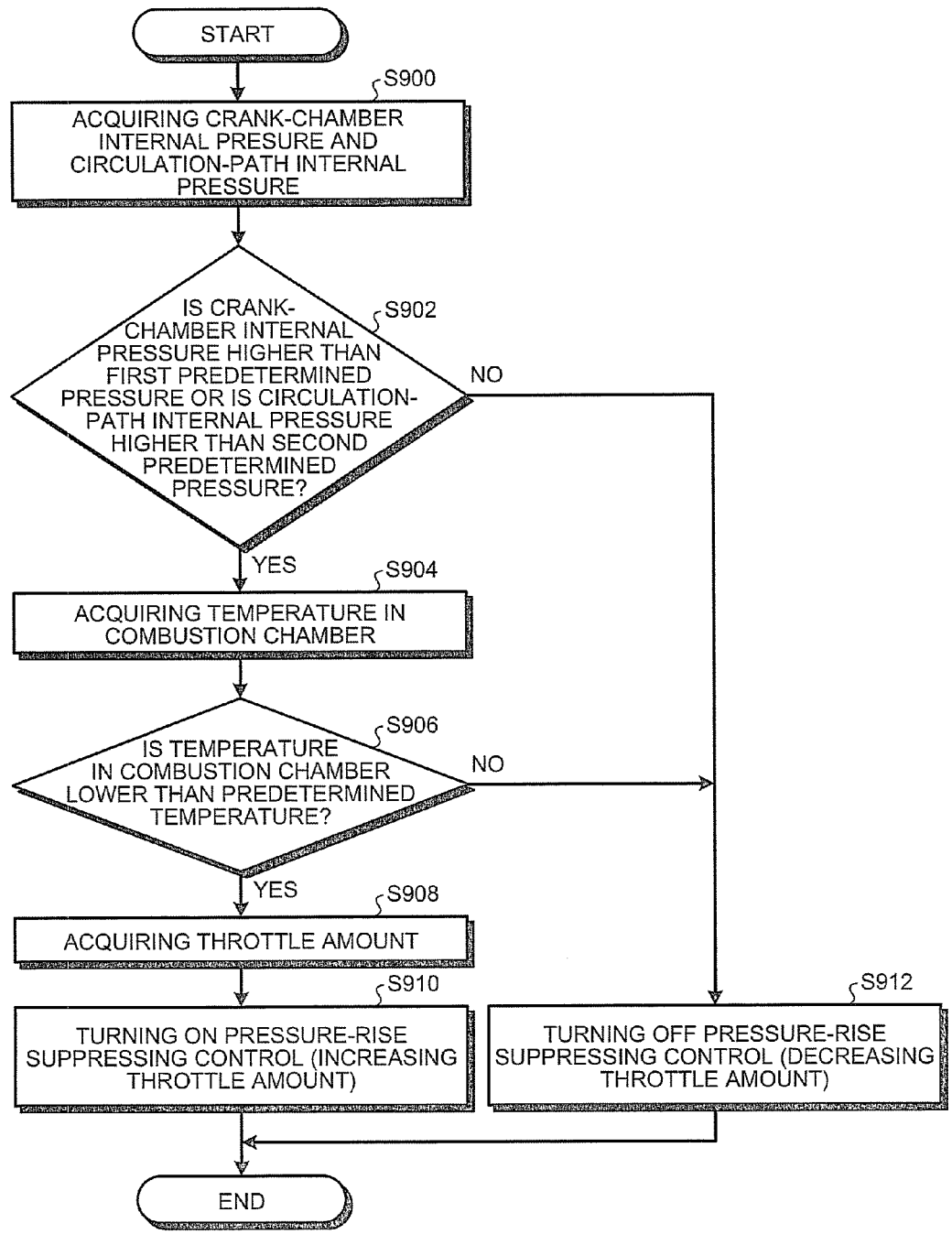
FIG. 15 is a flowchart explaining a control of the working gas circulation engine according to a ninth embodiment of the present invention.
Figure 16:
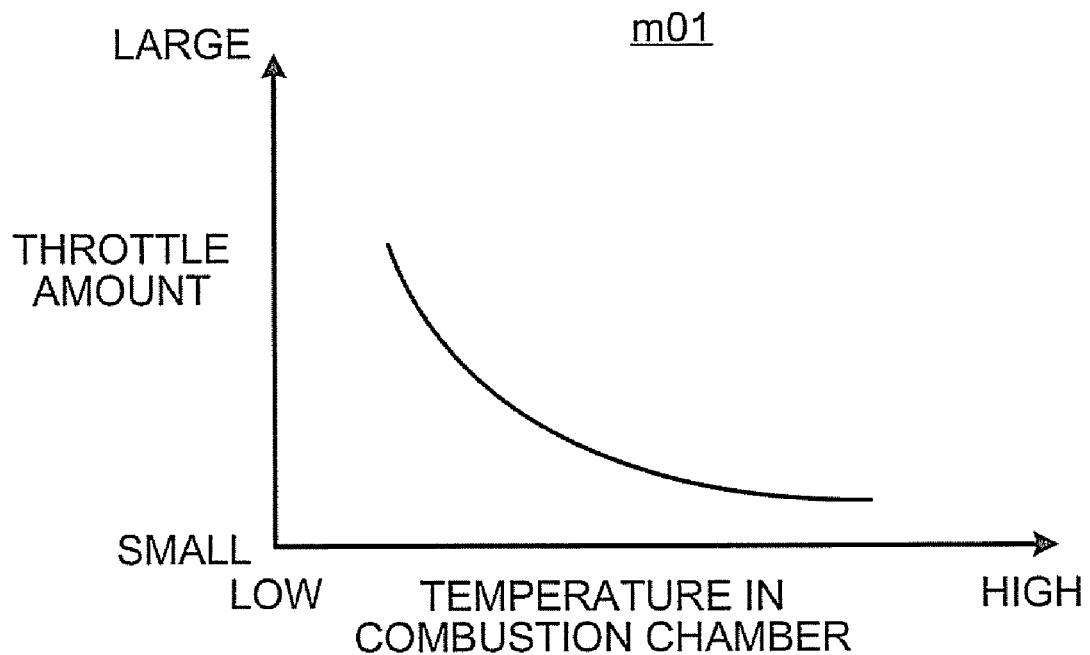
FIG. 16 is a map of a throttle amount of the working gas circulation engine according to the ninth embodiment of the present invention.

FIG. 15 is a flowchart for explaining the control of the working gas circulation engine according to the ninth embodiment of the present invention, and FIG. 16 is a throttle-amount map of working gas circulation engine according to a ninth embodiment of the present invention. The working gas circulation engine according to the ninth embodiment is substantially the same as the working gas circulation engine according to the eighth embodiment, except that working gas circulation engine in the ninth embodiment adjusts the open degree of the circulation path on the basis of the temperature in the combustion chamber. The description of configurations, operations, and effects same as those in the above-mentioned embodiment will not be repeated, and the same numerals are given to the same components. The components of the working gas circulation engine in the ninth embodiment are referred to FIG. 13 and other drawings.

A working gas circulation engine 901 according to the present embodiment includes the feed apparatus 800 serving as a feed means. The pressure-reduction target section 2 in the present embodiment is the engine-body-side pressure-reduction target section 3, more specifically, the crank chamber 10b that forms the engine-body-side pressure-reduction target section 3.

The feed control unit 53 in the present embodiment controls the variable throttle valve 808 so as to adjust the open degree of the suction pipe 17 of the circulation path 20 on the basis of the temperature in the combustion chamber 10a. Specifically, the feed control unit 53 adjusts the throttle amount of the variable throttle valve 808 so as to adjust the open degree of the suction pipe 17 in the circulation path 20 on the basis of the temperature in the combustion chamber 10a, thereby adjusting the pressure in the suction pipe 17 of the circulation path 20 at the downstream side from the variable throttle valve 808.

The feed control unit 53 may estimate or acquire the temperature in the combustion chamber 10a, i.e., the temperature in the cylinder, by various known methods. The cylinder temperature is typically the temperature according to the temperatures at the wall face of the recess 11a of the cylinder head 11 surrounding the combustion chamber 10a, the wall face of the cylinder bore 12a, and the top face 14a of the piston 14. The feed control unit 53 may acquire the temperature in the combustion chamber 10a on the basis of the detection signal from temperature detecting means that detects these temperatures. Alternatively, the feed control unit 53 may estimate the amount of heat generated due to the combustion of hydrogen on the basis of the supply amount of the hydrogen by the fuel supplying apparatus 40, and may estimate and acquire the temperature in the combustion chamber 10a on the basis of the amount of generated heat.

When the feed control unit 53 operates the feed apparatus 800 for feeding the gas in the inside of the crank chamber 10b that forms the engine-body-side pressure-reduction target section 3, which is the pressure-reduction target section 2, into the inside of the circulation path 20, the feed control unit 53 sets the throttle amount of the variable throttle valve 808 to be relatively small as the temperature in the combustion chamber 10a relatively increases, whereby the open degree of the suction pipe 17 in the circulation path 20 is set relatively great. The feed control unit 53 sets the throttle amount of the variable throttle valve 808 to be relatively great as the temperature in the combustion chamber 10a relatively decreases, whereby the open degree of the suction pipe 17 in the circulation path 20 is set relatively small. When the temperature in the combustion chamber 10a is not less than a predetermined temperature that is set in advance, the feed control unit 53 inhibits the feed of the gas from the inside of the crank chamber 10b to the inside of the circulation path 20 by the feed apparatus 800, and sets the throttle amount of the variable throttle valve 808 to be a minimum value so as to set the open degree of the suction pipe 17 in the circulation path 20 to be a maximum value.

When the feed apparatus 800 feeds the gas in the inside of the crank chamber 10b that forms the engine-body-side pressure-reduction target section 3, which is the pressure-reduction target section 2, into the inside of the circulation path 20, the working gas circulation engine 901 increases the throttle amount of the variable throttle valve 808 so as to relatively decrease the open degree of the suction pipe 17 of the circulation path 20. Therefore, the working gas circulation engine 901 relatively decreases the pressure in the circulation path 20 at the downstream side (suction side) from the variable throttle valve 808. Accordingly, when the working gas circulation engine 901 feeds the gas in the inside of the crank chamber 10b into the inside of the circulation path 20, the open degree of the suction pipe 17 of the circulation path 20 relatively decreases, which might cause the relative reduction in the supply amount of the working gas supplied to the combustion chamber 10a through the suction pipe 17 and the suction port 11b. When, for example, the throttle amount of the variable throttle valve 808 is set to be relatively great with the temperature in the combustion chamber 10a being set to be high, the open degree of the suction pipe 17 of the circulation path 20 relatively decreases, so that the amount of the working gas supplied to the combustion chamber 10a relatively decreases. Therefore, the ratio of the working gas in the combustion chamber 10a decreases, whereby the working gas becomes insufficient with respect to the amount of heat generated due to the combustion of oxygen and hydrogen in the combustion chamber 10a. Therefore, the amount of heat used for the thermal expansion of the working gas is relatively small, with the result that the temperature of the combustion gas after the combustion of the hydrogen and oxygen excessively increases, and hence, excessive thermal load might be applied to each part of the working gas circulation engine 901.

However, when the feed control unit 53 operates the feed apparatus 800 for feeding the gas in the inside of the crank chamber 10b into the inside of the circulation path 20, the working gas circulation engine 901 according to the embodiment of the present invention appropriately sets the throttle amount of the variable throttle valve 808 on the basis of the temperature in the combustion chamber 10a. Therefore, when the gas in the inside of the crank chamber 10b is fed, the working gas circulation engine 901 can prevent the working gas from becoming insufficient with respect to the amount of heat generated with the combustion of hydrogen and oxygen in the combustion chamber 10a, whereby it can supply the working gas in an appropriate amount to the combustion chamber 10a. As a result, since the working gas circulation engine 901 can prevent the working gas from becoming insufficient with respect to the amount of heat generated with the combustion of hydrogen and oxygen in the combustion chamber 10a when the gas in the inside of the crank chamber 10b is fed, it can also prevent the excessive rise in the temperature of the combustion gas after the combustion of hydrogen and oxygen. Accordingly, it can be prevented that excessive thermal load is applied to each part of the working gas circulation engine 901.

The control of the working gas circulation engine 901 in the present embodiment will now be described with reference to the flowchart in FIG. 15. The control routine is repeatedly executed in a control period of several milliseconds to several tens milliseconds.

The feed control unit 53 in the electronic control unit 50 acquires the current crank-chamber internal pressure and the current circulation-path internal pressure (S900) so as to determine whether the crank-chamber internal pressure is higher than the first predetermined pressure or not and whether the circulation-path internal pressure is lower than the second predetermined pressure or not (S902).

When the feed control unit 53 determines that the crank-chamber internal pressure is higher than the first predetermined pressure and that the circulation-path internal pressure is lower than the second predetermined pressure (S902: Yes), the feed control unit 53 acquires the temperature in the combustion chamber 10a on the basis of the detection signal from the temperature detecting means, which detects the temperatures of the wall face of the recess 11a of the cylinder head 11, the wall face of the cylinder bore 12a, and the top face 14a of the piston 14, and the control signal from the fuel supplying apparatus 40 (S904).

Next, the feed control unit 53 compares the temperature in the combustion chamber 10a acquired at S904 and the predetermined temperature that is set in advance so as to determine whether the temperature in the combustion chamber 10a is lower than the predetermined temperature or not (S906).

When the feed control unit 53 determines that the temperature in the combustion chamber 10a is lower than the predetermined temperature (S906: Yes), the feed control unit 53 acquires the throttle amount of the variable throttle valve 808 on the basis of the temperature in the combustion chamber 10a acquired at S904 (S908).

The feed control unit 53 obtains the throttle amount of the variable throttle valve 808 on the basis of a throttle-amount map m01 illustrated in FIG. 16, for example. The axis of abscissa in the throttle-amount map m01 indicates the temperature in the combustion chamber, and the axis of ordinate indicates the throttle amount of the variable throttle valve 808. The throttle-amount map m01 shows the relationship between the temperature in the combustion chamber and the throttle amount of the variable throttle valve 808. In the throttle-amount map m01, the throttle amount of the variable throttle valve 808 decreases with the increase in the temperature in the combustion chamber. The throttle-amount map m01 is stored in the storage unit 50b after the relationship between the temperature in the combustion chamber and the throttle amount of the variable throttle valve 808 is set in advance. The feed control unit 53 obtains the throttle amount of the variable throttle valve 808 from the temperature in the combustion chamber 10a acquired at S904 on the basis of the throttle-amount map m01.

In the present embodiment, the feed control unit 53 obtains the throttle amount of the variable throttle valve 808 by using the throttle-amount map m01. However, the present embodiment is not limited thereto. The feed control unit 53 may obtain the throttle amount of the variable throttle valve 808 on the basis of a numerical equation corresponding to the throttle-amount map m01.

Then, the feed control unit turns ON a pressure-rise suppressing control (S910). Then, the feed control unit 53 ends the current control cycle, and moves to the next control cycle. In this case, the feed control unit 53 relatively increases the throttle amount of the variable throttle valve 808 so as to relatively decrease the open degree of the suction pipe 17 in the circulation path 20 on the basis of the throttle mount of the variable throttle valve 808 acquired at S908, thereby relatively lowering the pressure in the circulation path 20 at the downstream side (suction side) from the variable throttle valve 808, in order to turn ON the pressure-rise suppressing control.

When the feed control unit 53 determines that the crank-chamber internal pressure is not more than the first predetermined pressure, or the circulation-path internal pressure is not less than the second predetermined pressure (S902: No), the feed control unit 53 turns OFF (inhibits) the pressure-rise suppressing control (S906). Then, the feed control unit 53 ends the current control cycle, and moves to the next control cycle. In this case, the feed control unit 53 sets the throttle amount of the variable throttle valve 808 to be the minimum so as to set the open degree of the suction pipe 17 of the circulation path 20 to be the maximum, and sets the pressure in the circulation path 20 at the downstream side (suction side) from the variable throttle valve 808 to be relatively high, in order to turn OFF the pressure-rise suppressing control.

According to the working gas circulation engine 901 according to the present embodiment, when the pressure in the inside of the pressure-reduction target section 2 is higher than the predetermined pressure, the feed control unit 53 in the working gas circulation engine 901 operates the feed apparatus 800 so as to forcibly feed the gas in the inside of the pressure-reduction target section 2 to the outside. Consequently, the pressure in the inside of the pressure-reduction target section 2 can be reduced. As a result, the excessive pressure rise in the inside of the pressure-reduction target section 2 can be suppressed.

The variable throttle valve 808 of the feed apparatus 800 in the working gas circulation engine 901 according to the embodiment of the present invention adjusts the pressure in the reduced pressure area at the downstream side from the variable throttle valve 808 so as to become lower than the pressure in the inside of the crank chamber 10b. Therefore, the working gas circulation engine 901 can positively feed the gas in the inside of the crank chamber 10b into the inside of the circulation path 20 through the feed passage 811 due to the pressure difference between the pressure in the inside of the circulation path 20 at the downstream side from the variable throttle valve 808 and the pressure in the inside of the circulation path 20. Consequently, the working gas circulation engine 901 can suppress the excessive pressure rise in the inside of the crank chamber 10b that forms the engine-body-side pressure-reduction target section 3.

In the working gas circulation engine 901 according to the embodiment of the present invention, the variable throttle valve 808 adjusts the open degree of the circulation path 20 so as to adjust the pressure in the circulation path 20, and the feed control unit 53 controls the variable throttle valve 808 on the basis of the temperature in the combustion chamber 10a so as to adjust the open degree of the circulation path 20. Therefore, when the feed control unit 53 operates the feed apparatus 800 for feeding the gas in the inside of the crank chamber 10b into the inside of the circulation path 20, the working gas circulation engine 901 according to the embodiment of the present invention appropriately sets the throttle amount of the variable throttle valve 808 on the basis of the temperature in the combustion chamber 10a. Accordingly, the working gas circulation engine 901 can prevent the excessive rise in the temperature of the combustion gas after the combustion of hydrogen and oxygen. Accordingly, it can be prevented that excessive thermal load is applied to each part of the working gas circulation engine 901, whereby the durability of the working gas circulation engine 901 can be enhanced.

Tenth Embodiment

Figure 17:
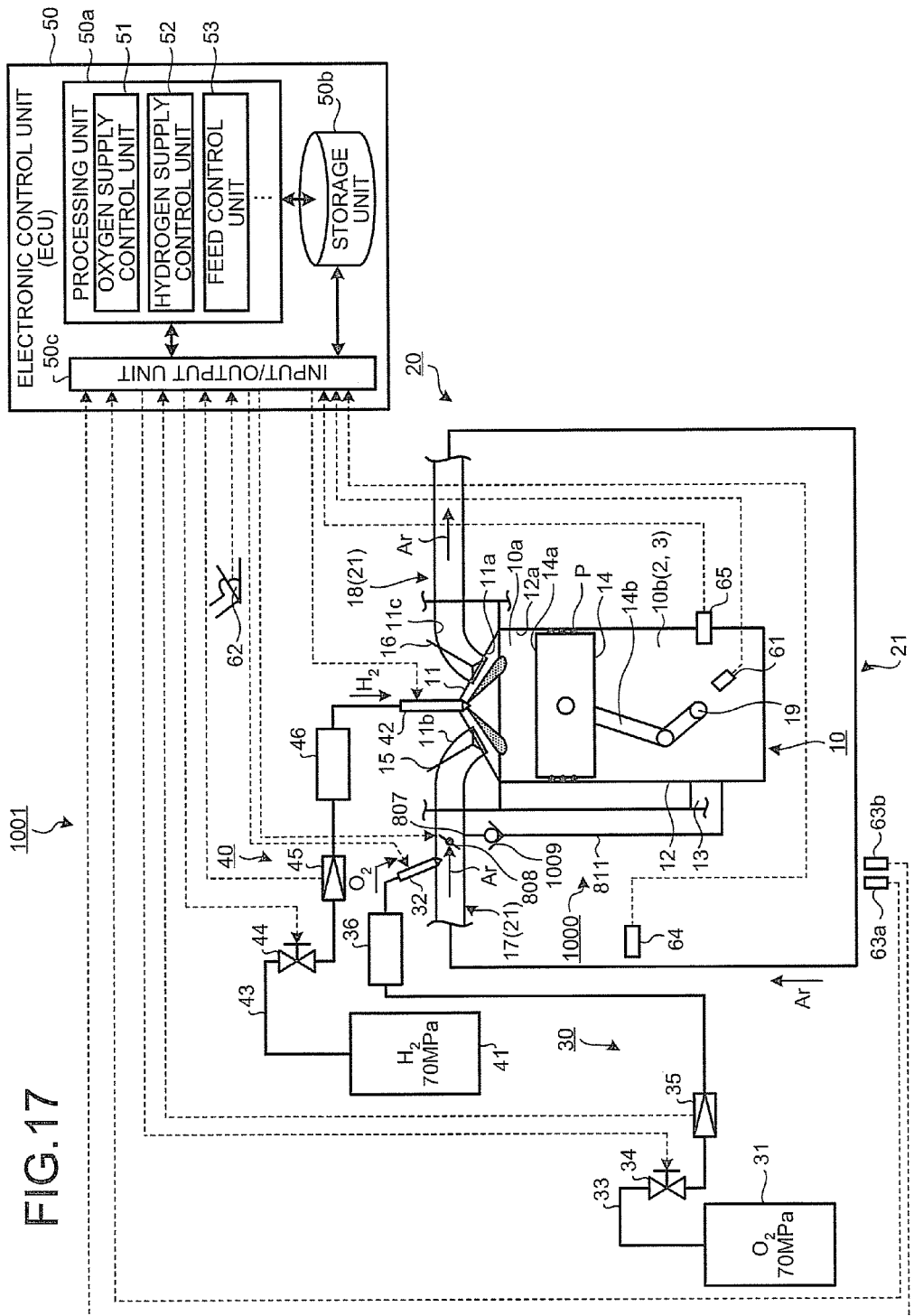
FIG. 17 is a schematic diagram of a working gas circulation engine according to a tenth embodiment of the present invention.
Figure 18:
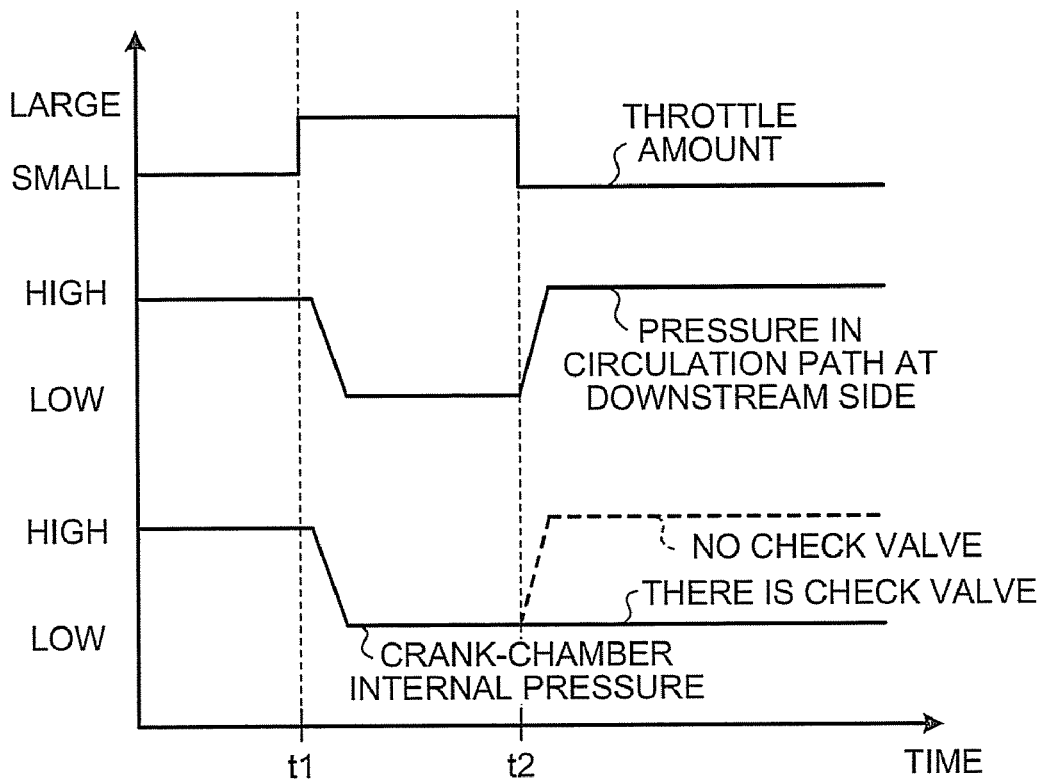
FIG. 18 is a time chart of an operation of the working gas circulation engine according to the tenth embodiment of the present invention.

FIG. 17 is a schematic diagram illustrating a configuration of a working gas circulation engine according to a tenth embodiment of the present invention, and FIG. 18 is a time chart for explaining one example of the operation of the working gas circulation engine according to the tenth embodiment of the present invention. The working gas circulation engine according to the eighth embodiment is substantially the same as the working gas circulation engine according to the eighth embodiment, except that working gas circulation engine in the tenth embodiment includes second preventing means. The description of configurations, operations, and effects same as those in the above-mentioned embodiment will not be repeated, and the same numerals are given to the same components.

A working gas circulation engine 1001 according to the present embodiment includes a feed apparatus 1000 serving as a feed means as illustrated in FIG. 17. The pressure-reduction target section 2 in the present embodiment is the engine-body-side pressure-reduction target section 3, more specifically, the crank chamber 10b that forms the engine-body-side pressure-reduction target section 3.

The feed apparatus 1000 in the present embodiment includes the feed passage 811 and the variable throttle valve 808 serving as an adjusting means, like the feed apparatus 800 (see FIG. 13) described above. The feed apparatus 1000 also includes a check valve 1009 serving as the second preventing means.

The check valve 1009 is provided on the feed passage 811 for preventing the flow of the gas from the inside of the circulation path 20 to the inside of the crank chamber 10b that forms the engine-body-side pressure-reduction target section 3. Specifically, the check valve 1009 allows the flow of the gas from the inside of the crank chamber 10b that forms the engine-body-side pressure-reduction target section 3 into the inside of the circulation path 20 in the feed passage 811, while regulates the flow of the gas from the inside of the circulation path 20 to the inside of the crank chamber 10b that forms the engine-body-side pressure-reduction target section 3

As a result, the working gas circulation engine 1001 increases the throttle amount of the variable throttle valve 808 at time t1 so as to relatively decrease the open degree of the suction pipe 17 of the circulation path 20, as illustrated in the time chart in FIG. 18, whereby the pressure in the circulation path at the downstream side (suction side) from the variable throttle valve 808 is relatively lowered, as illustrated in the time chart in FIG. 18. The working gas circulation engine 1001 forcibly feeds the gas in the inside of the crank chamber 10b into the inside of the circulation path 20 through the feed passage 811 so as to reduce the pressure in the inside of the crank chamber 10b, and then, decreases the throttle amount of the variable throttle valve 808 at time t2 so as to relatively increase the open degree of the suction pipe 17 of the circulation path 20, whereby the pressure in the circulation path 20 at the downstream side (suction side) from the variable throttle valve 808 is relatively increased. Accordingly, even when the pressure in the circulation path 20 at the downstream side (suction side) from the variable throttle valve 808 is returned to be relatively high, the check valve 1009 can prevent the flowback from the inside of the circulation path 20 into the inside of the crank chamber 10b. Accordingly, the working gas circulation engine 1001 can keep the condition in which the pressure in the inside of the crank chamber 10b is reduced.

When the working gas circulation engine 1001 increases the throttle amount of the variable throttle valve 808 so as to relatively decrease the open degree of the suction pipe 17 of the circulation path 20, by which the pressure in the circulation path 20 at the downstream side (suction side) from the variable throttle valve 808 is set to be relatively low, the pressure in the circulation path 20 at the upstream side (exhaust side) from the variable throttle valve 808 becomes relatively high. This might increase the pressure difference between the suction side and the exhaust side across the combustion chamber 10a, which increases the pumping loss. Accordingly, the fuel consumption might be deteriorated.

However, in the working gas circulation engine 1001, the check valve 1009 prevents the flowback from the inside of the circulation path 20 into the inside of the crank chamber 10b, and hence, the working gas circulation engine 1001 can keep the condition in which the pressure in the inside of the crank chamber 10b is reduced. Therefore, as illustrated in the time chart in FIG. 18, the period during when the throttle amount of the variable throttle valve 808 is increased, i.e., the period during when the pumping loss is increased, which is the period during the time t1 to the time t2, can relatively be shortened.

According to the working gas circulation engine 1001 according to the present embodiment, when the pressure in the inside of the pressure-reduction target section 2 is higher than the predetermined pressure, the feed control unit 53 in the working gas circulation engine 1001 operates the feed apparatus 1000 so as to forcibly feed the gas in the inside of the pressure-reduction target section 2 to the outside. Consequently, the pressure in the inside of the pressure-reduction target section 2 can be reduced. As a result, the excessive pressure rise in the inside of the pressure-reduction target section 2 can be suppressed.

In the working gas circulation engine 1001 according to the present embodiment, the variable throttle valve 808 of the feed apparatus 1000 adjusts the pressure in the reduced pressure area at the downstream side (suction side) from the variable throttle valve 808 to become lower than the pressure in the inside of the crank chamber 10b. Accordingly, the working gas circulation engine 1001 according to the present embodiment can forcibly feed the gas in the inside of the crank chamber 10b into the inside of the circulation path 20 through the feed passage 811 due to the pressure difference between the pressure in the inside of the circulation path 20 at the downstream side from the variable throttle valve 808 and the pressure in the inside of the crank chamber 10b. Consequently, the working gas circulation engine 1001 can suppress the excessive pressure rise in the inside of the crank chamber 10b that forms the engine-body-side pressure-reduction target section 3.

In the working gas circulation engine 1001 according to the present embodiment, the feed apparatus 1000 is provided on the feed passage 811, and provided with the check valve 1009 that prevents the flowback of the gas from the inside of the circulation path 20 into the inside of the crank chamber 10b that forms the engine-body-side pressure-reduction target section 3. Accordingly, the check valve 1009 in the working gas circulation engine 1001 prevents the flowback of the gas from the inside of the circulation path 20 into the inside of the crank chamber 10b, and hence, the working gas circulation engine 1001 can keep the condition in which the pressure in the inside of the crank chamber 10b is reduced, whereby the period during when the throttle amount of the variable throttle valve 808 is increased, i.e., the period during when the pumping loss is increased, can relatively be shortened. Consequently, the working gas circulation engine 1001 can surely suppress the excessive pressure rise in the inside of the crank chamber 10b that forms the engine-body-side pressure-reduction target section 3, and further, the period during when the fuel consumption is deteriorated can relatively be shortened, with the result that the deterioration in the fuel consumption can be prevented.

In the above description, the second preventing means is the check valve 1009. However, the present invention is not limited thereto. The second preventing means may be an on-off valve that opens and closes the feed passage 811 according to the control of the feed control unit 53.

Eleventh Embodiment

Figure 19:
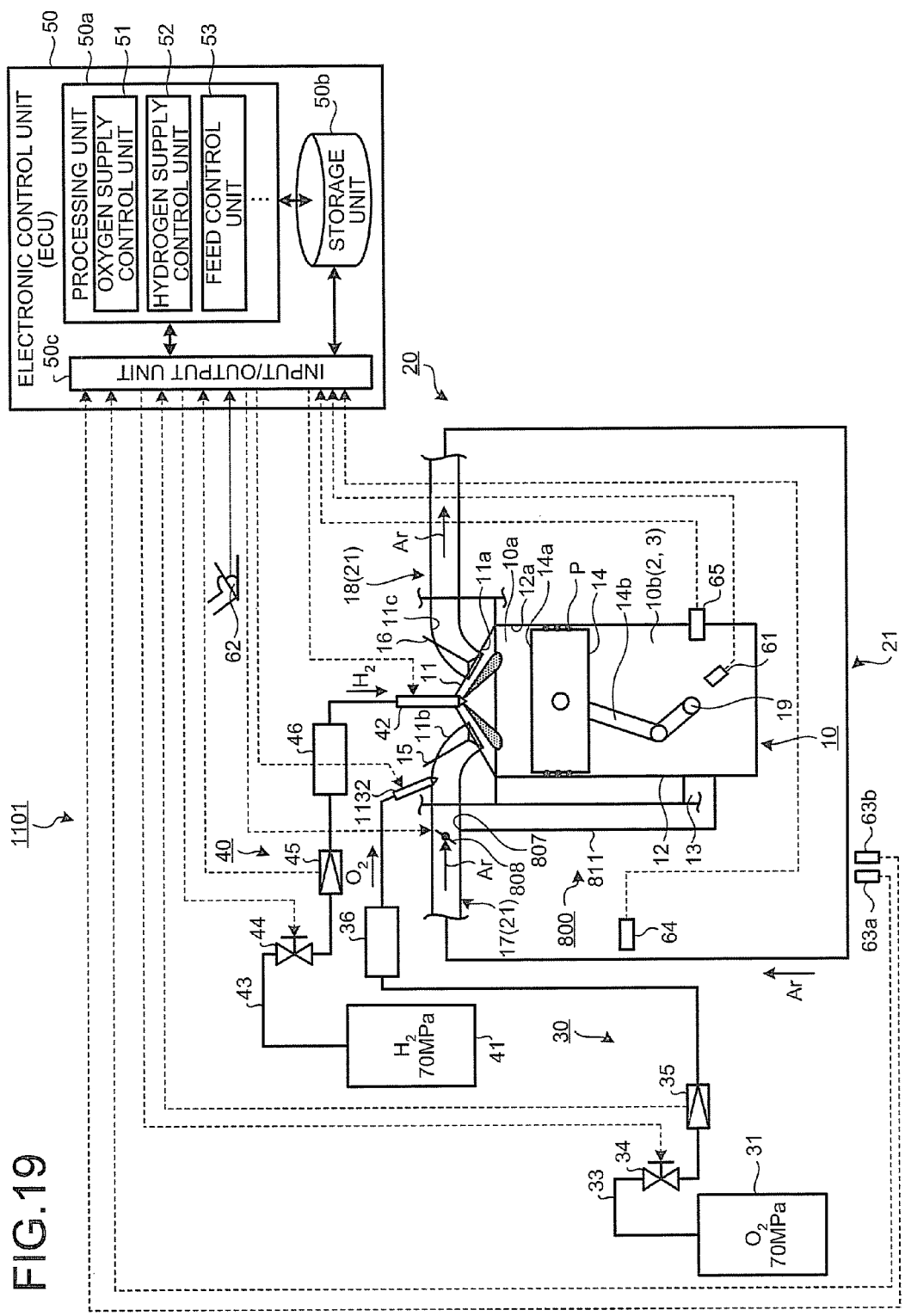
FIG. 19 is a schematic diagram of a working gas circulation engine according to an eleventh embodiment of the present invention.

FIG. 19 is a schematic diagram illustrating a configuration of a working gas circulation engine according to an eleventh embodiment of the present invention. The working gas circulation engine according to the eleventh embodiment is substantially the same as the working gas circulation engine according to the eighth embodiment, except that the position of supplying the oxidizing agent by the oxidizing agent supply means is different from the working gas circulation engine in the eighth embodiment. The description of configurations, operations, and effects same as those in the above-mentioned embodiment will not be repeated, and the same numerals are given to the same components.

A working gas circulation engine 1101 according to the present embodiment includes the feed apparatus 800 serving as feed means as illustrated in FIG. 19. The pressure-reduction target section 2 in the present embodiment is the engine-body-side pressure-reduction target section 3, more specifically, the crank chamber 10b that forms the engine-body-side pressure-reduction target section 3. The feed apparatus 800 in the present embodiment includes the feed passage 811 and the variable throttle valve 808 serving as an adjusting means.

The oxidizing agent supplying apparatus 30 serving as the oxidizing agent supply means in the present embodiment supplies oxygen, serving as the oxidizing agent, to the downstream side (suction side) from the variable throttle valve 808 in the circulation path 20 with respect to the direction of circulating the gas in the circulation path 20.

Specifically, the oxidizing agent supplying apparatus 30 includes an oxidizing agent injection valve 1132 instead of the oxidizing agent injection valve 32 (see FIG. 13). The oxidizing agent injection valve 1132 in the present embodiment supplies oxygen, serving as the oxidizing agent, to the combustion chamber 10a through the circulation path 20, here, through the suction port 11b. The oxidizing agent injection valve 1132 is provided to the cylinder head 11 so as to be capable of injecting the oxygen to the suction port 11b. Specifically, the oxidizing agent injection valve 1132 in the oxidizing agent supplying apparatus 30 in the present embodiment injects the oxygen to the suction port 11b, whereby the oxygen is mixed with the working gas flowing through the suction port 11b. Accordingly, the oxidizing agent supplying apparatus 30 can feed the resultant gas to the combustion chamber 10a.

The variable throttle valve 808 in the present embodiment is located at the upstream side (exhaust side) from the injection position of oxygen by the oxidizing agent injection valve 1132 in the circulation path 20 with respect to the direction of circulating the gas in the circulation path 20.

When the working gas circulation engine 1101 increases the throttle amount of the variable throttle valve 808 so as to relatively decrease the open degree of the suction pipe 17 of the circulation path 20, in order to set the pressure in the circulation path 20 at the downstream side (suction side) from the variable throttle valve 808 to be relatively low, the pressure in the circulation path 20 at the upstream side (exhaust side) from the variable throttle valve 808 becomes relatively high.

In this case, the oxidizing agent injection valve 1132 in the oxidizing agent supplying apparatus 30 supplies the oxygen to the downstream side (suction side) from the variable throttle valve 808 in the circulation path 20 with respect to the direction of circulating the gas in the circulation path 20. Therefore, when the throttle amount of the variable throttle valve 808 is increased, the working gas circulation engine 1101 can supply the oxygen to the downstream side (suction side) from the variable throttle valve 808, where the pressure becomes relatively low, in the circulation path 20. Accordingly, the working gas circulation engine 1101 can prevent the reduction in the injection amount of the oxygen by the oxidizing agent injection valve 1132, for example. Consequently, even if the injection pressure of the oxygen by the oxidizing agent injection valve 1132 is not increased, an appropriate amount of oxygen can be injected. The working gas circulation engine 1101 cannot supply the oxygen to the upstream side (exhaust side) from the variable throttle valve 808 in the circulation path 20 where the pressure becomes relatively high. Therefore, the working gas circulation engine 1101 can prevent the excessive pressure rise, which is generated due to the effect of the oxygen injection by the oxidizing agent injection valve 1132, at the upstream side (exhaust side) from the variable throttle valve 808 in the circulation path 20.

According to the working gas circulation engine 1101 according to the present embodiment, when the pressure in the inside of the pressure-reduction target section 2 is higher than the predetermined pressure, the feed control unit 53 in the working gas circulation engine 1101 operates the feed apparatus 800 so as to forcibly feed the gas in the inside of the pressure-reduction target section 2 to the outside. Consequently, the pressure in the inside of the pressure-reduction target section 2 can be reduced. As a result, the excessive pressure rise in the inside of the pressure-reduction target section 2 can be suppressed.

In the working gas circulation engine 1101 according to the present embodiment, the variable throttle valve 808 of the feed apparatus 800 adjusts the pressure in the reduced pressure area at the downstream side (suction side) from the variable throttle valve 808 to become lower than the pressure in the inside of the crank chamber 10b. Accordingly, the working gas circulation engine 1101 according to the present embodiment can forcibly feed the gas in the inside of the crank chamber 10b into the inside of the circulation path 20 through the feed passage 811 due to the pressure difference between the pressure in the inside of the circulation path 20 at the downstream side from the variable throttle valve 808 and the pressure in the inside of the crank chamber 10b. Consequently, the working gas circulation engine 1101 can suppress the excessive pressure rise in the inside of the crank chamber 10b that forms the engine-body-side pressure-reduction target section 3.

The working gas circulation engine 1101 according to the present embodiment includes the oxidizing agent supplying apparatus 30 that supplies oxygen, serving as the oxidizing agent, to the downstream side (suction side) from the variable throttle valve 808 in the circulation path 20 with respect to the direction of circulating the gas in the circulation path 20 with the combustion chamber 10a defined as a reference. The oxidizing agent supplying apparatus 30 supplies the oxygen to the downstream side (suction side) from the variable throttle valve 808 in the circulation path 20 with respect to the direction of circulating the gas in the circulation path 20. Therefore, the working gas circulation engine 1101 can supply the oxygen to the downstream side (suction side) from the variable throttle valve 808 in the circulation path 20, where the pressure is relatively low. Accordingly, the working gas circulation engine 1101 can prevent the excessive pressure rise at the upstream side (exhaust side) from the variable throttle valve 808 in the circulation path 20. Further, even if the injection pressure of the oxygen by the oxidizing agent supplying apparatus 30 is not increased, an appropriate amount of oxygen can be supplied.

Twelfth Embodiment

Figure 20:
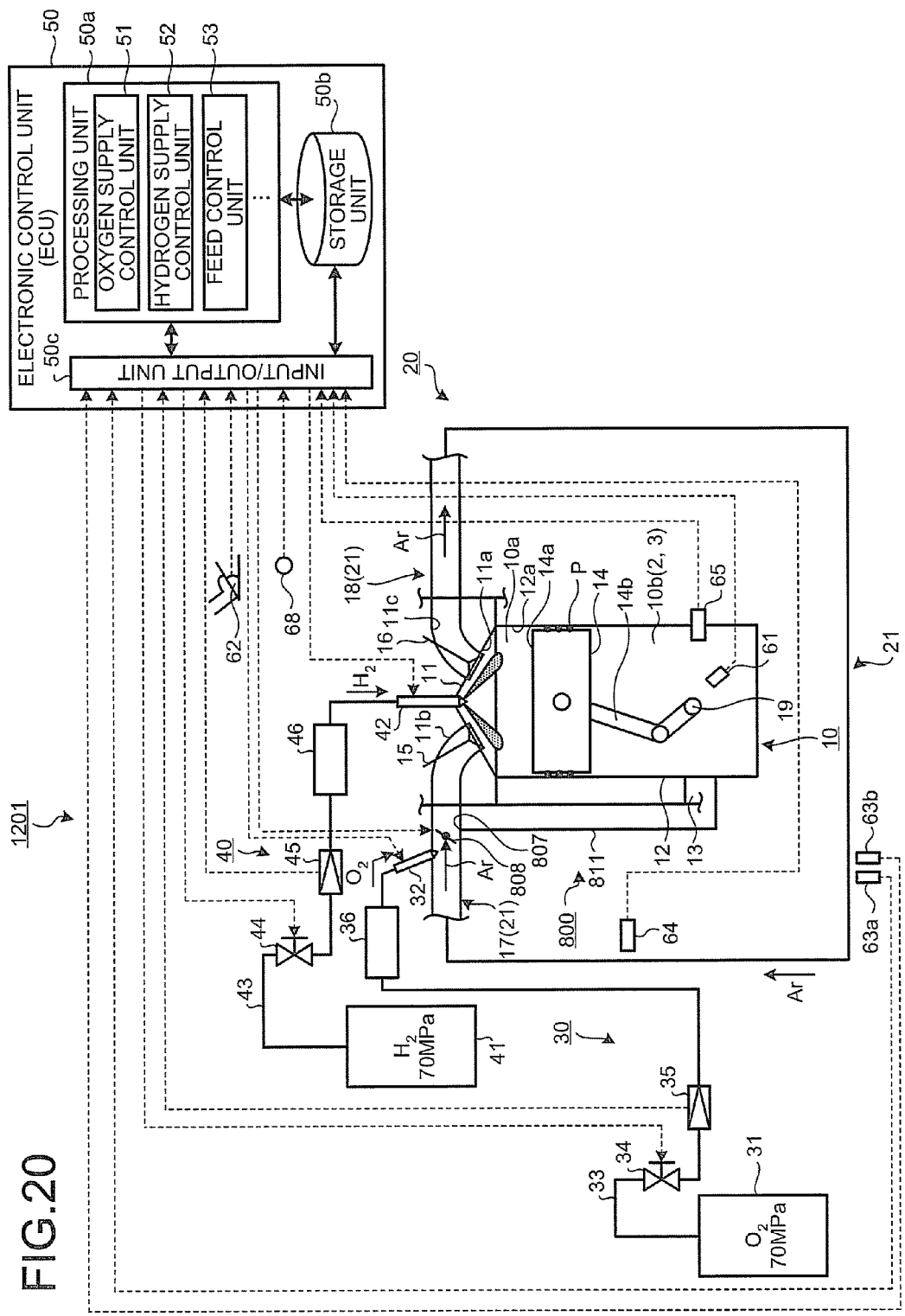
FIG. 20 is a schematic diagram of a working gas circulation engine according to a twelfth embodiment of the present invention.

FIG. 20 is a schematic diagram illustrating a configuration of a working gas circulation engine according to a twelfth embodiment of the present invention, and FIG. 21 is a flowchart explaining the control of the working gas circulation engine according to the twelfth embodiment. The working gas circulation engine according to the twelfth embodiment is substantially the same as the working gas circulation engine according to the eighth embodiment, except that gas in the inside of the engine-body-side pressure-reduction target section is fed into the inside of the circulation path under a predetermined condition. The description of configurations, operations, and effects same as those in the above-mentioned embodiment will not be repeated, and the same numerals are given to the same components.

A working gas circulation engine 1201 according to the present embodiment includes the feed apparatus 800 serving as feed means as illustrated in FIG. 20. The pressure-reduction target section 2 in the present embodiment is the engine-body-side pressure-reduction target section 3, more specifically, the crank chamber 10b that forms the engine-body-side pressure-reduction target section 3. The feed apparatus 800 in the present embodiment includes the feed passage 811 and the variable throttle valve 808 serving as adjusting means.

When a working gas circulation engine 1202 increases the throttle amount of the variable throttle valve 808 so as to relatively decrease the open degree of the suction pipe 17 of the circulation path 20, thereby setting the pressure in the circulation path 20 at the downstream side (suction side) from the variable throttle valve 808 to become relatively low, the pressure in the circulation path 20 at the upstream side (exhaust side) from the variable throttle valve 808 becomes relatively high. This might increase the pressure difference between the suction side and the exhaust side across the combustion chamber 10a, which increases the pumping loss. Accordingly, the fuel consumption might be deteriorated.

The feed control unit 53 in the present embodiment operates the variable throttle valve 808 of the feed apparatus 800, during the deceleration of the vehicle or during the fuel-cut period in which the effect caused by the deterioration in the fuel consumption due to the pumping loss is small, for reducing the pressure at the downstream side from the variable throttle valve 808, in order to feed the gas in the inside of the crank chamber 10b, which forms the engine-body-side pressure-reduction target section 3, into the inside of the circulation path 20. The fuel-cut period means the period when a so-called fuel-cut control is executed in which the supply of hydrogen from the fuel supplying apparatus 40 to the combustion chamber 10a is stopped. For example, the fuel-cut control includes the control for preventing the engine speed from exceeding the maximum revolution, which is compensated by the engine body 10, or the control for stopping the supply of hydrogen to the combustion chamber 10a during the deceleration of the vehicle. A vehicle speed sensor 68 is electrically connected to the electronic control unit 50 in the present embodiment. The vehicle speed sensor 68 detects the speed of the vehicle having the working gas circulation engine 1202 mounted thereto. The vehicle speed sensor 68 transmits the detection signal to the electronic control unit 50. The feed control unit 53 in the present embodiment controls the variable throttle valve 808 of the feed apparatus 800 on the basis of the result of the detection by the vehicle speed sensor 68 or the fuel-cut information.

The feed control unit 53 in the working gas circulation engine 1201 operates the variable throttle valve 808 of the feed apparatus 800 for reducing the pressure in the circulation path 20 at the downstream side from the variable throttle valve 808 during the deceleration of the vehicle or during the fuel-cut period, thereby feeding the gas in the inside of the crank chamber 10b, which forms the engine-body-side pressure-reduction target section 3, into the inside of the circulation path 20. Therefore, the working gas circulation engine 1201 can suppress the deterioration of the fuel consumption due to the pumping loss. Since the pressure at the downstream side from the variable throttle valve 808 is reduced during the deceleration of the vehicle, the increase in the pumping loss can be utilized for the engine brake. Accordingly, the braking performance of the vehicle can be enhanced.

The control of the working gas circulation engine 1201 in the present embodiment will now be described with reference to the flowchart in FIG. 21. The control routine is repeatedly executed in a control period of several milliseconds to several tens milliseconds.

The feed control unit 53 in the electronic control unit 50 acquires the current crank-chamber internal pressure and the current circulation-path internal pressure (S1200) so as to determine whether the crank-chamber internal pressure is higher than the first predetermined pressure or not and whether the circulation-path internal pressure is lower than the second predetermined pressure or not (S1202).

When the feed control unit 53 determines that the crank-chamber internal pressure is higher than the first predetermined pressure and that the circulation-path internal pressure is lower than the second predetermined pressure (S1202: Yes), it acquires the current vehicle speed or the fuel-cut information on the basis of the detection signal from various sensors such as the vehicle speed sensor 68 or the control signal at the respective parts (S1204).

Then, the feed control unit 53 determines whether the current driving state is in the deceleration state or in the fuel-cut state on the basis of the vehicle speed or the fuel-cut information acquired at S1204 (S1206).

When the feed control unit 53 determines that the current driving state is in the deceleration state or in the fuel-cut period (S1206: Yes), it turns ON the pressure-rise suppressing control (S1208). Thereafter, the feed control unit 53 ends the current control cycle, and then, moves to the next control cycle.

When the feed control unit 53 determines at S1202 that the crank-chamber internal pressure is not more than the first predetermined pressure, or that the circulation-path internal pressure is not less than the second predetermined pressure (S1202: No), and determines that the current driving state is not in the deceleration state and in the fuel-cut period (S1206: No), the feed control unit 53 turns OFF the pressure-rise suppressing control (S1210). Then, the feed control unit 53 ends the current control cycle, and moves to the next control cycle.

According to the working gas circulation engine 1201 according to the present embodiment, when the pressure in the inside of the pressure-reduction target section 2 is higher than the predetermined pressure, the feed control unit 53 in the working gas circulation engine 1201 operates the feed apparatus 800 so as to forcibly feed the gas in the inside of the pressure-reduction target section 2 to the outside. Consequently, the pressure in the inside of the pressure-reduction target section 2 can be reduced. As a result, the excessive pressure rise in the inside of the pressure-reduction target section 2 can be suppressed.

In the working gas circulation engine 1201 according to the present embodiment, the variable throttle valve 808 of the feed apparatus 800 adjusts the pressure in the reduced pressure area at the downstream side (suction side) from the variable throttle valve 808 to become lower than the pressure in the inside of the crank chamber 10b. Accordingly, the working gas circulation engine 1201 according to the present embodiment can forcibly feed the gas in the inside of the crank chamber 10b into the inside of the circulation path 20 through the feed passage 811 due to the pressure difference between the pressure in the inside of the circulation path 20 at the downstream side from the variable throttle valve 808 and the pressure in the inside of the crank chamber 10b. Consequently, the working gas circulation engine 1201 can suppress the excessive pressure rise in the inside of the crank chamber 10b that forms the engine-body-side pressure-reduction target section 3.

The feed control unit 53 in the working gas circulation engine 1202 according to the present embodiment of the present invention operates the variable throttle valve 808 of the feed apparatus 800, during the deceleration of the vehicle or during the fuel-cut period in which the supply of the fuel from the fuel supplying apparatus 40 to the combustion chamber 10a is stopped, for reducing the pressure at the downstream side from the variable throttle valve 808, in order to feed the gas in the inside of the crank chamber 10b, which forms the engine-body-side pressure-reduction target section 3, into the inside of the circulation path 20. Therefore, the working gas circulation engine 1201 can suppress the deterioration of the fuel consumption due to the pumping loss. Since the pressure at the downstream side from the variable throttle valve 808 is reduced during the deceleration of the vehicle, the increase in the pumping loss can be utilized for the engine brake. Accordingly, the braking performance of the vehicle can be enhanced.

The working gas circulation engine according to the present invention is not limited to the working gas circulation engines in the respective embodiments, but various modifications are possible without departing from the scope of the present invention. The working gas circulation engine according to the present invention may be configured by combining a plurality of the working gas circulation engines in the respective embodiments.

In the above description, the working gas circulation engine has the fuel injection valve that can directly inject the fuel into the combustion chamber 10a. However, the fuel injection valve may be mounted to the cylinder head 11 so as to inject the fuel to the suction port 11b. In this case too, the working gas circulation engine according to the present invention can suppress the excessive pressure rise.

In the above description, the working gas circulation engine has the oxidizing agent injection valve that can inject the oxygen to the suction pipe 17 or the suction port 11b. However, the oxidizing agent injection valve may be mounted to the cylinder head 11 so as to directly inject the oxygen to the combustion chamber 10a. In this case too, the working gas circulation engine according to the present invention can suppress the excessive pressure rise.

In the above description, the working gas circulation engine performs diffusion combustion of the hydrogen ($H_2$) serving as a fuel. However, the working gas circulation engine may be configured to perform the combustion by spark injection in which the fuel is ignited by an ignition plug not shown, or to assist the ignition by igniting the fuel by the ignition plug so as to perform the diffusion combustion. Specifically, the working gas circulation engine according to the present invention may be applied to a working gas circulation engine whose combustion manner is different. In this case too, the working gas circulation engine according to the present invention can suppress the excessive pressure rise.

INDUSTRIAL APPLICABILITY

As described above, the working gas circulation engine according to the present invention can suppress the excessive pressure rise, and is well adaptable to various working gas circulation engines that can allow the working gas, contained in the exhaust gas, to circulate from the exhaust side to the suction side of the combustion chamber, and then, can supply the working gas again to the combustion chamber.

The invention claimed is:
1. A working gas circulation engine comprising:
a combustion chamber capable of expanding a working gas having a specific heat ratio higher than that of air due to a combustion between an oxidizing agent and a fuel;
a circulation path that allows the working gas to circulate from an exhaust side to a suction side of the combustion chamber and that is capable of supplying the working gas again to the combustion chamber;

a feed unit capable of feeding a gas in an inside of a pressure-reduction target section whose pressure is to be reduced, to an outside; and a control unit that operates the feed unit to feed the gas in the inside of the pressure-reduction target section to the outside, when a pressure in the inside of the pressure-reduction target section is higher than a predetermined pressure set in advance.

2. The working gas circulation engine according to claim 1, further comprising:

a storage unit capable of storing a gas fed by the feed unit with a pressure higher than an internal pressure of the pressure-reduction target section.

3. The working gas circulation engine according to claim 1, wherein the feed unit includes a feed passage that connects the inside and the outside of the pressure-reduction target section in such a manner that the gas can flow therethrough, an opening/closing unit that is provided on the feed passage and can open and close the feed passage, and a pressure-feed unit that is provided on the feed passage and applies pressure to a gas in the feed passage to feed the gas from the inside to the outside of the pressure-reduction target section.

4. The working gas circulation engine according to claim 1, wherein the pressure-reduction target section is the circulation path whose internal pressure possibly varies according to an operation state to become higher than the predetermined pressure.

5. The working gas circulation engine according to claim 4, further comprising:

a cooling unit that is provided on the circulation path and cools a gas circulating in the circulation path, wherein the feed unit can feed the gas in the inside of the circulation path to the outside at the downstream side from the cooling unit with respect to the direction of circulating the gas in the circulation path with the combustion chamber defined as a reference.

6. The working gas circulation engine according to claim 4, further comprising:

a removing unit that is provided on the circulation path and removes the fuel in the gas generated after the combustion between the oxidizing agent and the fuel, wherein the feed unit can feed a gas in the inside of the circulation path to the outside at the downstream side from the removing unit with respect to the direction of circulating the gas in the circulation path with the combustion chamber defined as a reference.

7. The working gas circulation engine according to claim 4, further comprising:

a concentration detecting unit that detects a concentration of the fuel in a gas in the circulation path, wherein the feed unit can feed a gas in the inside of the circulation path at the downstream side from a detection position of a concentration by the concentration detecting unit with respect to the direction of circulating the gas in the circulation path with the combustion chamber defined as a reference, and the control unit inhibits a feed of the gas by the feed unit, when the concentration of the fuel detected by the concentration detecting unit is not less than a predetermined concentration set in advance.

8. The working gas circulation engine according to claim 1, wherein the pressure-reduction target section is an engine-body-side pressure-reduction target section that is a space other than the combustion chamber, a suction port and an exhaust port communicating with the combustion chamber which are included in an engine body, and an internal pressure of the space possibly varies according to an operation state to become higher than the predetermined pressure.

9. The working gas circulation engine according to claim 4, wherein the engine-body-side pressure-reduction target section includes a crank chamber that is provided to a side opposite to the combustion chamber across a piston provided so as to be capable of moving reciprocally in a cylinder bore.

10. The working gas circulation engine according to claim 8, wherein the feed unit can feed a gas in the inside of the engine-body-side pressure-reduction target section into the inside of the circulation path.

11. The working gas circulation engine according to claim 10, further comprising:

a communication path that is provided separate from a feed passage of the feed unit and connects the inside of the engine-body-side pressure-reduction target section and the inside of the circulation path in such a manner that the gas can flow therethrough; and a first preventing unit that is provided on the communication path and can prevent a flow of the gas from the inside of the circulation path to the inside of the engine-body-side pressure-reduction target section.

12. The working gas circulation engine according to claim 10, wherein the feed unit includes a feed passage that connects the inside and the outside of the engine-body-side pressure-reduction target section in such a manner that the gas can flow therethrough, and an adjusting unit that is provided at the upstream side from a connection portion to the feed passage of the circulation path with respect to the direction of circulating the gas in the circulation path with the combustion chamber defined as a reference, and that can adjust the pressure in the circulation path, wherein the adjusting unit reduces a pressure in the circulation path at the downstream side from the adjusting unit so as to be capable of feeding the gas in the inside of the engine-body-side pressure-reduction target section into the inside of the circulation path.

13. The working gas circulation engine according to claim 12, wherein the adjusting unit adjusts an open degree of the circulation path so as to adjust a pressure in the circulation path, and the control unit controls the adjusting unit so as to adjust an open degree of the circulation path on the basis of the temperature in the combustion chamber.

14. The working gas circulation engine according to claim 12, wherein the feed unit is provided on the feed passage and inhibits the flow of a gas from the inside of the circulation path to the inside of the engine-body-side pressure-reduction target section.

15. The working gas circulation engine according to claim 12, further comprising:

an oxidizing agent supply unit that supplies the oxidizing agent to the downstream side from the adjusting unit in the circulation path with respect to the direction of circulating the gas in the circulation path with the combustion chamber defined as a reference.

16. The working gas circulation engine according to claim 12, wherein
the control unit operates the adjusting unit of the feed unit, during the deceleration of a vehicle having the engine body provided with the combustion chamber mounted thereto or during a fuel-cut period in which the supply of the fuel from the fuel supply unit to the combustion chamber is stopped, so as to reduce the pressure at the downstream side from the adjusting unit, thereby feeding the gas in the inside of the engine-body-side pressure-reduction target section in the inside of the circulation path.

* * * * *